United States Patent
Honguh et al.

[11] Patent Number: 5,995,303
[45] Date of Patent: Nov. 30, 1999

[54] OPTICAL ELEMENT AND OPTICAL DEVICE

[75] Inventors: Yoshinori Honguh, Yokohama; Masataka Shiratsuchi, Funabashi, both of Japan

[73] Assignee: Kabushiki Kaisha Toshiba, Kawasaki, Japan

[21] Appl. No.: 08/537,302

[22] Filed: Sep. 29, 1995

[30] Foreign Application Priority Data

Sep. 30, 1994 [JP] Japan ................................. 6-238122
Mar. 16, 1995 [JP] Japan ................................. 7-056906

[51] Int. Cl.$^6$ ........................... G02B 13/18; G02B 26/00
[52] U.S. Cl. ............................................. 359/708; 359/237
[58] Field of Search ................................. 359/708, 718, 359/719, 237

[56] References Cited

U.S. PATENT DOCUMENTS

| | | | |
|---|---|---|---|
| 4,545,653 | 10/1985 | Brenden et al. | 359/719 |
| 5,059,013 | 10/1991 | Jain | 359/894 |
| 5,243,585 | 9/1993 | Hoshino et al. | 369/44.41 |
| 5,373,395 | 12/1994 | Adachi . | |
| 5,384,659 | 1/1995 | Shikama et al. | 359/719 |
| 5,497,465 | 3/1996 | Chin et al. . | |

FOREIGN PATENT DOCUMENTS

| | | |
|---|---|---|
| 6-123869 | 5/1994 | Japan . |
| 6-175129 | 6/1994 | Japan . |
| 6-222300 | 8/1994 | Japan . |
| 7-104499 | 11/1995 | Japan . |

OTHER PUBLICATIONS

Optical Technique Handbook, enlarged edition, pp. 900–903, Jul. 20, 1975, Kubota, et al.

*Primary Examiner*—Scott J. Sugarman
*Attorney, Agent, or Firm*—Oblon, Spivak, McClelland, Maier & Neustadt, P.C.

[57] ABSTRACT

An optical element of this invention converts incident light having a predetermined shape and a predetermined intensity distribution into output light having a desired shape and a uniform intensity distribution. Furthermore, in an optical device of this invention, which has this optical element as a first optical element, a light source radiates a light beam having the predetermined beam shape and the predetermined intensity distribution, the first optical element shapes the beam shape of the incident light beam into one of rectangular, circular, and elliptic shapes having a uniform intensity distribution, and a second optical element gives a collimation to the incident shaped light beam.

26 Claims, 28 Drawing Sheets

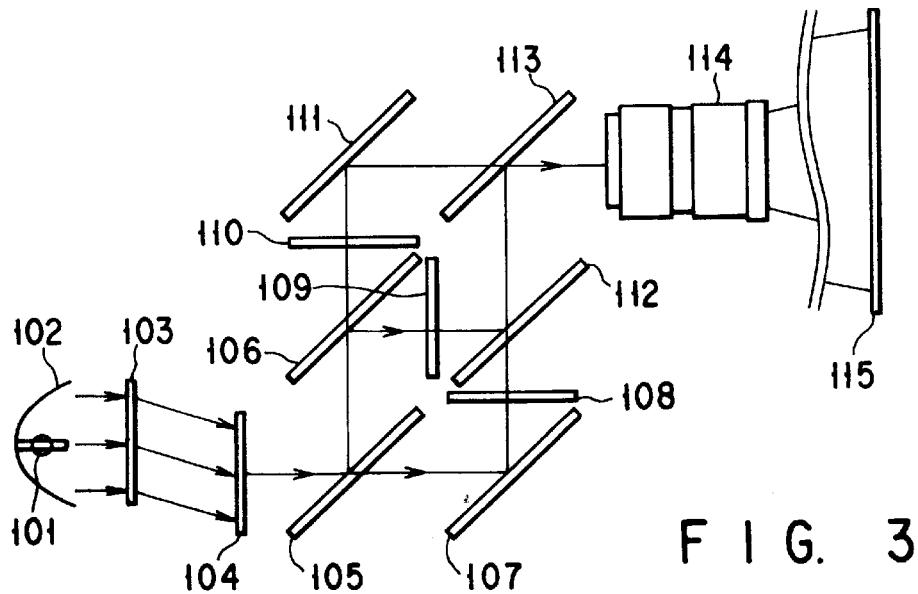
F I G. 3

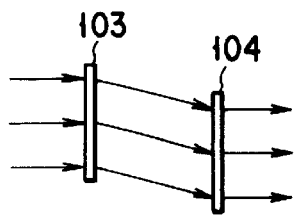
F I G. 4A
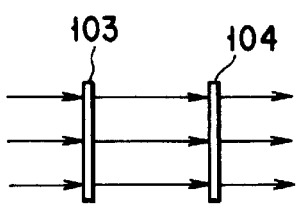
F I G. 4B
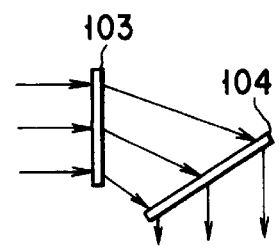
F I G. 4C
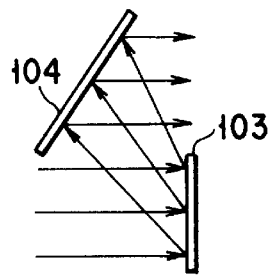
F I G. 4D
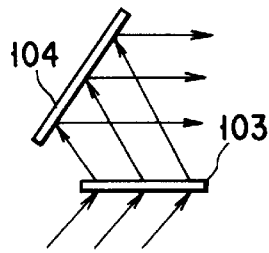
F I G. 4E
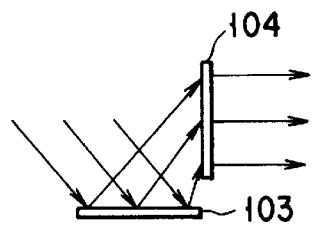
F I G. 4F
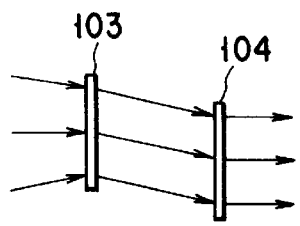
F I G. 5A
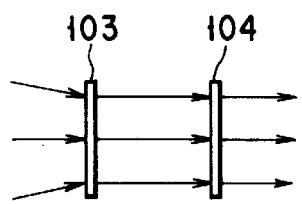
F I G. 5B
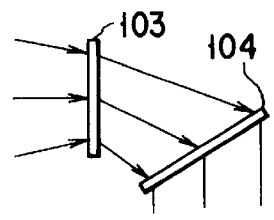
F I G. 5C
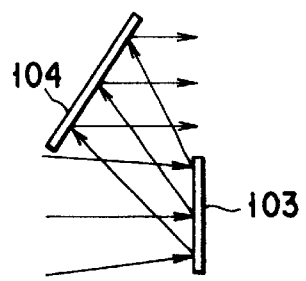
F I G. 5D
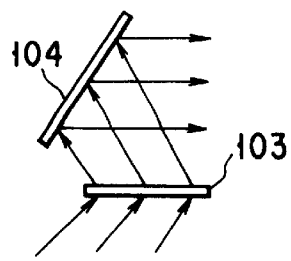
F I G. 5E
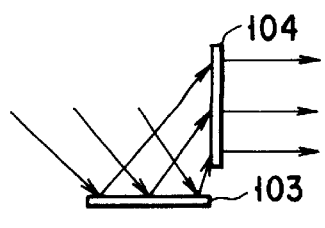
F I G. 5F

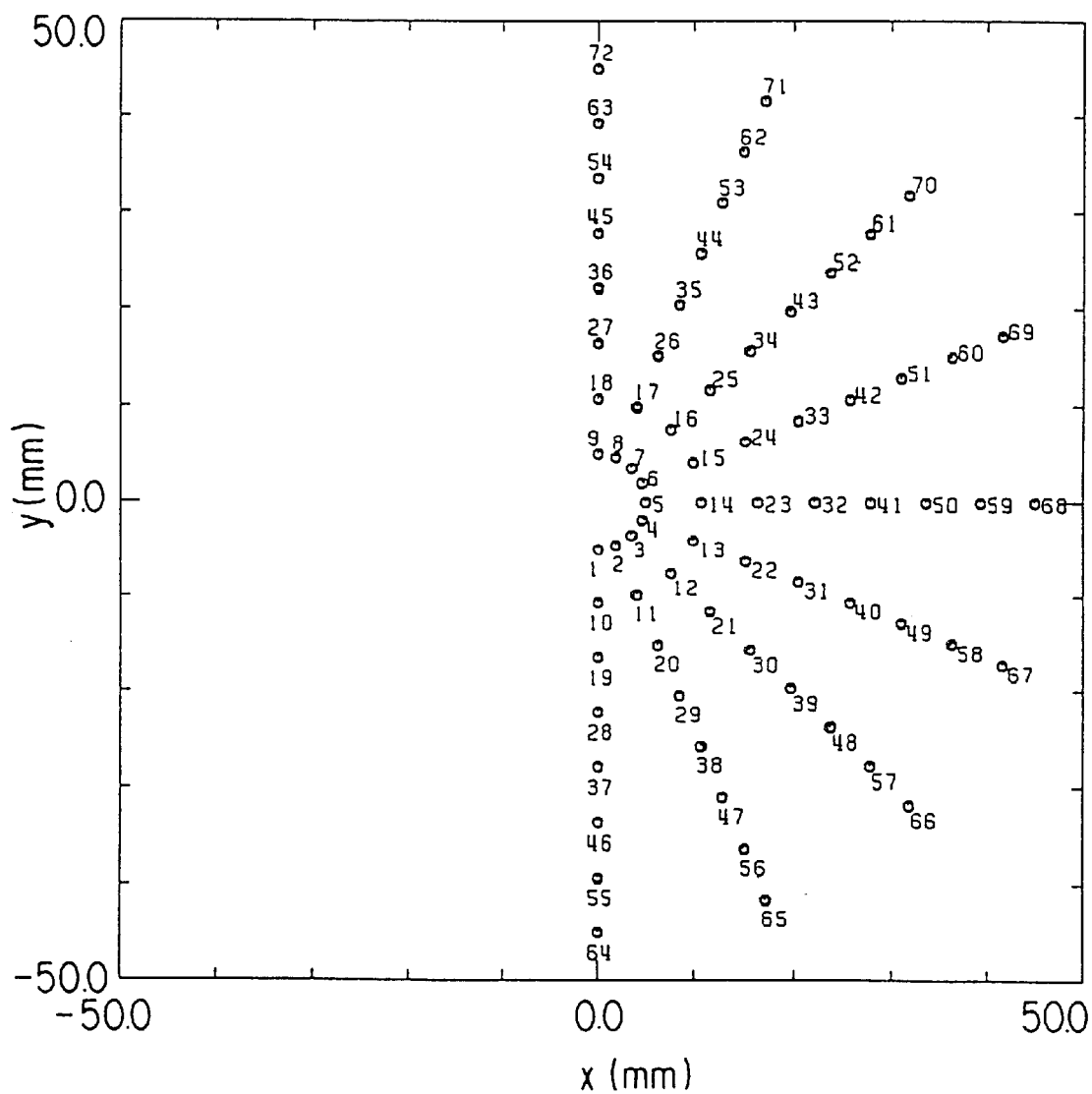
F I G. 13

| | |
|---|---|
| $C_1 = -0.427413322E-01$ | $C_1 = 0.200915597E-01$ |
| $C_2 = 0.279135723E-02$ | $C_2 = -0.678482233E-03$ |
| $C_3 = -0.117497897E-03$ | $C_3 = 0.494682026E-04$ |
| $C_4 = 0.194468794E-05$ | $C_4 = -0.147448100E-05$ |
| $C_5 = -0.133879468E-07$ | $C_5 = 0.376404650E-07$ |
| $C_6 = -0.156766600E-05$ | $C_6 = 0.193365101E-05$ |
| $C_7 = 0.281133737E-06$ | $C_7 = -0.550974335E-06$ |
| $C_8 = -0.165047247E-07$ | $C_8 = 0.515212477E-07$ |
| $C_9 = 0.388758803E-09$ | $C_9 = -0.193967487E-08$ |
| $C_{10} = -0.318612758E-11$ | $C_{10} = 0.255034882E-10$ |
| $C_{11} = 0.186818838E-02$ | $C_{11} = 0.792476535E-02$ |
| $C_{12} = -0.468728365E-03$ | $C_{12} = -0.113759283E-02$ |
| $C_{13} = 0.394037670E-05$ | $C_{13} = 0.107951477E-03$ |
| $C_{14} = -0.107044613E-07$ | $C_{14} = -0.311777058E-05$ |
| $C_{15} = 0.650834664E-10$ | $C_{15} = 0.487063438E-07$ |
| $C_{16} = -0.126506663E-07$ | $C_{16} = -0.102897729E-06$ |
| $C_{17} = 0.127691635E-08$ | $C_{17} = 0.149007313E-07$ |
| $C_{18} = -0.381926712E-10$ | $C_{18} = -0.698684666E-09$ |
| $C_{19} = 0.353253993E-12$ | $C_{19} = 0.105806839E-10$ |
| $C_{20} = 0.991609559E-04$ | $C_{20} = -0.319930550E-04$ |
| $C_{21} = -0.744111912E-05$ | $C_{21} = -0.774039961E-06$ |
| $C_{22} = 0.154574764E-06$ | $C_{22} = -0.186151851E-06$ |
| $C_{23} = -0.213872564E-08$ | $C_{23} = 0.197067678E-07$ |
| $C_{24} = -0.999544371E-11$ | $C_{24} = 0.816600343E-09$ |
| $C_{25} = 0.300816284E-12$ | $C_{25} = -0.713670234E-10$ |
| $C_{26} = 0.244430500E-14$ | $C_{26} = 0.148567270E-11$ |
| $C_{27} = 0.169604391E-05$ | $C_{27} = -0.106876896E-04$ |
| $C_{28} = -0.699982934E-07$ | $C_{28} = 0.800796670E-06$ |
| $C_{29} = 0.806614109E-09$ | $C_{29} = -0.139480001E-07$ |

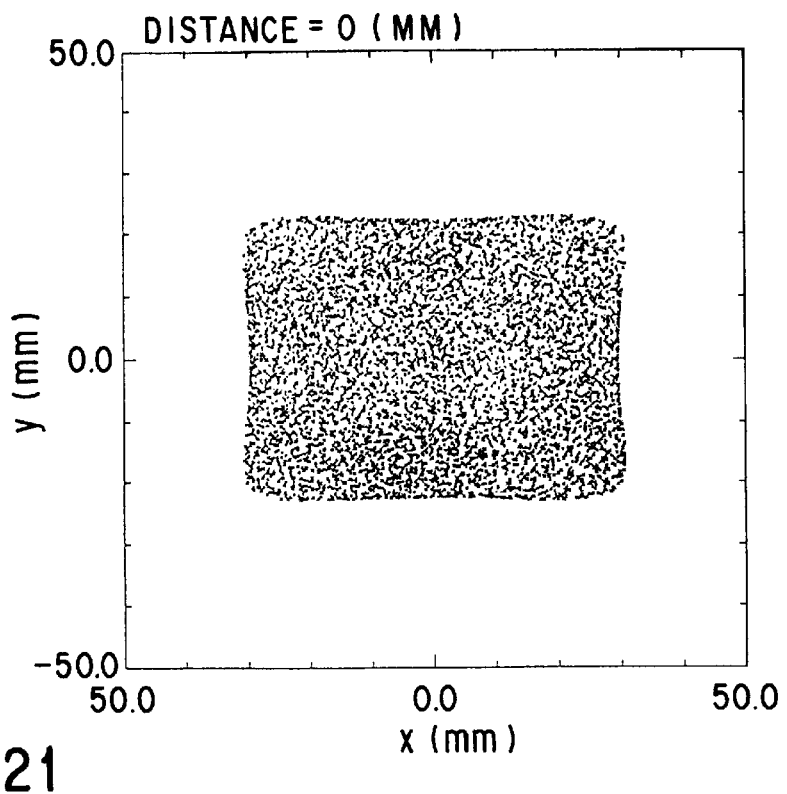
F I G. 21
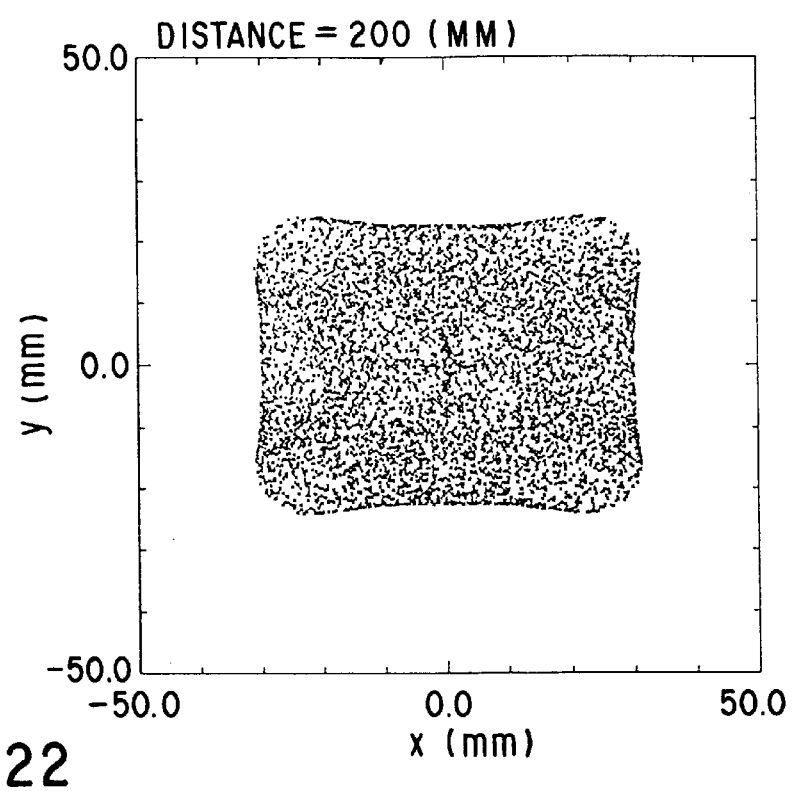
F I G. 22

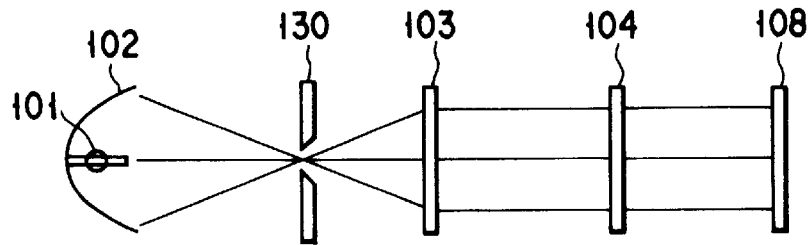
F I G. 26A
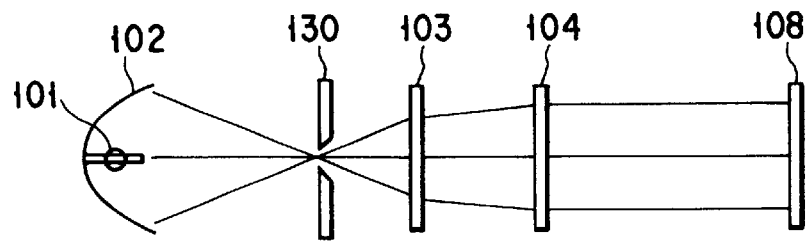
F I G. 26B
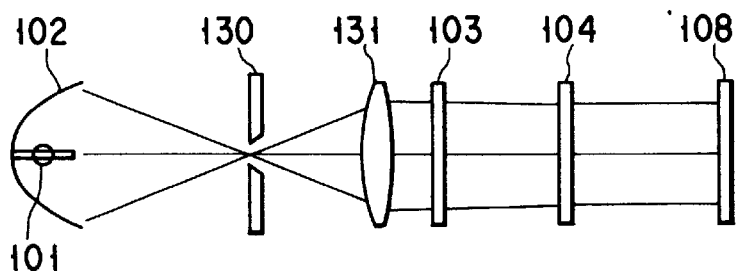
F I G. 27
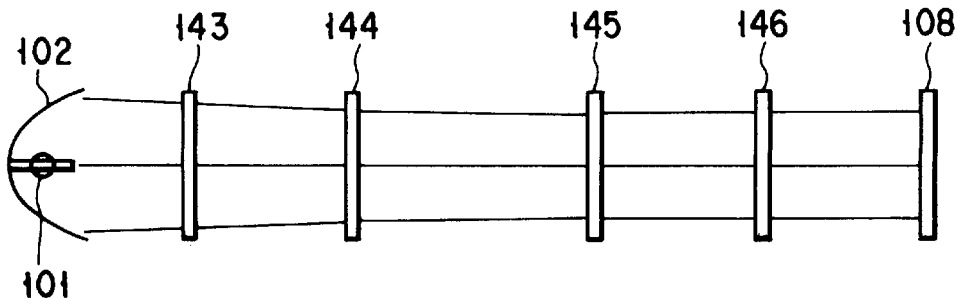
F I G. 28

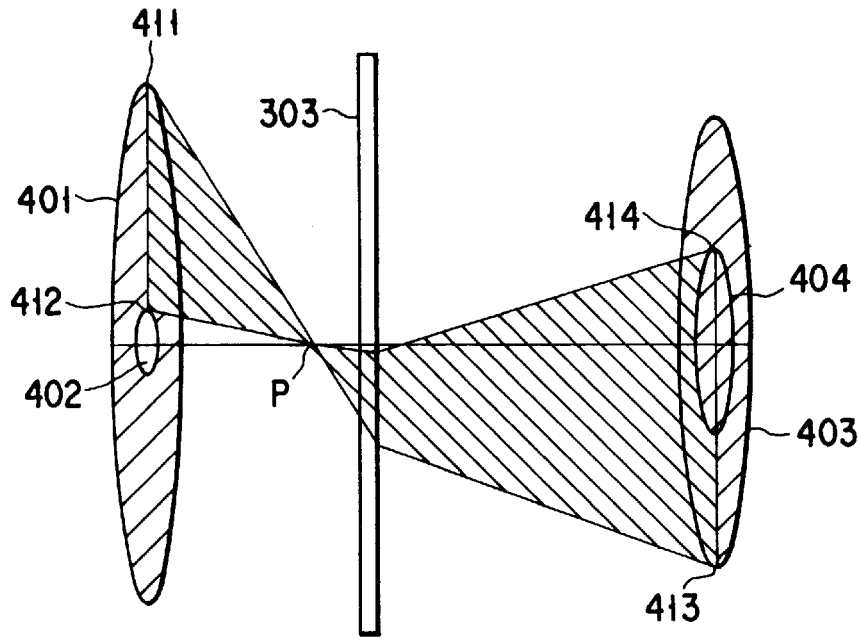
F I G. 31A
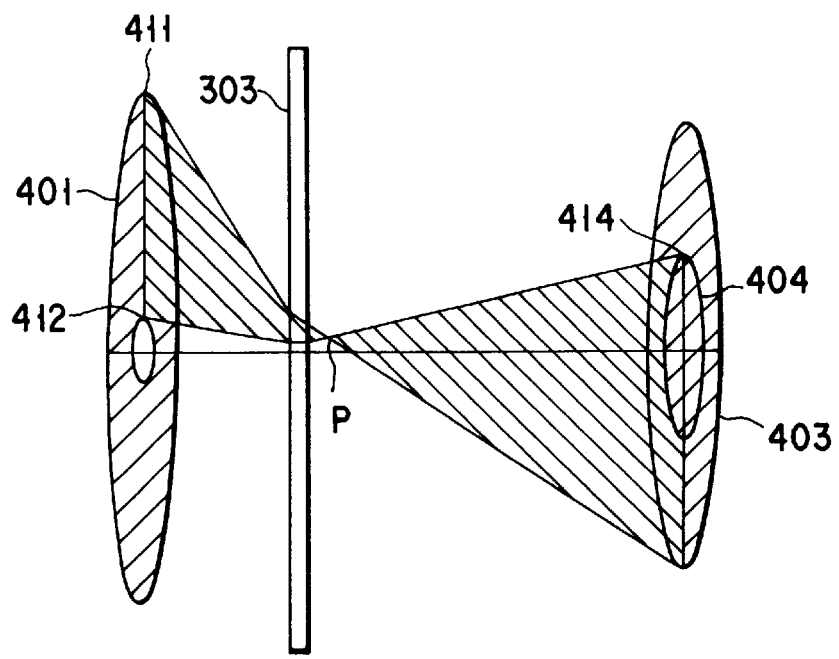
F I G. 31B

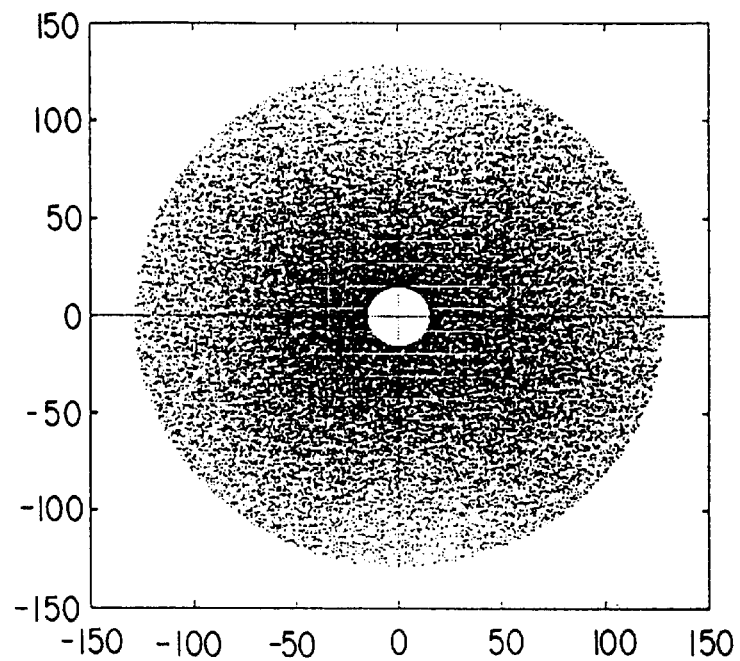
F I G. 32
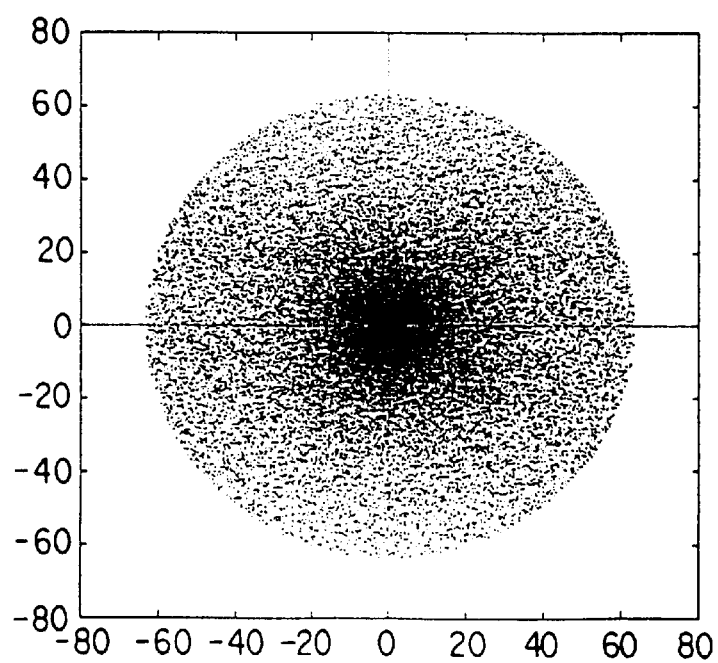
F I G. 33

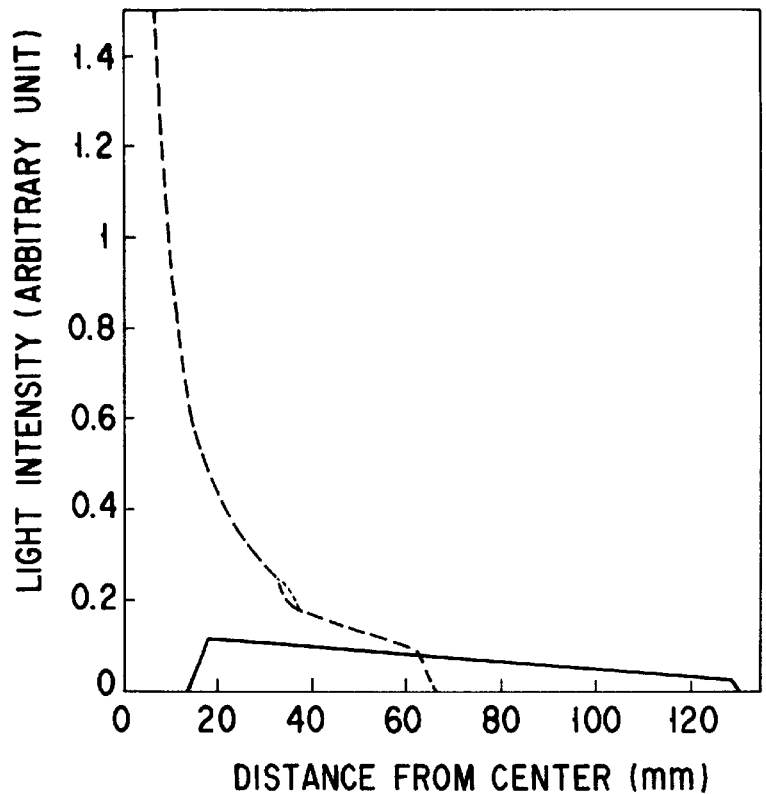
F I G. 34
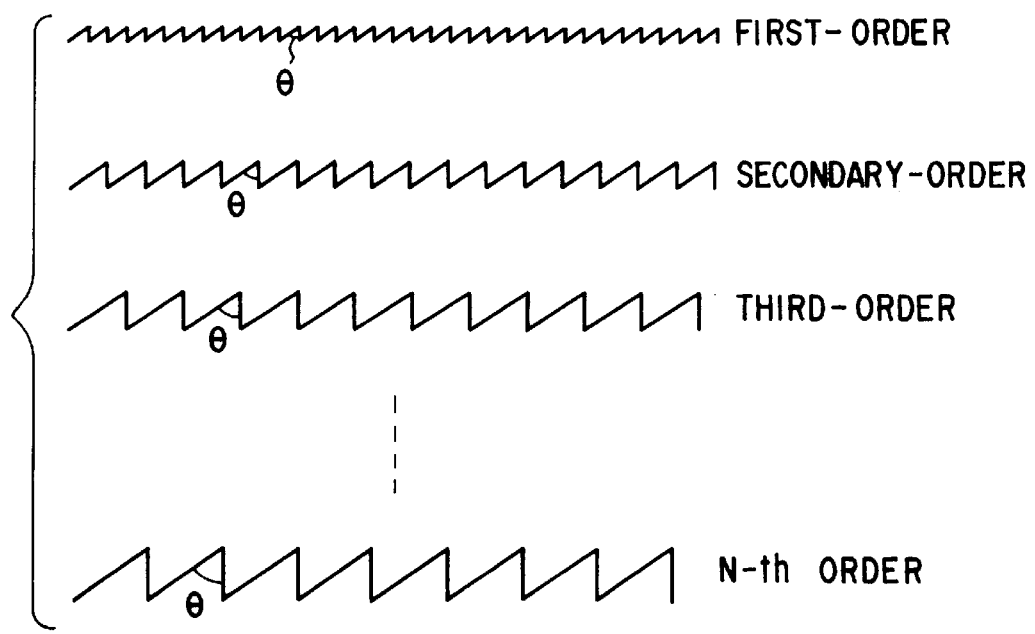
F I G. 35

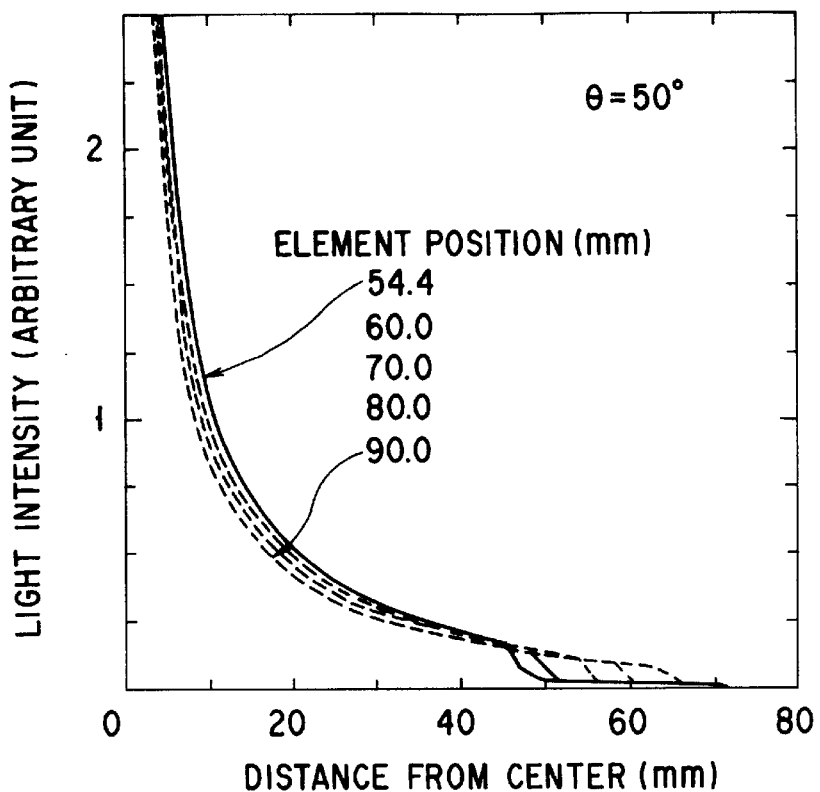
F I G. 36
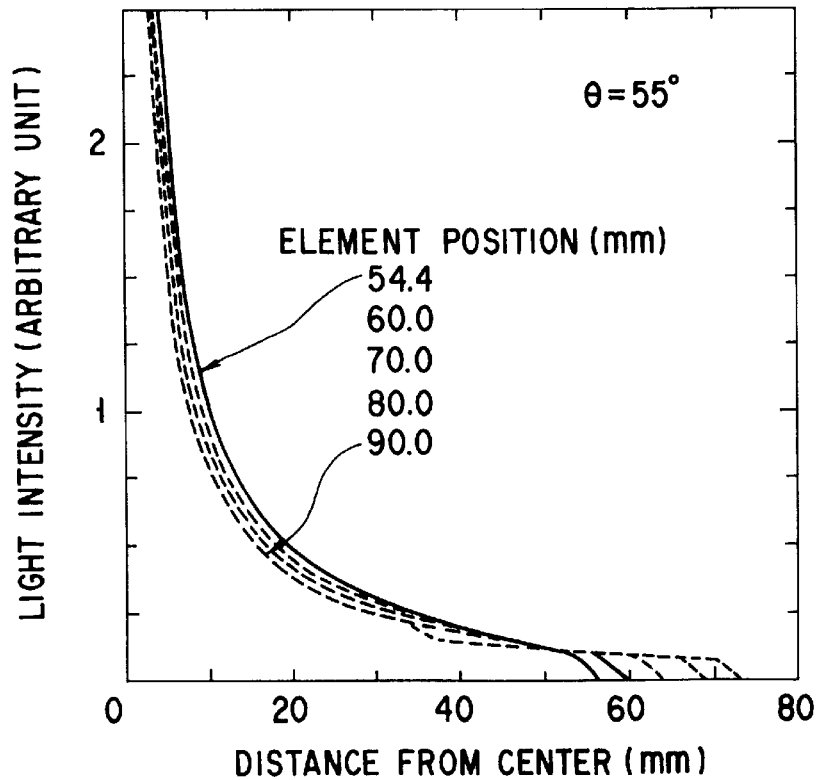
F I G. 37

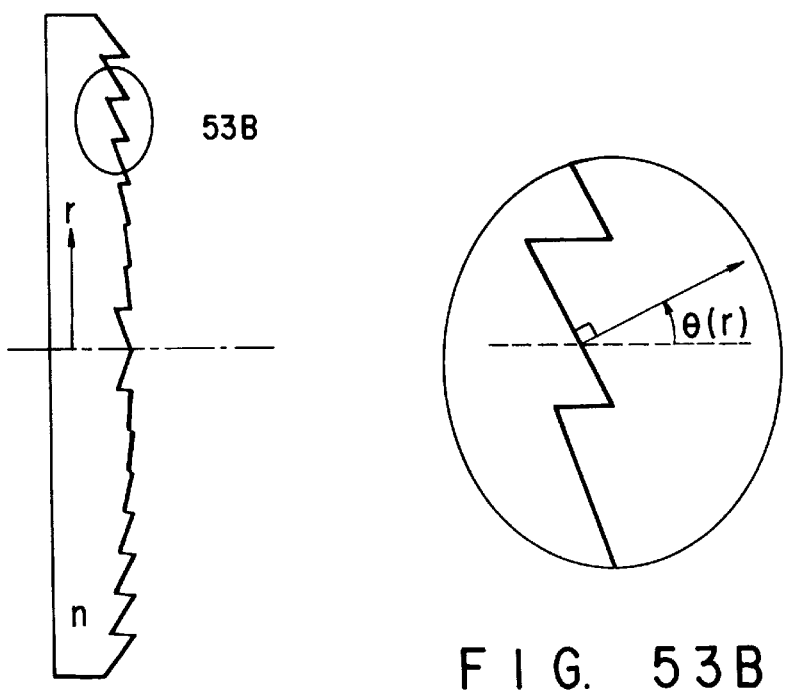
FIG. 53A
FIG. 53B
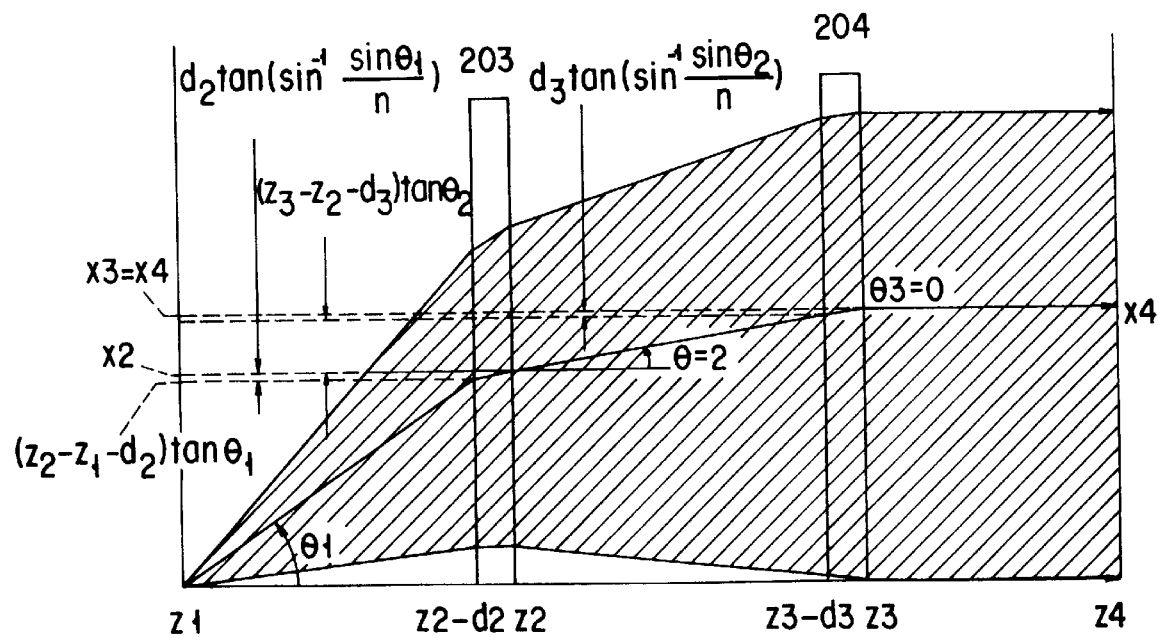
FIG. 54

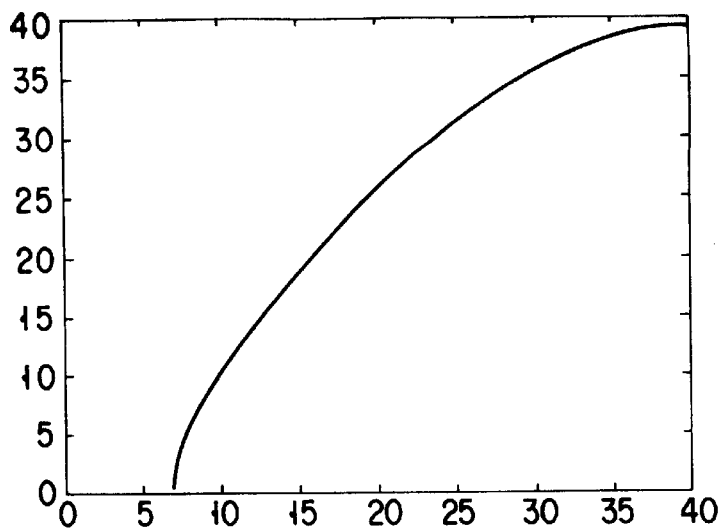
F I G. 55
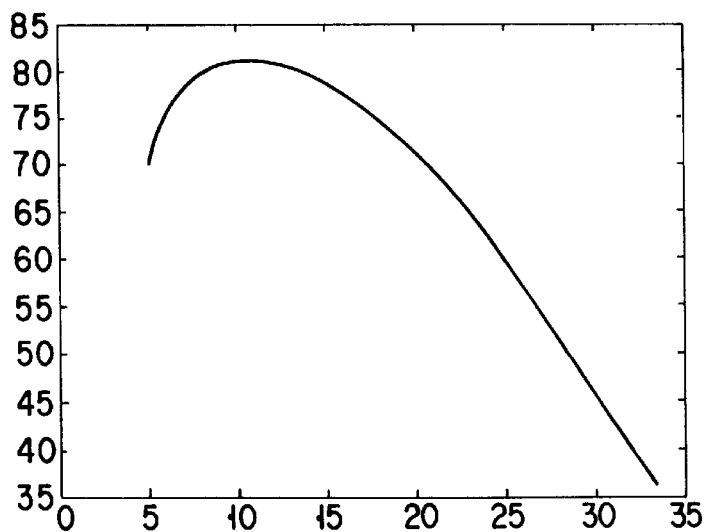
F I G. 56
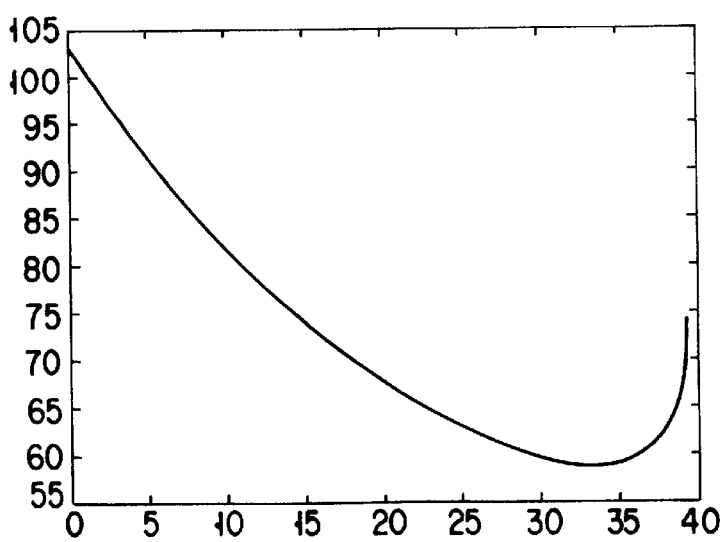
F I G. 57

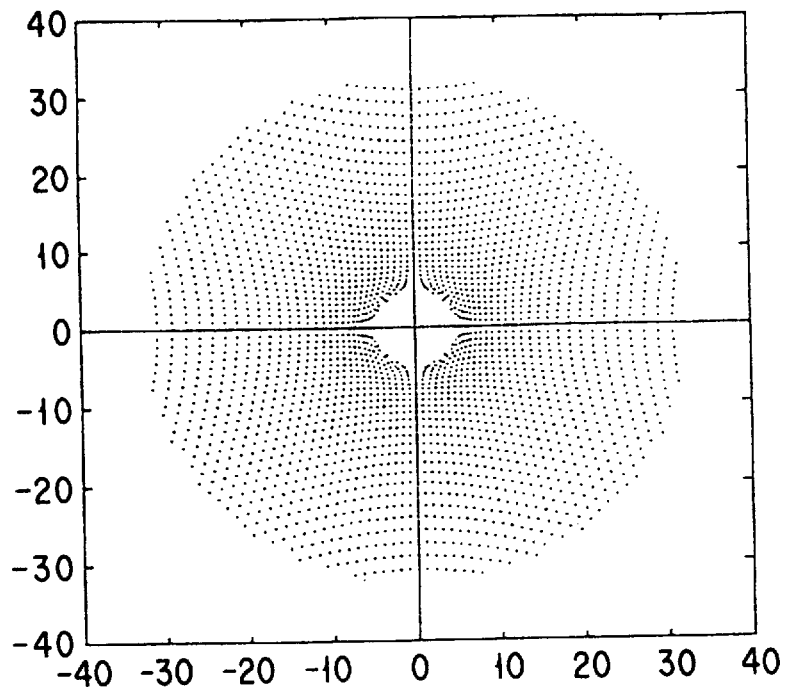
F I G. 59
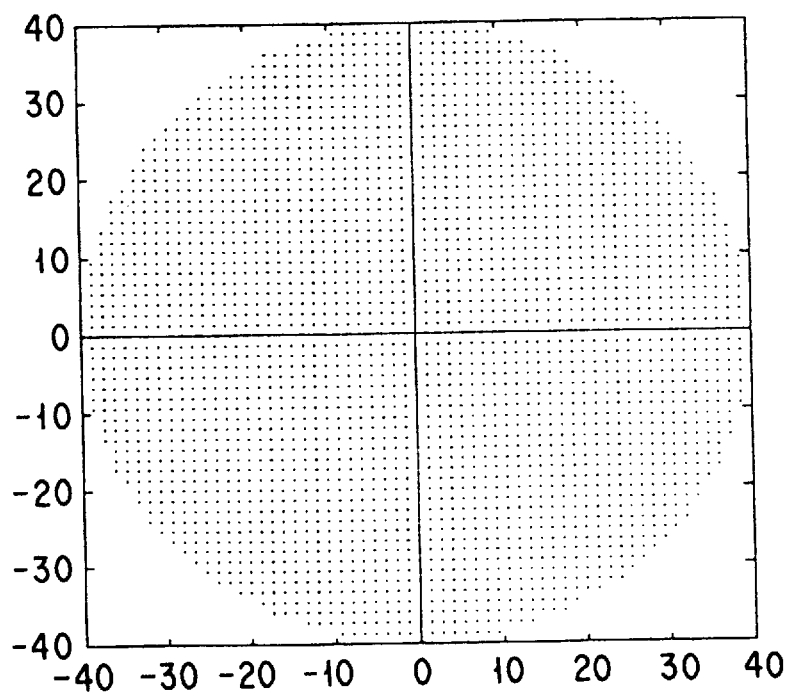
F I G. 60

OPTICAL ELEMENT AND OPTICAL DEVICE

BACKGROUND OF THE INVENTION

1. Field of the Invention

The present invention relates to an optical element and an optical device and, more particularly, to an optical device such as a projection type image display device or an optical information processing device using a spatial light modulator.

2. Description of the Related Art

As a large-screen image display device, a large-scale cathode ray tube has been developed. However, in order to meet a demand for a larger screen, a projection type display device has received a lot of attention. As the projection type display device, a projection type CRT display device which projects and displays an image displayed on a compact high-definition, high-luminance compact CRT, and a projection type liquid crystal display device which projects and displays light modulated by a liquid crystal panel are commercially available. In particular, the latter device is suitable for a compact, lightweight structure, and can be easily applied to domestic equipment.

FIG. 1 shows the typical arrangement of a conventional projection type liquid crystal display device. Referring to FIG. 1, light emitted by a high-luminance light source 1 such as a metal halide lamp is reflected by a reflector 2 to be collimated or converging light with a collimation, and the light is irradiated onto a liquid crystal panel 3. The light transmitted through the liquid crystal panel 3 is imaged and projected onto a screen 5 via a projection lens 4.

The projection method includes two types, i.e., a rear projection type for projecting an image from the rear side of the screen when viewed from an observer, and a front projection type for projecting an image from the same side as an observer. When a color image is to be displayed, a single-panel type device using a liquid crystal panel with three color filters (e.g., R (red), G (green), and B (blue) filters), a three-panel type device using three liquid crystal panels corresponding to the three color components, and the like are used. The three-panel type projection type liquid crystal display device includes a device which uses a dichroic mirror and the like to split light emitted by a light source into three color components, and projects these color components three projection lenses, and a device which synthesizes the split color components again using a dichroic mirror, and the like, and projects the synthesized light using a single projection lens.

In addition to the above-mentioned device using light transmitted through the liquid crystal panel, a reflection type display device which uses light reflected by a liquid crystal panel has also been developed. As the matrix type of the liquid crystal panel, a simple matrix, a thin film transistor, a thin film diode, and the like are available, and as the operation mode of a liquid crystal, various modes such as the TN mode, the STN mode, and the like are available. Recently, a system for controlling scattering and transmission of light using a polymer dispersed type liquid crystal has also been developed. In addition, a display system which uses an element having micro reflector arrays formed in a process similar to the manufacturing process of semiconductor integrated circuits has been developed.

FIG. 2 shows another arrangement of a conventional projection type liquid crystal display device. This device is disclosed in Jpn. Pat. Appln. KOKAI Publication No. 6-175129. This device improves the utilization efficiency of light by improving the convergence of light emitted by a light source to attain an improved contrast ratio and uniformity of a projected image, thus achieving a compact, strong structure.

Referring to FIG. 2, a light source 11 is disposed at the first focal point position of an spheroidal mirror 12. A conical prism 13 is disposed near the second focal point position of the spheroidal mirror 12. A light beam which is emitted by the light source 11 and is focused by the spheroidal mirror 12 is adjusted by the prism 13 to eliminate a dark area formed by the shadow of the light source 11 itself, and is focused at the central portion. The light beam transmitted through the prism 13 is projected onto a screen (not shown) via a collimator 14, a transmission type display element 15, a field lens 16, an aperture stop 17, and a projection lens 18. After the light beam is adjusted by the convex or concave surface of the prism, and is converted into a collimated beam by the collimator 14, the light beam is incident on the transmission type liquid crystal display element 15.

However, the above-mentioned projection image display device using a spatial light modulator such as a liquid crystal panel has a feature in that a large-screen display can be relatively easily attained, but it is difficult to assure sufficient brightness. Therefore, this device requires a dark room, and also requires large consumption power since a large-output lamp is used as a light source. In particular, the ratio of the power of light which reaches the screen of the light which is emitted by the light source, i.e., the utilization efficiency of light is as low as 1 to 2%. For this reason, an improvement of the utilization efficiency of light in the respective portions of an optical system from an illumination system to the screen via a color-separation system, a spatial modulating system (liquid crystal panel), a color synthesis system, and the projection lens is an important problem.

In particular, in the arrangement shown in FIG. 1, since the intensity distribution of the light beam has the shadow of the light source 1 itself at the central portion, a dark shadow appears at the center of the screen 5, thus posing a problem associated with the nonuniformity of brightness. In the arrangement shown in FIG. 2, the shadow of the central portion is eliminated by focusing light to the central portion using the conical prism 13. However, in the arrangement shown in FIG. 2, since the bulk-shaped prism 13 is disposed near the focal point of the light beam propagating from the spheroidal mirror 12, the light power is locally concentrated in a portion of the prism 13, and the shape of the prism tends to be thermally distorted, thus often causing destruction of the prism. In order to avoid this problem, when the position of the prism 13 is separated from a position near the focal point of the light, the utilization efficiency of the light further deteriorates. In order to prevent this, the area of the incident surface of the prism 13 must be increased, and as a result, the size, in the optical axis direction, of the prism 13 also increases, thus disturbing realization of a compact device.

SUMMARY OF THE INVENTION

It is an object of the present invention to provide an optical element for converting incident light into light with a desired beam shape, and an optical device using a spatial light modulator such as a projection type liquid crystal display device, which can improve the utilization efficiency of light emitted by a light source.

It is another object of the present invention to provide an optical device using a spatial light modulator such as a projection type liquid crystal display device, which can improve the uniformity of brightness of a light beam incident on the spatial light modulator, in addition to an improvement of the utilization efficiency of light emitted by the light source.

An optical element of the present invention is characterized by converting incident light having a predetermined shape and a predetermined light intensity distribution into output light having a desired shape and a predetermined intensity distribution. The output light has one of rectangular, circular, and elliptic shapes. At least one of a phase transfer function which represents an advance and delay amount of a phase to be given to a typical wavefront of the incident light, and a shape of a surface of the optical element is set on the basis of an optimization calculation.

According to the present invention, the optical element can convert incident light having a predetermined (arbitrary) beam shape and a predetermined (arbitrary) intensity distribution into light having a predetermined intensity distribution (hereinafter, referred to as a "uniform intensity distribution", since the beam is basically adjusted to a uniform intensity distribution) and a desired beam shape (e.g., a rectangular shape, an elliptic shape, and the like) with a simple arrangement (i.e., a single optical element).

The first optical device according to the present invention is characterized by comprising: a light source for radiating a light beam having a predetermined beam shape and a predetermined intensity distribution; a first optical element for shaping the beam shape of the incident light beam into one of rectangular, circular, and elliptic shapes having a uniform intensity distribution; and a second optical element for giving a collimation to the incident shaped light beam.

In the present invention, the beam shape of a light beam means a sectional shape in a plane perpendicular to the optical axis of the light beam, and the intensity distribution of the light beam means the distribution of light intensity in that plane.

According to one detailed embodiment of the first optical device, the first optical element shapes a light beam having a predetermined beam shape and intensity distribution, so that output light has an intensity distribution pattern at a predetermined position in which the intensity is relatively lowered at the central portion of the light beam and the intensity relatively increases at the marginal portion of the light beam when the element is disposed in the optical path of that light beam. For example, when the first optical element is disposed in the optical path of a light beam having an almost circular (or almost elliptical) beam shape, the intensity distribution, at a predetermined position, of its output light is almost square (or rectangular), or the width, in the oblique direction, of the intensity distribution is larger than those in the vertical and horizontal directions.

In the above-mentioned arrangement, a preferred embodiment of the first optical element is as follows.

(1) When the first optical element is disposed in the optical path of incident light having an almost circular (or almost elliptical) predetermined intensity distribution pattern in which the central intensity is higher than that of the marginal portion, the variation in intensity distribution, at a predetermined position, of output light is 40% or less in a predetermined rectangular (square or rectangular) region.

(2) When the first optical element is disposed in the optical path of incident light having an almost circular (or almost elliptical) predetermined intensity distribution pattern in which the central intensity is higher than that of the marginal portion, 70% or more of the total amount of output light are irradiated within the predetermined rectangular region.

(3) The phase transfer function, which represents a phase to be given to incident light depending on its incident position, of the first optical element is defined as a function having components of 4th-order or higher in association with the coordinates in addition to none, one, or a plurality of a linear function for giving deflection, an axial symmetry function for giving convergence, divergence, spherical aberration, and the like of the entire beam, and a function for giving convergence or divergence in only one direction like a columnar lens.

(4) The first optical element which satisfies (1) to (3) is constituted by a reflector having a surface shape which realizes a predetermined phase transfer function, or a transmission type optical element having at least one of a surface shape and a refractive index distribution, which realize the predetermined phase transfer function.

(5) When the first optical element has the surface shape which realizes the predetermined phase transfer function, the surface shape is discontinuous on a boundary line of the surface shape, that has a constant height from a predetermined reference plane, and is continuous in a plurality of regions divided by the boundary line.

(6) The first optical element can also be constituted by a diffraction type optical element of reflection or transmission type which realizes the predetermined phase transfer function. The diffraction type optical element is formed by a blaze grating which uses diffracted light of secondary-order or higher, and concentrates the intensity of diffracted light in a diffraction direction to be utilized.

(7) The first optical element comprises a transparent substrate which is disposed substantially perpendicularly to an optical axis of the light beam in an optical path of the incident light beam, and on a surface of which a trench defined by a plurality of curves is formed.

A preferred embodiment of the second optical element is as follows.

(1) The second optical element has a function of changing the optical path of an incident light beam depending on its incident position, and gives a collimation to a light beam having a beam shape and an intensity distribution which are shaped and uniformed by the first optical element.

(2) The phase transfer function, which represents a phase to be given to incident light depending on its incident position, of the above-mentioned second optical element is defined as a function having components of 4th-order or higher in association with the coordinates in addition to none, one, or a plurality of a linear function for giving deflection, an axial symmetry function for giving convergence, divergence, spherical aberration, and the like of the entire beam, and a function for giving convergence or divergence in only one direction like a columnar lens.

(3) The second optical element is constituted by a reflector having a surface shape which realizes a predetermined phase transfer function, or a transmission type optical element having at least one of a surface shape and a refractive index distribution, which realize the predetermined phase transfer function. More specifically, the optical element having the surface shape which realizes the predetermined phase transfer function is constituted such that the surface shape is discontinuous on a boundary line of the surface shape, that has a constant height from a predetermined reference plane, and is continuous in a plurality of regions divided by the boundary line.

(4) The second optical element can also be constituted by a diffraction type optical element of reflection or transmission type which realizes the predetermined phase transfer function. The diffraction type optical element is formed by a blaze grating which uses diffracted light of secondary-order or higher, and concentrates the intensity of diffracted light in a diffraction direction to be utilized.

In the first optical device, an incident light beam is passed through the first optical element to shape its beam shape into a rectangular or elliptical shape, and the second optical element gives a collimation to the light beam whose collimation is disturbed upon shaping of the beam shape. When a light beam emitted by the light source, which normally has a circular beam shape and a nonuniform light intensity distribution, is passed through the first and second optical elements, a light beam which has a beam shape similar to that of the spatial light modulator such as a liquid crystal panel normally having a rectangular shape and a uniform intensity distribution can be irradiated onto the spatial light modulator. For this reason, the utilization efficiency of light can be improved even when the same light source as in a conventional device is used, and the spatial light modulator can be illuminated with uniform brightness. In addition, the brightness and its uniformity as high as those in the conventional device can be attained by consumption power lower than that in the conventional device. Therefore, when the first optical device is applied to a projection type liquid crystal display device, an improvement of performance and a reduction of consumption power can be attained.

The second optical device according to the present invention is characterized by comprising: a first optical element which is disposed in an optical path of a light beam having a predetermined intensity distribution, and comprises a transparent substrate on a surface of which a trench having a tilt surface of a predetermined angle is concentrically or spirally formed; and a second optical element disposed in an optical path of the light beam which has passed through the first optical element, and adapted to give a collimation to the incident light beam.

In the second optical device, the intensity distribution of an incident light beam is uniformed by the first optical element which is constituted by forming concentric or spiral trenches each having an inclined surface of a predetermined angle on a transparent substrate, and a collimation is given to the light beam which has passed through the first optical element. Then, the light beam is incident on the spatial light modulator. More specifically, since the first optical element can provide a prism effect for diffracting a light beam by the trenches formed on the substrate surface, even when a light beam emitted by a light source system as an incident light beam has a dark area near its center, the dark area can be eliminated from an output light beam by moving light components of the marginal portion to the central portion, thus obtaining a uniform light intensity distribution.

Furthermore, unlike a bulk-shaped prism which diffracts light by its three-dimensional shape, the first optical element can radiate heat very efficiently since it is constituted by a transparent substrate on the surface of which trenches are formed, and can be formed to have a very low profile. Therefore, no strong cooler requires, then it is easy to cool the element. In addition, even when the first optical element is arranged near the focal point of a reflector arranged in the light source system, i.e., near the converging position of the incident light beam, there is no fear of destruction due to heat. For this reason, as compared to the bulk-shaped prism, the utilization efficiency of light can be improved. Thermal destroy can be prevented by using two elements architecture for obtaining a desired shaped light beam having a uniform intensity distribution by the first optical element and a collimation by the second optical element, since the elements can be allocated apart from near the focal point. Furthermore, since the thickness of the first optical element remains the same even when its aperture size increases, a compact element with a large aperture size can be formed, and can contribute to realization of a compact optical device.

Furthermore, in the second optical device, since the second optical element gives a collimation to the light beam which has passed through the first optical element, the utilization efficiency of light can be further improved.

In the third optical device according to the present invention, a first optical element having a characteristic (e.g., a refractive index distribution) in which a phase transfer function (phase delay amount) linearly decreases or increases outwardly on a plane perpendicular to the optical axis of a light beam is disposed in the optical path of the light beam having a predetermined beam shape and intensity distribution, and a second optical element for giving a collimation to the light beam is disposed in the optical path of the light beam which has passed through the first optical element, so that the light beam is guided toward a spatial light modulator via the first and second optical elements.

In the third optical device, the intensity distribution of an incident light beam is uniformed by the first optical element having the characteristic in which the phase transfer function linearly decreases or increases outwardly on the plane perpendicular to its optical axis, and a collimation is given to the light beam which has passed through the first optical element. Thereafter, the light beam is incident on the spatial light modulator. More specifically, since the first optical element has a prism effect based on the change in phase transfer function; as in the first optical element in the second optical device, even when the incident light beam has a dark area near its center, the dark area can be eliminated from an output light beam by moving light components of the marginal portion toward the central portion, thus providing an effect of obtaining a uniform light intensity distribution. In addition, since the first optical element with a very low profile can be formed by a transparent substrate whose phase transfer function is changed, heat can be radiated very well.

Therefore, according to the third optical device, even when the first optical element is arranged near the focal point of a reflector arranged in the light source system, i.e., near the converging position of the incident light beam, there is no fear of destruction due to heat, and the utilization efficiency of light can be improved as compared to a case using a bulk-shaped prism. Furthermore, since the thickness of the first optical element remains the same even when its aperture size increases, a compact element with a large aperture size can be formed, and can contribute to realization of a compact optical device. Heat destruction can be prevented by using two elements architecture, since the elements can be allocated apart from near the focal point.

Moreover, in the third optical device as well, since the light beam which has passed through the first optical element is passed through the second optical element to give a collimation thereto, the utilization efficiency of light can be further improved.

The fourth optical device according to the present invention is characterized by comprising: an optical element which is disposed near a converging point in an optical path of a converging light beam having a predetermined distribution, and comprises a transparent substrate on a surface of which a trench having a tilt surface of a predetermined angle is concentrically or spirally formed.

In the fourth optical device, since the same optical element as the first optical element in the second optical device is disposed near the converging point of the converging light beam and in front of the focal point in the propagation direction of the light beam, a light beam with a high collimation can be incident on the spatial light modulator without using the second optical element, thus obtaining a uniform intensity distribution and improving the utilization efficiency of light.

The fifth optical device according to the present invention is characterized by comprising: an optical element which is disposed near a converging point in an optical path of a converging light beam having a predetermined distribution and in front of the converging point in a propagation direction of the light beam, and has a characteristic in which a phase transfer function linearly decreases outwardly from an optical axis on a plane perpendicular to the optical axis of the light beam.

In the fifth optical device as well, since the same optical element as the first optical element in the third optical device is disposed near the converging point of the converging light beam and in front of the converging point in the propagation direction of the light beam, a light beam with a high collimation can be incident on the spatial light modulator without using the second optical element, thus obtaining a uniform intensity distribution and improving the utilization efficiency of light.

The sixth optical device according to the present invention is characterized by comprising: an optical element which is disposed near a converging point in an optical path of a converging light beam having a predetermined distribution and behind the converging point in a propagation direction of the light beam, and has a characteristic in which a phase transfer function linearly increases outwardly from an optical axis on a plane perpendicular to the optical axis of the light beam.

In the sixth optical device as well, since the same optical element as the first optical element in the third optical device is disposed near the converging point of the converging light beam and behind the converging point in the propagation direction of the light beam, a light beam with a high collimation can be incident on the spatial light modulator without using the second optical element, thus obtaining a uniform intensity distribution and improving the utilization efficiency of light.

As described above, according to the present invention, a light beam output from the light source can be shaped to a light beam having a desired beam shape and intensity distribution while effectively maintaining its power and assuring a collimation and high efficiency. Thus, the liquid crystal panel can be illuminated with a uniform light beam with a rectangular or circular beam shapes, thus realizing a display device which has uniform brightness in the screen and good image quality. More specifically, a dark marginal portion of the screen as a problem of the conventional device can be eliminated, and a liquid crystal projection type display device with a brighter screen than the conventional device can be realized while the consumption power remains the same. In other words, a screen having the same brightness as that of the conventional device can be realized by a device which requires a smaller consumption power than that in the conventional device.

The present invention provides means for converting a circular light beam into a rectangular beam, which means is effective not only for white light but also for a laser beam. Therefore, the present invention can be applied not only to a display device but also to a wide application range in which it is required to efficiently illuminate a rectangular region. For example, even when the present invention is applied to an arithmetic or information processing apparatus or an image processing apparatus, a reduction of the consumption power and an improvement of the performance owing to an improved irradiation intensity can be obtained as effects.

Furthermore, according to the present invention, a dark area can be eliminated from a light beam having a dark area at the central portion of the light intensity distribution of its beam section using the optical element, and the uniformity of the light beam can be improved. In addition, the optical element of the present invention is hardly destroyed by heat as compared to a bulk-shaped cone lens, and a large-scale element with a very low profile can be formed. For this reason, since the degree of freedom in design is very high, a compact optical device having a large aperture size and a large light amount can be realized.

In the optical element, the output light of the central portion is lighter (brighter) than that of the peripheral portion. The optical element further comprises a concentric or spiral trench, and an inclination angle of a slant face of the trench is set to establish the following relationship when Li(ri)=an intensity distribution on light on an incident surface of the optical element of light being incident onto the optical element, Lo(ro)=an intensity distribution on light on a predetermined surface, Li(ri)=0 when ri>rimax, and Lo(ro)=0 when ro>romax:

$$\int_0^{ri} Li(r') \cdot 2\pi r' dr' \Big/ \int_0^{rimax} Li(r') \cdot 2\pi r' dr' = \int_0^{r0} Lo(r') \cdot 2\pi r' dr' \Big/ \int_{0.}^{romax} L0(r') \cdot 2\pi r' dr'$$

Since the optical element of the present invention has a fine trench on its surface, the light beam is bent so that a prism effect can be generated. Thereby, even if light coming from the light source has a dark area in the vicinity of the central portion, light of the peripheral portion can be moved to the central portion and the dark area can be eliminated. Also, as compared with a bulk shaped prism in which light is bent by a solid shape, light is bent by a shape formed on the surface in the optical element of the present invention. Due to this, it is unnecessary to provide the solid shape, the extremely thin optical element can be formed, so that heat dispersion is extremely good.

Moreover, since the thickness may be the same even if the diameter is enlarged, the compact element having a large diameter can be formed.

Since an inclination angle of a slant face of the trench is set every radius around the optical axis, the intensity distribution on light in the radius direction of the optical element can be freely controlled. With this feature, the luminescence area of the center can be disappeared. Moreover, since the angle of the slant face of the trench of the second optical element to which light is incident after obtaining the target intensity distribution is set every radius, collimation of the light beam in the radius direction of the optical element can be freely controlled.

An optical device according to the present invention is characterized by comprising: at least one first optical element for converting an incident light having a predetermined shape and a predetermined intensity distribution to a predetermined shaped output light having a uniform intensity distribution. The output light of the central portion is lighter (brighter) than that of the peripheral portion. The first element has a concentric or spiral trench, and an inclination angle of a slant face of the trench is set to establish the following relationship when Li(ri)=an intensity distribution on light on an incident surface of the optical element of light being incident onto the optical element, Lo(ro)=an intensity distribution on light on a predetermined surface, Li(ri)=0 when ri>rimax, and Lo(ro)=0 when ro>romax:

$$\int_0^{ri} Li(r') \cdot 2\pi r' dr' \bigg/ \int_0^{rimax} Li(r') \cdot 2\pi r' dr' = \left( \int_0^{ro} Lo(r') \cdot 2\pi r' dr' \right) \bigg/ \left( \int_{0,}^{romax} Lo(r') \cdot 2\pi r' dr' \right)$$

where ri: a position from an optical axis of an incident light, rimax: a position furthest from the optical axis of the incident surface of the optical element, ro: a position from the optical axis on the predetermined surface of an output light beam corresponding to the incident light beam, and romax: a position furthest from the optical axis on the predetermined surface where the output light beam can be arrived.

The optical device is characterized by further comprising at least one second optical element having a concentric or spiral trench having a slant face whose angle changes in accordance with a distance from a central axis such that a predetermined collimation is provided to the predetermined shaped light having a uniform intensity distribution.

A projection type image liquid crystal display device is characterized by comprising: a light source for outputting a light beam having a predetermined shape and a predetermined intensity distribution; at least one first optical element for shaping the beam shape of the light beam to be incident to a predetermined shape having a uniform intensity distribution; a second optical element for providing collimation to the shaped light beam to be incident; a liquid crystal panel for inputting the light beam having the collimation thereto so as to be passed through a predetermined portion to display a predetermined image; and a screen for displaying light passed through the liquid crystal panel.

In the optical device to which the optical element of the present invention is applied, the compact optical element having a large diameter is used, thereby obtaining the optical device which is compact and has high performance.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a view showing the arrangement of an optical system of a projection type liquid crystal display device according to the first embodiment of the present invention;

FIGS. 4A to 4F are views showing various examples of the dispositions of a first optical element for converting an intensity distribution and a second optical element for giving a collimation in the first embodiment;

FIGS. 5A to 5F are views showing various other examples of the dispositions of the first optical element for converting an intensity distribution and the second optical element for giving a collimation in the first embodiment;

FIG. 13 is a view showing the positions of sample light rays on the surface of the first optical element;

FIG. 21 is a graph showing the positions of light rays which are deflected by the first optical element and reach the second optical element;

FIG. 22 is a graph showing the distribution of light rays obtained when light rays output from the second optical element propagate by 20 cm;

FIGS. 26A and 26B are views showing the arrangement of an illumination optical system in a projection type liquid crystal display device according to the fourth embodiment of the present invention;

FIG. 27 is a view showing the arrangement of the illumination system in which a lens is inserted in front of the first optical element;

FIG. 28 is a view showing the arrangement of an illumination optical system in a projection type liquid crystal display device according to the fifth embodiment of the present invention;

FIGS. 31A and 31B are views showing principal part of an optical system to explain the effect of the sixth embodiment;

FIG. 32 is a graph showing the intensity distribution of a light beam incident on an optical element to explain the effect of the sixth embodiment;

FIG. 33 is a graph showing the intensity distribution of a light beam output from the optical element to explain the effect of the sixth embodiment;

FIG. 34 is a graph showing the light intensities of the incident and output light beams of the optical element in the sixth embodiment and the output light beam from a conventional cone prism with respect to the distance from the center of the optical axis;

FIG. 35 is a view showing the trench shapes used when the optical element of the sixth embodiment utilizes high-order diffracted light;

FIG. 36 is a graph showing the light intensity distribution of the output light beam using the element position as a parameter when the tilt angle of the trench of the optical element of the sixth embodiment is set to be θ=50°;

FIG. 37 is a graph showing the light intensity distribution of the output light beam using the element position as a parameter when the tilt angle of the trench of the optical element of the sixth embodiment is set to be θ=55°;

FIGS. 53A and 53B are cross sectional views of an optical element;

FIG. 54 is a view showing an example of design of optical elements in a case where light intensity is uniformed by the first optical elements and collimation is improved by the second optical element;

FIG. 55 is a view showing an example of design in which an output angle from a point light source and an arrival position in a case where two optical elements are used;

FIG. 56 is a view showing an example of design of the first optical elements;

FIG. 57 is a view showing an example of design of the second optical element;

FIG. 59 is a view showing a dot diagram of the light beam on the optical element closest to the light source; and FIG. 60 is a view showing a dot diagram of the light beam on a surface where a target light density distribution is to be obtained.

DETAILED DESCRIPTION OF THE PREFERRED EMBODIMENTS

Figure 1:
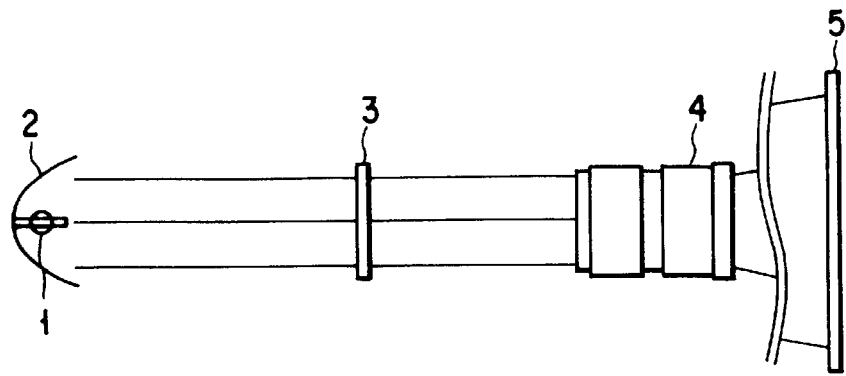
FIG. 1 is a schematic view showing the arrangement of an optical system of a conventional transmission type liquid crystal display device.
Figure 2:
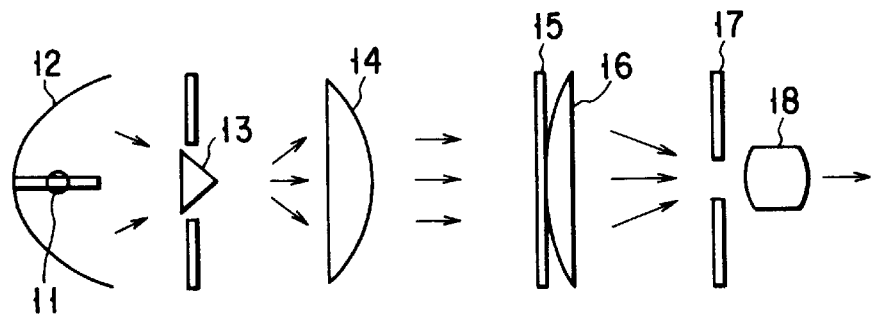
FIG. 2 is a schematic view showing the arrangement of an optical system of another conventional transmission type liquid crystal display device.
Figure 6A:
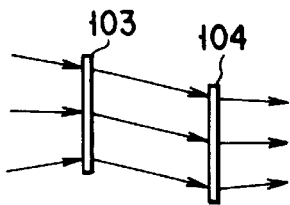
FIGS. 6A to 6F are views showing various other examples of the dispositions of the first optical element for converting an intensity distribution and the second optical element for giving a collimation in the first embodiment.
Figure 6B:
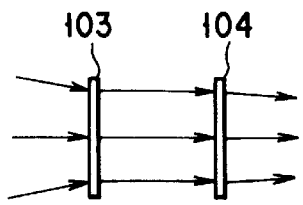
Figure 6C:
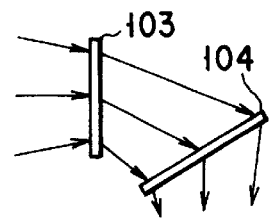
Figure 6D:
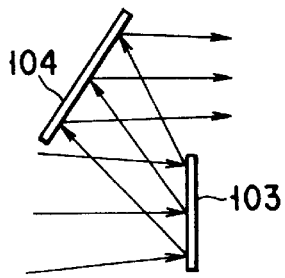
Figure 6E:
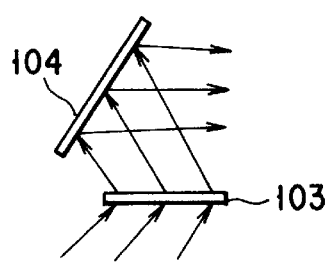
Figure 6F:
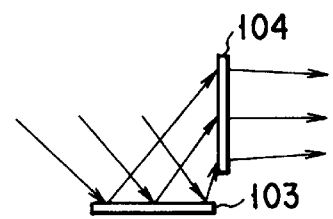
Figure 7A:
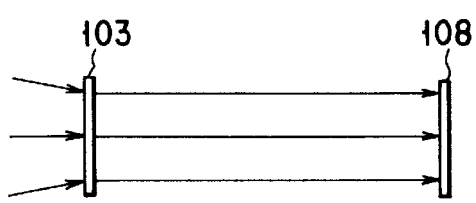
FIGS. 7A to 7D are views showing the relationship between a liquid crystal panel and an optical element for converting an intensity distribution in a projection type liquid crystal display device according to the second embodiment of the present invention.
Figure 7B:
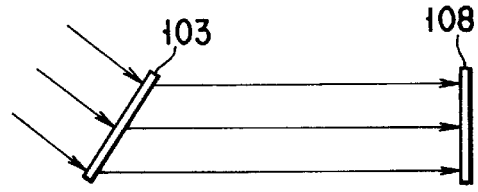
Figure 7C:
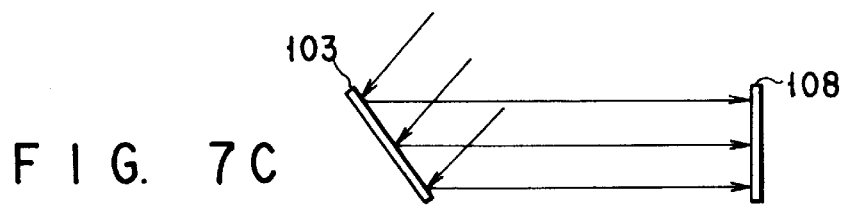
Figure 7D:
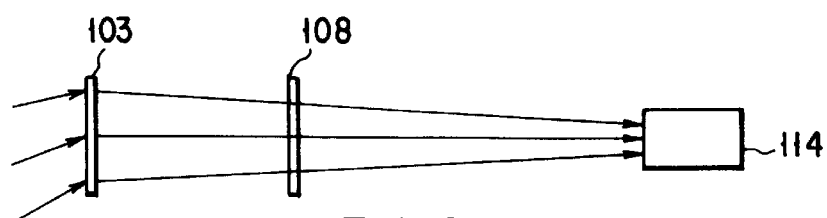

The preferred embodiments of the present invention will be described hereinafter with reference to the accompanying drawings.

(First Embodiment)

FIG. 3 is a view showing the arrangement of an optical system in a projection type liquid crystal display device according to the first embodiment of the present invention. Referring to FIG. 3, light (white light) emitted by a light source 101 such as a metal halide lamp is reflected by a reflector 102 having a paraboloidal shape and is converted into an almost parallelly collimated light beam.

The light beam passes, in turn, through a first optical element 103 for shaping the beam shape and uniforming the light intensity distribution in accordance with the present invention, and a second optical element 104 for giving a collimation to the light beam, so as to be converted into a light beam which has a rectangular beam shape, a uniform intensity distribution, and a high collimation. The light beam which has passed through the first and second optical elements 103 and 104 is separated into three color components by a dichroic mirror 105 which transmits only light components having wavelengths near red, and a dichroic mirror 106 which transmits only light components having wavelengths near green and reflects light components having wavelengths near blue, and these color components are modulated by liquid crystal panels 108 to 110 for displaying images corresponding to the respective wavelength components using a cold mirror 107 as well.

The light beams modulated by the liquid crystal panels 108 to 110 are synthesized by a cold mirror 111 and dichroic mirrors 112 and 113, and the synthesized light beam is projected onto a screen 115 via a projection lens 114, thus displaying a color image on the screen 115. When a transmission type screen is used as the screen 115, the screen is assembled in an apparatus together with a projection device. However, when a reflection type screen is used as the screen 115, the screen may be assembled in an apparatus together with a projection device, or the components from the light source to the projection lens may be integrated as a projection device which uses a stand-alone screen. The present invention is not limited to these arrangements, and includes either arrangement.

In order to improve the utilization efficiency of light and to reduce the aperture of the projection lens, a field lens may be inserted immediately after the liquid crystal panels. In order to attain size, weight, and cost reductions of the device, the present invention may be applied to a single-panel type device which uses a single liquid crystal panel having color filters without using the three liquid crystal panels. Thus, the present invention is not limited to any specific number of panels. The single-panel type device can reduce the number of constituting parts since it does not require any dichroic mirrors and cold mirrors for color separation and color synthesis. Furthermore, the transmission type liquid crystal panels are used as spatial light modulators. Alternatively, reflection type liquid crystal panels may be used, or micro-mirror arrays may be used in place of the liquid crystal panels. Thus, the present invention is not limited to any specific type of spatial light modulator.

Although the present invention is not limited to the projection type device, since the liquid crystal display device uses rectangular liquid crystal panels, the first optical element 103 typically shapes the beam shape into a rectangular shape.

FIGS. 4A to 4F show various examples of the dispositions of the first optical element 103 for shaping the beam shape of an incident light beam and uniforming its intensity distribution, and the second optical element 104 for giving a collimation to the light beam.

In FIG. 4A, the first optical element 103 which comprises a transmission type optical element for shaping the beam shape of a parallelly incident light beam, uniforming the intensity distribution of the light beam, and deflecting the propagation direction of the light beam is disposed parallel to the second optical element 104 which comprises a transmission type optical element for giving a collimation to the light beam, and deflecting the light beam. This disposition is the same as that of the first and second optical elements 103 and 104 shown in FIG. 3.

The first optical element 103 is designed, so that a light beam output therefrom has a predetermined beam shape and intensity distribution at the position of the second optical element 104. On the other hand, the optical element 104 is designed so that an incident light beam is output as a light beam with a high collimation. In this example, the propagation direction of light incident on the optical element 103 is parallel to that of light output from the optical element 104, but they need not always be parallel to each other. Since each of the first and second optical elements 103 and 104 has a deflection effect, incident light and output light have different directions. With this arrangement, especially when the first and second optical elements 103 and 104 comprise diffraction elements, since fringe grating patterns are formed, the design and manufacture of the elements are facilitated.

FIGS. 4B to 4F show other examples of the dispositions of the first and second optical elements 103 and 104. In FIGS. 4B to 4F, the first optical element 103 has a function of shaping the beam shape and uniforming the intensity distribution, and the second optical element 104 has a function of giving a collimation as in FIG. 4A.

Of FIGS. 4B to 4F, FIG. 4B shows an example wherein the first and second optical elements 103 and 104 have no deflection effect to pass light straight, and FIG. 4C shows an example wherein both the first and second optical elements 103 and 104 have a deflection effect to bend the optical axis. FIG. 4D shows an example wherein reflection type elements are combined as the first and second optical elements 103 and 104, FIG. 4E shows an example wherein the optical element 103 comprises a transmission type element, and the optical element 104 comprises a reflection type element, and FIG. 4F shows an example wherein the optical element 103 comprises a reflection type element and the optical element 104 comprises a transmission type element, contrary to FIG. 4E.

One of the characteristic features of the present invention is the high degree of freedom for the disposition of the first and second optical elements 103 and 104, and the present invention is not limited to those shown in FIGS. 4A to 4F but include optical devices in which optical elements having the same functions as described above are disposed. The disposition of the first and second optical elements 103 and 104 can be selected in correspondence with the arrangement of the entire device, and the strictness of requirements for easy operation, adjustment, and the like, easy manufacture, a compact device, and the like.

FIGS. 5A to 5F are views showing other examples of the dispositions of the first optical element 103 for shaping the beam shape and uniforming the intensity distribution, and the second optical element 104 for giving a collimation. In these examples, light incident on the first optical element 103 is converging light while it is collimated light in FIGS. 4A to 4F. The examples of the dispositions shown in FIGS. 5A to 5F respectively correspond to those in FIGS. 4A to 4F. As still other examples, light incident on the first optical element 103 may be diverging light. Depending on these states of the incident light, the detailed arrangement of the optical element 103 is different from that in FIGS. 4A to 4F.

In the optical device using one of the dispositions shown in FIGS. 5A to 5F, light emitted by the light source is not collimated but converged or diverged by a lens, a reflector, and the like. For example, when the reflector has a spheroidal shape, and the light source is located at one focal point of the reflector, light reflected by the reflector is converged toward the other focal point. If the optical element is located inside this focal point, the incident light becomes converging light; if the optical element is located outside the focal point, the incident light becomes diverging light. On the other hand, diverging light emitted by the light source may be directly used without using a lens, a reflector, and the like.

As described above, since the beam spot size can be easily enlarged or reduced using converging or diverging light, the arrangement of the optical device may be freely modified in correspondence with the relationship between the spatial light modulators and light source to be used. Note that the function of enlarging/reducing the beam spot size may also be realized by the first and second optical elements 103 and 104. For this reason, this function can be provided to at least one optical element, and the present invention is not limited in terms of selection of an element which is to have this function.

FIGS. 6A to 6F are views showing other examples of the dispositions of the first optical element 103 for shaping the beam shape and uniforming the intensity distribution, and the second optical element 104 for giving a collimation. In these examples, the output light from the second optical element 104 is converging light while it is collimated light in FIGS. 4A to 4F and FIGS. 5A to 5F. The examples shown in FIGS. 6A to 6F respectively correspond to those in FIGS. 4A to 4F or FIGS. 5A to 5F. As still other examples, the output light from the second optical element 104 may be diverging light. Depending on these states of the output light, the detailed arrangement of the optical element 104 becomes different from those in FIGS. 4A to 4F or FIGS. 5A to 5F. In FIGS. 6A to 6F, converging light is incident on the first optical element 103. However, this incident light may be diverging light or collimated light.

The output light from the second optical element 104 reaches the spatial light modulator such as a liquid crystal panel (not shown). The spatial light modulator exhibits the best modulating characteristic when light is incident on the incident surface at a predetermined angle (e.g., 90°), but can realize a sufficient characteristic if the incident angle falls within a predetermined allowable range. The degree of convergence or divergence of the output light from the optical element 104 must be set so that the incident angle of the light on the spatial light modulator falls within the predetermined allowable range.

It is advantageous to set the output light from the optical element 104 in a converging or diverging state since transmission of light to the subsequent optical system can be effectively attained. More specifically, in the projection type liquid crystal display device shown in FIG. 3, a bright display state is obtained when many light components output from the liquid crystal panels 108 to 110 reach the screen 115 via the projection lens 114. For this purpose, it is preferable to irradiate a slightly converging light beam onto the liquid crystal panels 108 to 110. In this case, a method of using a field lens immediately after the liquid crystal panels may be used. However, when the output light from the optical element 104 is set in a converging state, as shown in FIGS. 6A to 6F, an optical element for converging light can be omitted, thus realizing a more simple, lower-cost optical device.

(Second Embodiment)

A projection type liquid crystal display device according to the second embodiment of the present invention will be described below. In this embodiment, the arrangement of the optical system is substantially the same as that in the first embodiment, except that only a (first) optical element 103 for shaping the beam shape of an incident light beam and uniforming the intensity distribution of the light beam is used, and a (second) optical element 104 for giving a collimation used in the first embodiment is omitted from the arrangement of the display device.

FIGS. 7A to 7D show the relationship between the optical element 103 for shaping the beam shape and uniforming the intensity distribution, and the liquid crystal panel 108 in the projection type liquid crystal display device of this embodiment. In this embodiment, in the case of a single-panel device, a liquid crystal panel 108 comprising color filters is used. In the case of a three-panel type device, color separation and color synthesis as in FIG. 3 are performed using dichroic mirrors, cold mirrors (not shown as in FIG. 3), and the three liquid crystal panels 108 to 110. In either case, since the relationship between the optical element 103 and the liquid crystal panel 108 remains the same, the following explanation will be given using the liquid crystal panel 108 alone for the sake of easy understanding of the gist of the present invention.

In the first embodiment, the first optical element 103 is designed to obtain a predetermined beam shape and intensity distribution at a relatively near position, where the second optical element 104 is disposed, as the predetermined position. In contrast to this, the optical element 103 of this embodiment is designed to obtain a predetermined beam shape and intensity distribution at a relatively far position, where the liquid crystal panel 108 is disposed, as the predetermined position. For this reason, the entire surface of the liquid crystal panel 108 is efficiently irradiated with uniform light, but a collimation is not always assured completely. However, since the distance between the optical element 103 and the liquid crystal panel 108 is relatively large, a light beam incident on the liquid crystal panel 108 has a collimation to some extent. Therefore, as compared to the size of an allowable range that can sufficiently assure the characteristic of the liquid crystal panel 108 as the spatial light modulator, a sufficient illumination characteristic can be realized, and a good display characteristic can be obtained.

According to the second embodiment, although the collimation of a light beam irradiated onto the liquid crystal panel is slightly impaired as compared to the system which also uses the second optical element 104 for giving a collimation as in the first embodiment, loss of light caused by the second optical element 104 can be prevented, and the number of parts can be reduced. Therefore, the second embodiment is advantageous for size, weight, and cost reductions of the device.

(Third Embodiment)

The detailed realization method (design method) of the first optical element for shaping the beam shape and uniforming the intensity distribution, and the second optical element for giving a collimation will be explained below. Since the first and second optical elements are realized by similar design methods and similar arrangements, they will be described below together.

As either the first or second optical element, the phase transfer function (or the shape of the element surface or the like) which represents the advance/delay amount of a phase to be given to the typical wavefront of incident light is determined by, e.g., an optimization calculation, and an optical element which realizes the calculated phase transfer function is manufactured. The difference between the optical element for converting the intensity distribution and the optical element for giving a collimation is caused by different detailed setting objects in, e.g., the optimization calculations upon determination of the phase transfer function or the shape of the element surface. However, in either case, the phase transfer function is a characteristic function form in the present invention, and is a function having components of 4th-order or higher in association with the coordinates in addition to none, one, or a plurality of combinations of a linear function for giving deflection, an axial symmetry function for giving convergence, divergence, spherical aberration, and the like of the entire beam, and a function for giving convergence or divergence in only one direction like a columnar lens.

Figure 8:
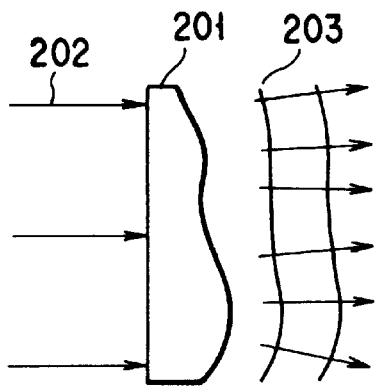
FIG. 8 is a view illustrating the principle when an optical element according to the third embodiment of the present invention comprises a transmission type optical element.

FIG. 8 is a view illustrating the principle when the optical element according to this embodiment comprises a transmission type optical element 201. Referring to FIG. 8, the transmission type optical element 201 is an optical element for shaping the beam shape of an incident light beam and uniforming its intensity distribution, or an optical element for giving a collimation to the light beam. When incident light 202 passes through the optical element 201 having a shape with undulations, its phase advances or delays, and the wavefront of output light 203 becomes a curved surface. The output light 203 transmits energy in a direction normal to the wavefront.

Therefore, when the optical element 201 is designed so that the intensity distribution at the predetermined position of the output light 203 falls with a predetermined range (or the output light is made uniform within a predetermined range), the optical element for shaping the beam shape of an incident light beam and uniforming its intensity distribution can be designed. On the contrary, when the optical element 201 is designed so that the wavefront of the output light is made almost flat with respect to incident light when the element is placed at that position, the optical element for giving a collimation can be designed.

Note that actual incident light is not always coherent light but is a group of light rays having various wave number vectors, and the actual operation requires a complicated process as compared to that described here. However, when the element is designed based on the typical propagation direction as a representative direction, a good operation characteristic can be assured.

When such an optical element is formed as a transmission type optical element, the surface of an optical material having a uniform refractive index may be worked into a predetermined shape, as shown in FIG. 8, in one method, but the element may be formed to have a flat surface, and the refractive index distribution may be formed inside the element to realize an optical element with the same function in another method. In addition, undulations may be formed on the two surfaces of the element or both the refractive index distribution and the surface shape may be used to realize the optical element. In either case, the spatial distribution of the phase given upon comparison between the incident light and the output light contributes to conversion of the intensity distribution or giving of a collimation.

Figure 9:
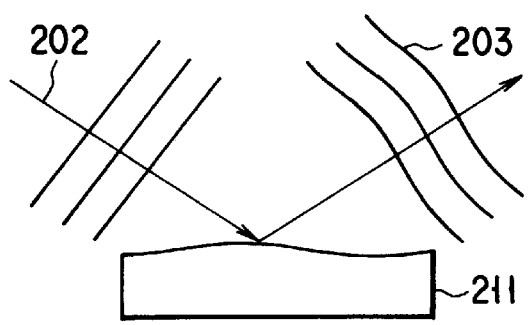
FIG. 9 is a view illustrating the principle when the optical element according to the third embodiment comprises a reflection type optical element.

FIG. 9 shows the principle when the optical element of this embodiment comprises a reflection type optical element 211, and the operation due to the effect of the surface shape (undulations) is the same as that shown in FIG. 8. Although not shown, the element shown in FIG. 8 may be adhered to the surface of a flat mirror. In this case, since the forward and backward optical paths are used inside the optical element, the undulations on the surface can be smaller than those in FIG. 8.

Figure 10:
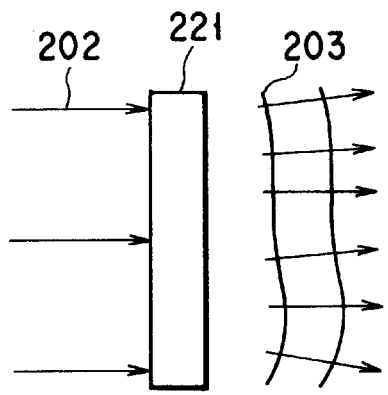
FIG. 10 is a view illustrating the principle when the optical element according to the third embodiment comprises a diffraction type optical element of transmission type.

FIG. 10 shows an example wherein the optical element of this embodiment is realized by a diffraction type optical element 221 of transmission type. In this case, when the arrangement for deflecting the optical axis is adopted, since a diffraction grating forms a fringe pattern, the manufacture of the element may be facilitated.

Figure 11:
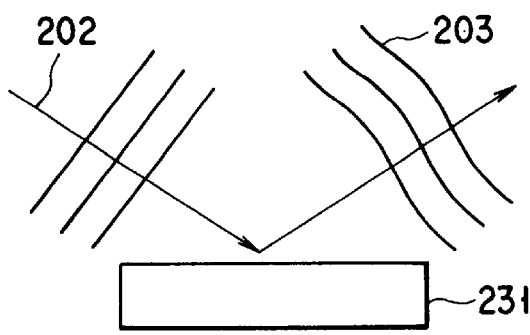
FIG. 11 is a view illustrating the principle when the optical element according to the third embodiment comprises a diffraction type optical element of reflection type.

FIG. 11 shows an example wherein the optical element of this embodiment is realized by a diffraction type optical element 231 of reflection type.

As shown in FIGS. 8 to 11, various implementation means are available as long as an element is capable of predetermined wavefront conversion.

In the examples shown in FIGS. 8 to 11, the optical element is realized as a single element, but may be realized by combining with other optical elements such as a reflector, a prism, a lens, a columnar lens, and the like. On the contrary, the two surfaces of a thick glass element may respectively serve as an optical element for converting the intensity distribution and an optical element for giving a collimation. All these optical elements are included in the present invention since their objectives remain the same although they have different outer appearances.

An actual design method of the first optical element for converting the intensity distribution and the second optical element for giving a collimation according to this embodiment will be exemplified below. The method itself and its principle can be similarly applied to the optical elements having other dispositions.

Figure 12:
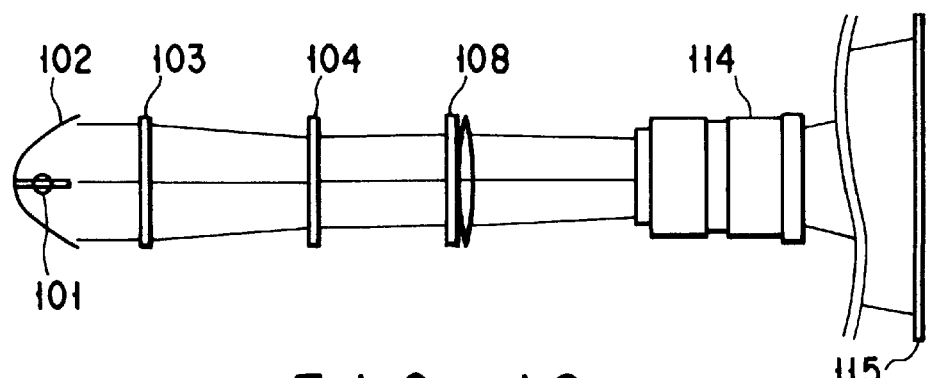
FIG. 12 is a view showing the detailed example of the disposition of the optical element according to the third embodiment.

FIG. 12 shows an example of the detailed disposition of elements in the optical device according to this embodiment. Referring to FIG. 12, light emitted by a light source 101 such as a metal halide lamp is reflected by a reflector 102 having a paraboloidal surface shape to be converted into an almost parallelly collimated light beam. The optical device is designed so that the light beam is converted into an almost uniform light beam with a light intensity distribution which is almost uniform and has a rectangular sectional shape when it passes through first and second optical elements 103 and 104 in turn. Although FIG. 12 illustrates a liquid crystal panel 108, a field lens 116, and a screen 115 in addition to the above-mentioned components, a detailed description thereof will be omitted since they are not characteristic portions of the present invention.

Design of the first optical element 103 will be described below. Of light rays passing through the first optical element 103, some typical light rays are selected as sample light rays. FIG. 13 shows the positions of the sample light rays on the surface of the first optical element 103. In this case, 72 light rays are used. The reflector 102 has a radius of 45 mm, and a region where no light is incident under the shade of the electrode of the metal halide lamp as the light source 101 is present at the center as a region having a radius of 5 mm. The light rays are sampled in concentric patterns in the range of radii of 5 mm to 45 mm. However, since this embodiment assumes a system symmetrical about the vertical axis, samples are set on only the right half.

Figure 14:
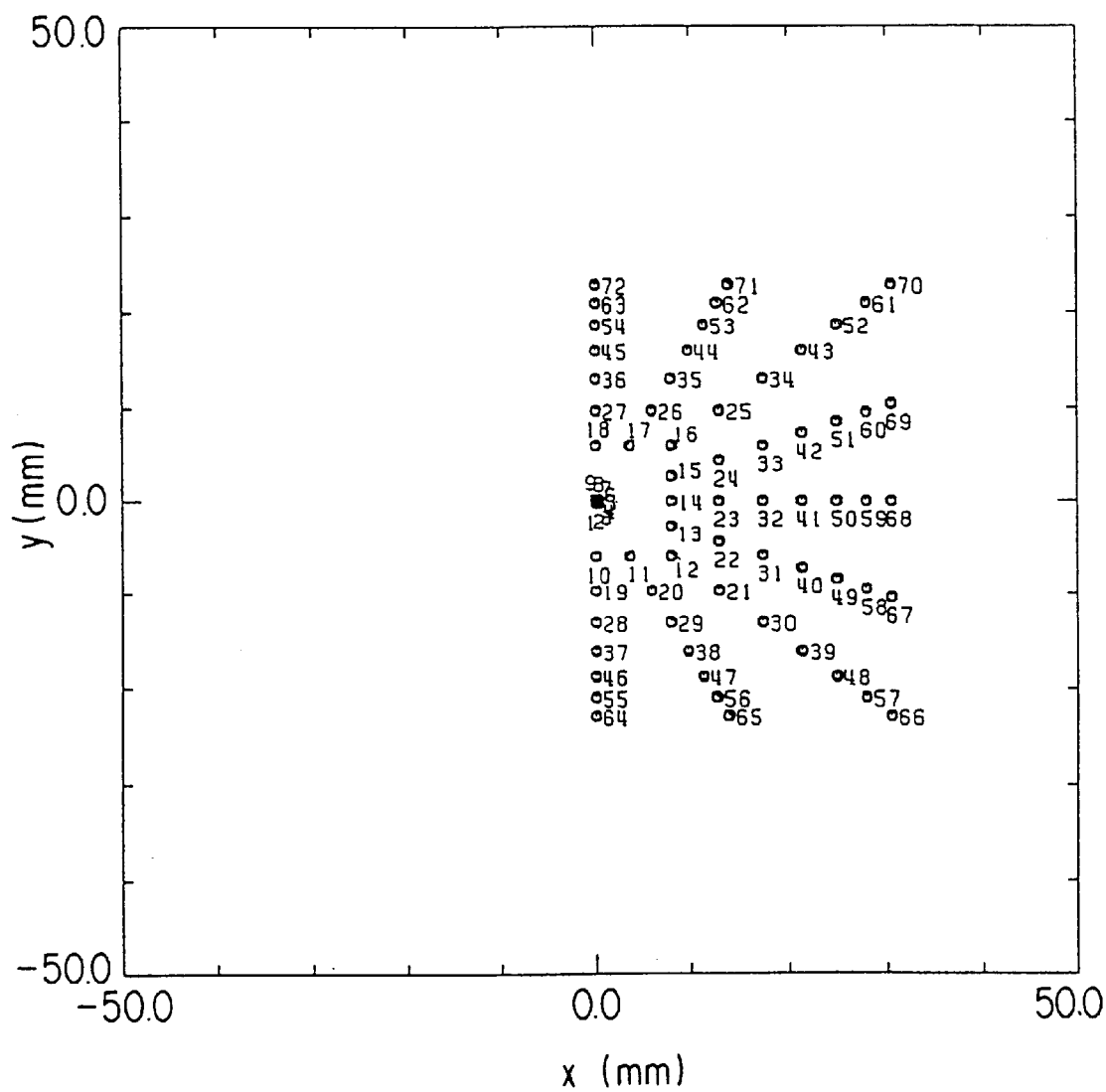
FIG. 14 is a view showing the target arrival points of the sample light trays on the surface of the second optical element.

FIG. 14 shows the points, where the sample rays are to arrive, on the surface of the second optical element 104, i.e., the target arrival points. In this embodiment, a liquid crystal panel having a diagonal line length of 3×24.5 mm (a so-called 31" size) and an aspect ratio of 3:4 is assumed, and these target arrival points are set within a rectangle having the same shape and size as those of the liquid crystal panel. Incident light is assumed to have a Gaussian intensity distribution, and the $1/e^2$ half width, w, and the radius, R, of the reflector 102 are assumed to satisfy R/W=0.7. Even in consideration of the Gaussian intensity distribution of incident light, the optical elements are disposed to obtain a uniform converted intensity distribution over the entire screen. In design, the phase transfer function of the second optical element 104 is optimized so that the actual arrival points approach the target arrival points.

Note that the interval between the first and second optical elements 103 and 104 in this embodiment is set to be 200 mm, but may be set to be larger or smaller than this value in consideration of easy manufacture of the optical element and the dimensions of the device.

The phase transfer function, $\phi(x, y)$, is a function of the coordinate position (x, y) on the surface of the optical element, and is defined as a function which represents the phase shift amount at that position by $2\pi\phi(x, y)/\lambda$ ($\lambda$: the wavelength of incident light). Although definitions using different coefficients in multiplications are used depending on references, any of such definitions may be used as long as the same definition is consistently used. A z-axis is defined as a direction perpendicular to the surface of the optical element, and is used in the following description.

Let (nx, ny, nz) be the direction vector of light incident at a point (x, y) of the optical element characterized by the phase transfer function φ(x, y). Note that the length of the direction vector is assumed to be λ. At this time, let (nx', ny', nz') be the direction vector in the output direction. Then, the components nx' and ny' of output light are given by:

$$nx' = nx + \partial \phi(x,y)/\partial x$$

$$ny' = ny + \partial \phi(x,y)/\partial x$$

On the other hand, nz' is calculated from a condition of the length λ of the direction vector. More specifically, when sample light rays incident on an element whose phase transfer function is represented by φ(x, y) are given, output light rays corresponding to these sample light rays are calculated, and their arrival points are calculated.

In order to define a phase transfer function φ(x, y) necessary for realizing a desired characteristic, a function form φ(x, y, C1, . . . , CM) including many parameters C1 to CM is assumed, and C1 to CM which best realize the desired characteristic are calculated. More specifically, a square of the distance between the position of the target arrival point (xi', yi') and the actual arrival point (xi", yi") is calculated with respect to each incident position (xi, yi) of a sample light ray, and a combination of the parameters C1 to CM, which minimizes the sum total of the above-mentioned values of all the sample light rays is obtained. That is, $$S = \Sigma\{(xi' - xi")^2 + (yi - yi")^2\}$$

(i is a suffix representing each sample light ray, and a sum of the calculated values of all the sample light rays is calculated). This calculation is basically the same as a general statistical calculation, and can be attained according to the algorithm of the conventional method of least squares.

In this embodiment, an orthogonal coordinate system is converted into a polar coordinate system, and a function form expressed as a function of r and θ is used. The relationship with the orthogonal coordinate system is expressed by x=r×sin θ and y=r×cos θ. With this conversion, for example, a singular point present at the center can be easily coped with, and examinations with good prospects are allowed for rotation symmetry about the optical axis. For these reasons, such a conversion is often convenient for a light beam whose intensity is distributed around the optical axis. An actual function form is as follows. Note that this formula includes only cos terms, and defines a function form which always becomes a function axially symmetrical with respect to the vertical axis.

$$\phi(r, \theta) = C_1 r + C_2 r^2 + C_3 r^3 + C_4 r^4 + C_5 r^5 + C_6 r \cos\theta + C_7 r^2 \cos\theta +$$
$$C_8 r^3 \cos\theta + C_9 r^4 \cos\theta + C_{10} r^5 \cos\theta + C_{11} r \cos 2\theta + C_{12} r^2 \cos 2\theta +$$
$$C_{13} r^3 \cos 2\theta + C_{14} r^4 \cos 2\theta + C_{15} r^5 \cos 2\theta + C_{16} r^2 \cos 3\theta +$$
$$C_{17} r^3 \cos 3\theta + C_{18} r^4 \cos 3\theta + C_{19} r^5 \cos 3\theta + C_{20} r^2 \cos 4\theta +$$
$$C_{21} r^3 \cos 4\theta + C_{22} r^4 \cos 4\theta + C_{23} r^5 \cos 4\theta + C_{24} r^3 \cos 5\theta +$$
$$C_{25} r^4 \cos 5\theta + C_{26} r^5 \cos 5\theta + C_{27} r^3 \cos 6\theta + C_{28} r^4 \cos 6\theta + C_{29} r^5 \cos 6\theta$$

As for the design of the second optical element 104, a correspondence function is used for points on the first optical element 103 and points on the second optical element 104, which points are obtained by tracing the sample light rays according to the design result of the first optical element 103, and the design is attained by viewing the light rays in the reverse direction. More specifically, the second optical element 104 can be designed, so that light rays which pass these points on the second optical element 104 have the corresponding points on the first optical element 103 as the target arrival points.

Figures 15, 20:
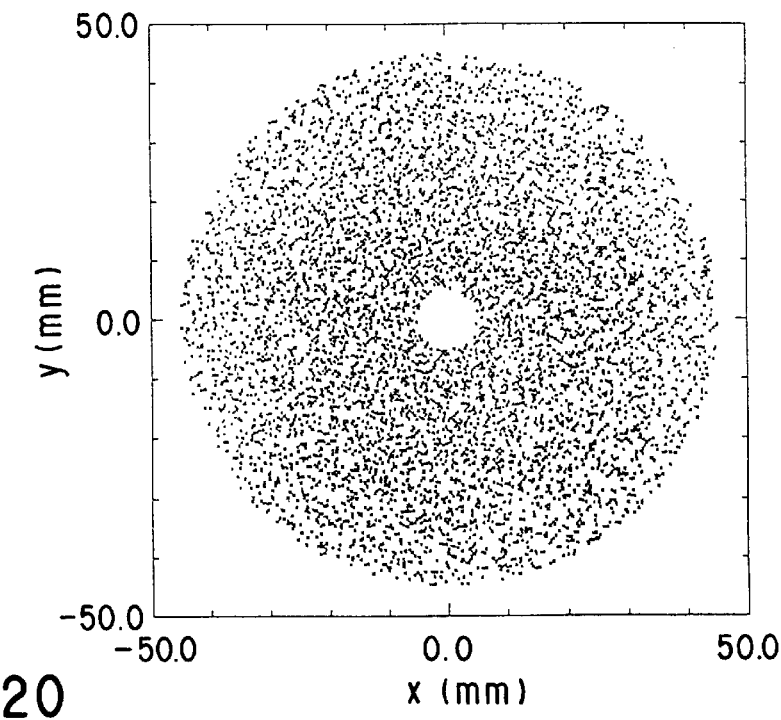
FIG. 15 shows the values of parameters obtained as a result of optimization of the respective optical elements.
FIG. 20 is a graph showing the positions of light rays incident on the first optical element in a simulation.
Figure 16:
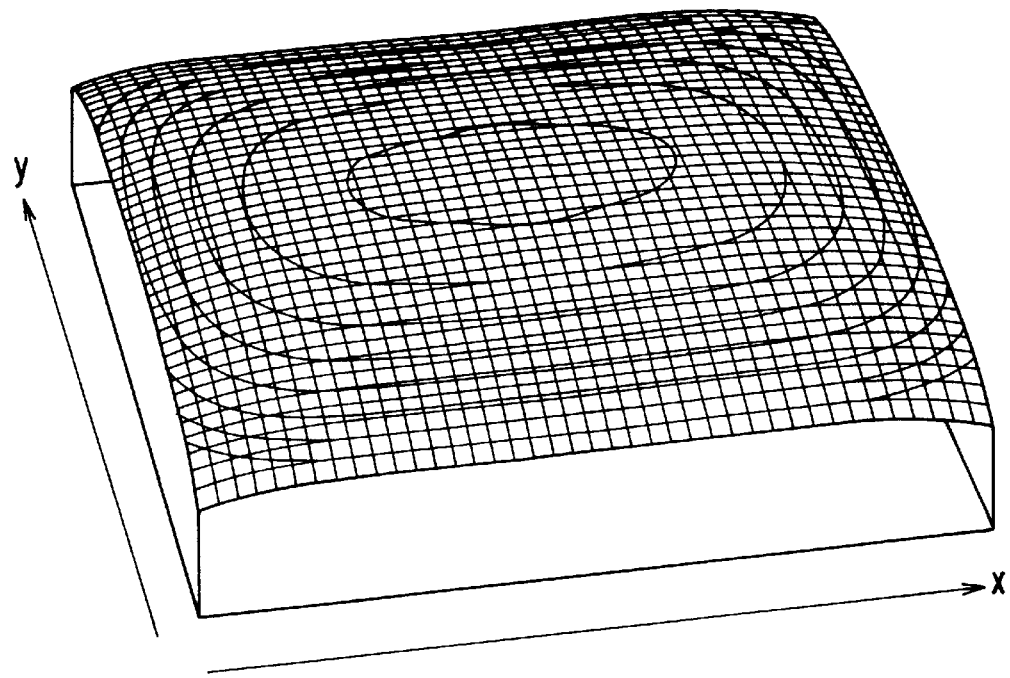
FIG. 16 is a chart showing the profile of a phase transfer function calculated for the first optical element.
Figure 17:
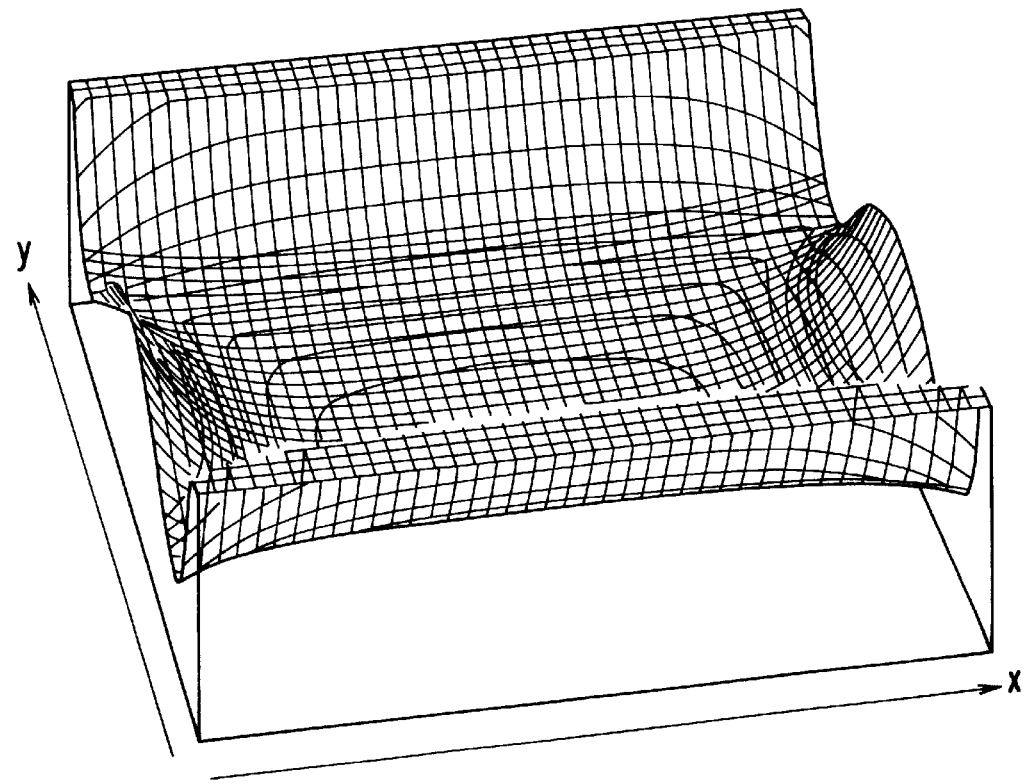
FIG. 17 is a chart showing the profile of a phase transfer function calculated for the second optical element.

In the design of this embodiment, the function form shown in equation 2 is used as in the first optical element 103. However, other function forms may be used on the basis of the examination results of the optical system. FIG. 15 shows the parameter values obtained as a result of optimization for the respective elements. FIGS. 16 and 17 show the profiles of the phase transfer functions calculated for the first and second optical elements 103 and 104, respectively.

When the optical element which realizes φ(x, y) obtained as described above is constituted as a reflection type optical element, since the phase of a light ray which passes the position (x, y) need only be delayed by the distance φ(x, y), a curved surface mirror in which the depth at the coordinate point (x, y) is φ(x, y)/2 can be constituted if light is perpendicularly incident on the optical element. Similarly, when this optical element is used for light incident at an angle α, a curved surface mirror in which the depth at the coordinate point (x, y) is φ(x, y)/(2×cos α) can be constituted. In this case, an optical element has a shape which is obtained by multiplying an axial symmetrical shape of the profile shown in FIGS. 16 or 17 with respect to the horizontal axis with an appropriate magnification in the direction of undulations.

On the other hand, when the optical element which realizes φ(x, y) obtained as described above is constituted as a refraction type optical element, since the phase of a light ray which passes the position (x, y) need only be delayed by the optical path length φ(x, y), a lens having a curved surface in which the increment or decrement of the thickness at the coordinate point (x, y) is φ(x, y)/(n−1) can be constituted if a material having a uniform refractive index n is used. In this case, an optical element has a shape obtained by multiplying the profile shown in FIGS. 16 or 17 with an appropriate magnification in the direction of undulations. On the other hand, when the optical element is realized by a refractive index distribution while its thickness d is constant, a lens in which the refractive index at the coordinate point (x, y) is φ(x, y)/d can be constituted.

When the first and second optical elements 103 and 104 are constituted as reflection type optical elements or refraction type optical elements with a uniform refractive index, it is not always advantageous in terms of mass production since undulations become large. On the other hand, it is not always advantageous to form a refractive index distribution in terms of mass production, either.

Rather, when the first and second optical elements 103 and 104 are constituted as diffraction type optical elements, mass production is often facilitated. In this case, the optical element is designed as follows. That is, as an optical element which realizes the phase transfer function φ(x, y) for light having a wavelength λ0, a diffraction type optical element with a pattern obtained by drawing contour lines at λ0 intervals with respect to φ(x, y) can be constituted.

Figure 18:
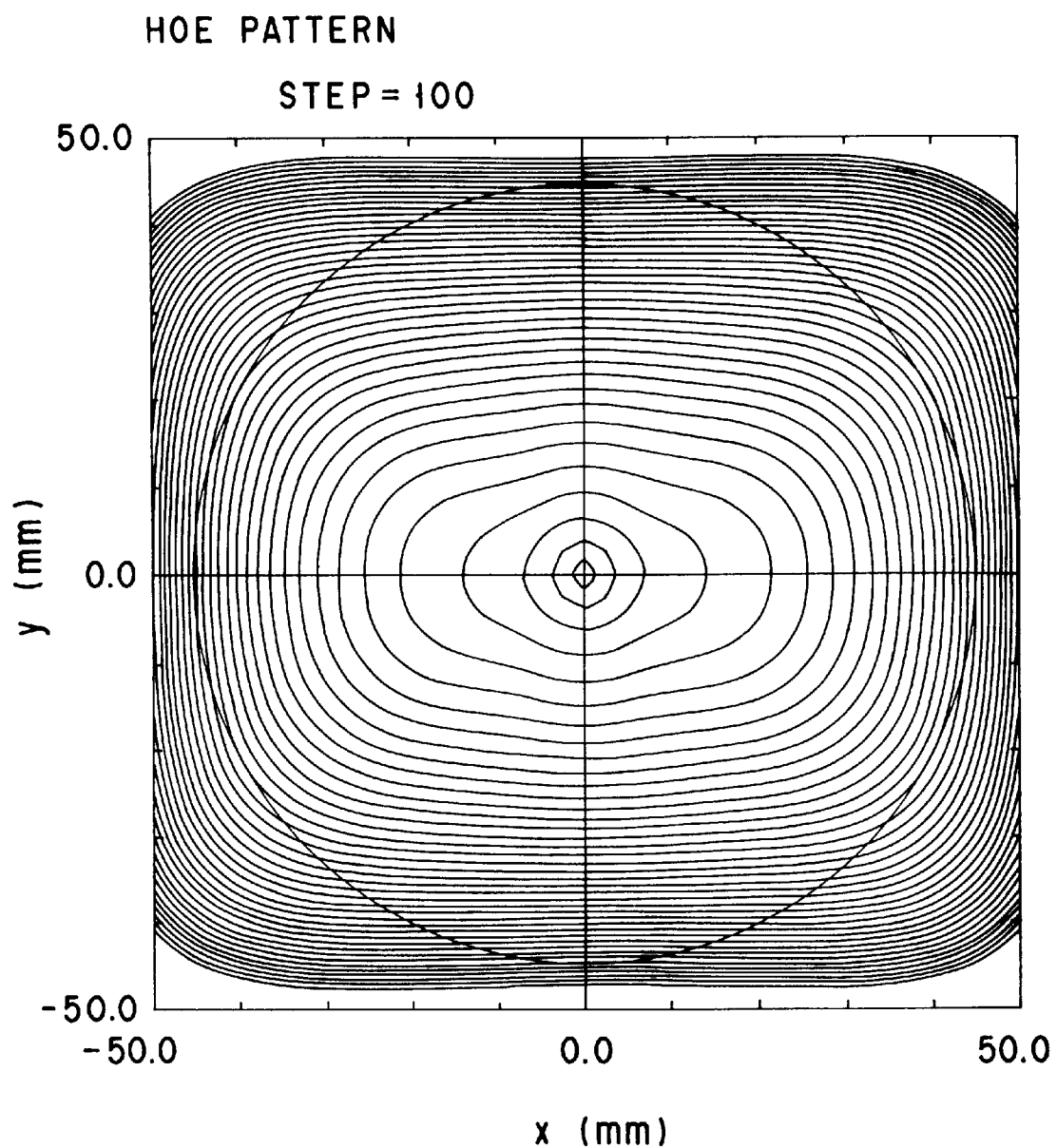
FIG. 18 is a graph showing the contour lines of the phase transfer function calculated for the first optical element.
Figure 19:
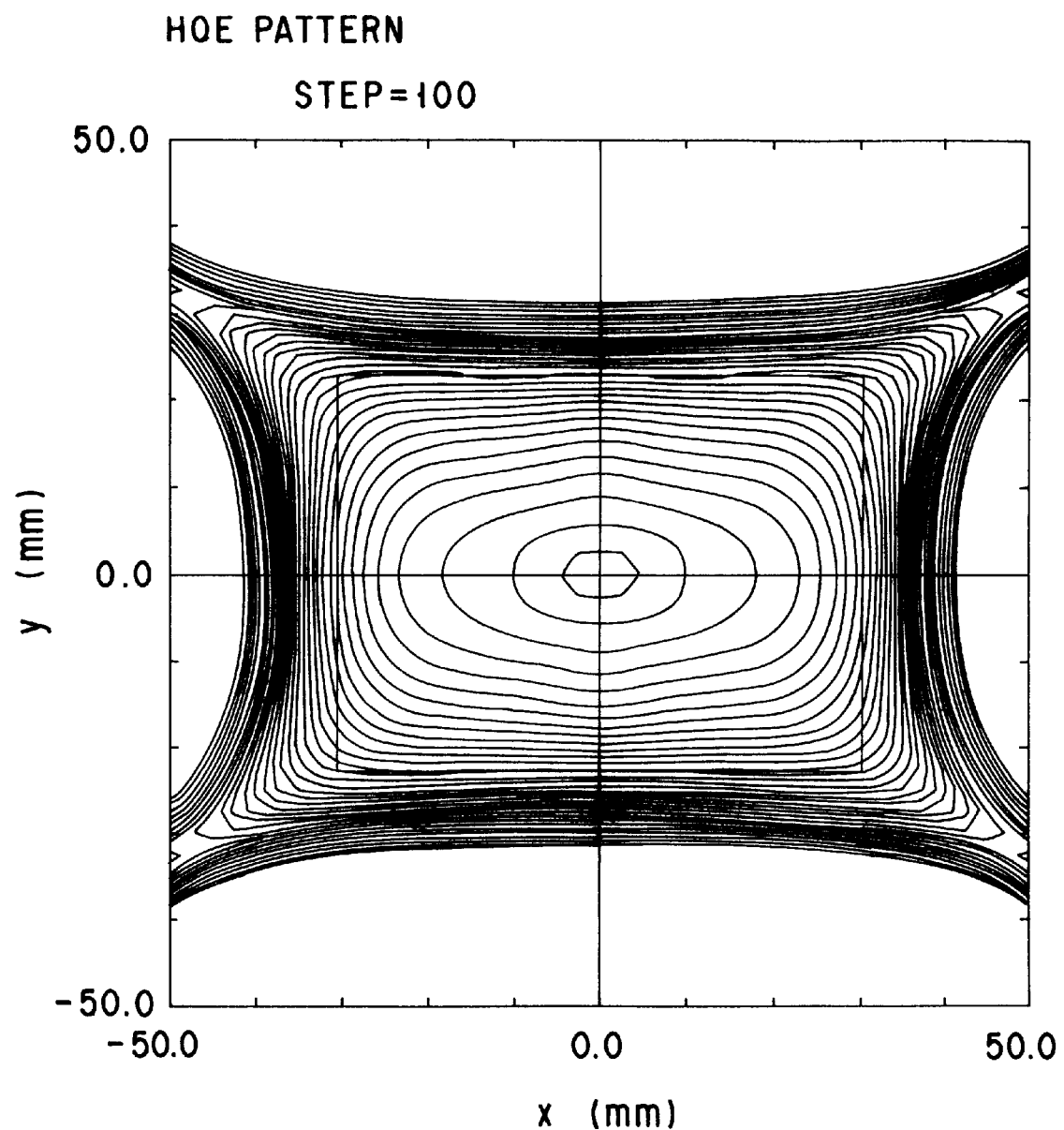
FIG. 19 is a graph showing the contour lines of the phase transfer function calculated for the second optical element.

FIGS. 18 and 19 show the patterns of contour lines of the phase transfer functions calculated for the first and second optical elements 103 and 104. In FIGS. 18 and 19, contour lines to be drawn are thinned out at the rate of one line per 100 lines due to too small a pitch obtained when contour lines are drawn at intervals of λ0=630 nm as the representative wavelength of red. The patterns shown in FIGS. 18 and 19 represent Fresnel lens like elements. In these patterns, since a circle is converted into a horizontally elongated rectangle, each pattern is defined by curves which are slightly compressed in the vertical direction. Since the distribution need be extended in the directions of diagonal lines rather than in the direction of vertical lines, each pattern is defined by a closed curve which has large grating intervals in the directions of diagonal lines, and has a shape approximate to a rectangle with round corners. This shape represents an example of the way of appearance of features upon coaxial conversion of a circle into a rectangle. However, in this embodiment, since the size of the liquid crystal panel is small as compared to the sectional area of incident light, the first optical element has a function of slightly converging light as a whole. On the contrary, when the first optical element has a function of diverging light, each pattern is defined by a closed curve which has small grating intervals in the directions of diagonal lines and has a shape approximate to a rhombus.

On the other hand, when the optical element also has a deflection function, a pattern which is basically modulated in a fringe pattern is obtained. More specifically, actually formed patterns have various appearances depending on the dispositions to be used. However, in any case, the phase transfer function has a characteristic function form having components of fourth-order or higher in association with coordinates of almost similar shapes except for components representing a deflection function, and components representing lens functions for controlling convergence or divergence as a whole. Thus, all modifications having similar components are included in the present invention. When a deflection function, for example, is combined, some correction components are preferably added to correct aberrations generated inadvertently in place of simply adding a linear function which adds the deflection function, thus realizing intensity distribution conversion with higher precision.

In order to demonstrate the effect of this embodiment, simulations were performed by tracing light rays.

FIG. 20 shows the positions of light rays incident on the first optical element 103 in the simulations. As can be seen from FIG. 20, light rays are distributed at a density proportional to the intensity distribution.

FIG. 21 shows the positions of light rays obtained when the incident light rays shown in FIG. 20 are deflected by the first optical element 103 and reach the second optical element 104. As can be seen from FIG. 21, light rays are almost uniformly distributed in a region corresponding to the shape of the liquid crystal panel, and conversion of the intensity distribution is effectively realized.

FIG. 22 shows the distribution of light rays obtained when light rays output from the second optical element 104 propagate by 20 cm. As can be seen from FIG. 22, substantially the same shape as in FIG. 21 is maintained, and the second optical element 104 effectively realizes a collimation of light rays.

With these effects, as apparent from FIGS. 21 and 22, since light emitted to out of the panel is few, power of the light source can be effectively utilized. If the light loss in the optical system using the first and second optical elements 103 and 104 is assumed to be about 15%, a brightness about 1.2 to 1.5 times of that in a system without using the above-mentioned elements can be realized. This value is obtained by calculating the number of lights, since light is distributed to be proportional to the energy of the light. This value corresponds to the design, allocation and size of the element.

Upon constitution of the optical element, in the case of the pattern obtained by drawing contour lines in the phase transfer function in units of wavelengths, first-order diffracted light is diffracted in a desired direction. In this case, light is deflected in a direction in which the phase shifts by one wavelength ($2\pi$ rad) between adjacent contour lines.

Figure 23:
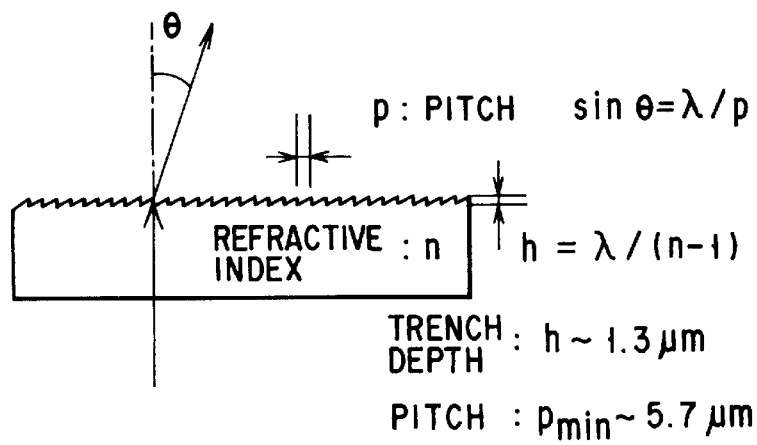
FIG. 23 is a view showing the deflection state of light which is perpendicularly incident on the optical element.

FIG. 23 shows a state wherein perpendicularly incident light is deflected. As shown in FIG. 23, the deflection angle $\theta$, by diffraction is $\sin\theta = \lambda/p$ (where $\lambda$ is the wavelength and p is the grating pitch). In this embodiment, the shape of trenches which form the diffraction grating is determined under the condition that light must not leak in directions other than the desired direction. When first-order diffracted light is utilized, the trench shape can be determined so that the phase delay linearly changes from the left end to the right end of a trench, and an optical path difference just for one wavelength is generated formed between adjacent trenches. That is, trenches which have a sawtooth shape shown in FIG. 23 and a height h satisfying $\lambda/(n-1)$ can be formed (where n is the refractive index of the optical element material). When $\theta$ is large, $h=\lambda/(n-\cos\theta)$ described later.

At this time, desired deflection can be given to light of a specific wavelength. However, when light such as white light includes wavelengths in a wide range, the direction of deflection considerably varies depending on the wavelengths. In order to solve this problem, high-order diffracted light may be used. More specifically, the arrangement that utilizes Nth-order diffracted light utilizes light which is deflected in a direction in which the phase shifts by N wavelengths between adjacent trenches. At this time, the grating pitch and depth of one trench are N times those of a trench for first-order diffracted light.

Figure 24:
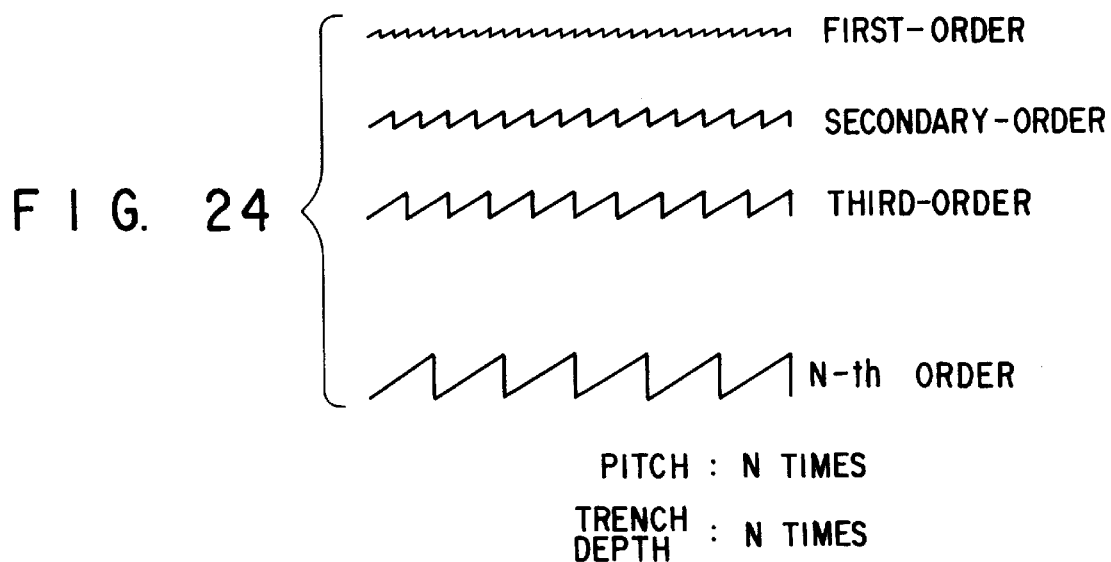
FIG. 24 is a view showing a change in trench shape on an optical element utilizing high-order diffracted light.

FIG. 24 shows a change in trench shape when high-order diffracted light is utilized. The tilt of the surface of a triangular trench is $h/p=\sin\theta/(n-1)$. If the tilt is accurately formed, the pitch may have a large error, or the limitation on the pitch is substantially eliminated. When an optical element is designed to utilize Nth-order diffracted light with respect to light having wavelength $\lambda 00$, (N+m)th-order light is deflected with maximum diffraction efficiency in a desired direction for light which has a wavelength $\lambda = \lambda 0 \times N/(N+m)$ ($m = \pm 1, \pm 2, \ldots$). Also, most powers of light components having other wavelengths are deflected in directions near the desired direction. As N increases, the precision and efficiency become higher. However, the fine structure of the phase transfer function cannot be reflected if N is too large. For this reason, N is actually determined in consideration of required precision. In this embodiment, a sufficient effect is expected when N falls within the range from 8 to about several hundreds.

In the above description, the optical element of the present invention is constituted as a transmission type diffraction grating. Also, when the optical element is constituted as a reflection type diffraction grating, an optical element can be constituted by reversing the three-dimensional pattern and changing the scale of undulations.

On the other hand, an optical element with large N has a shape in which a surface with a large thickness in FIG. 8 or 9 is sequentially shifted in the optical axis direction. More specifically, a shape similar to or the same as a shape obtained by dividing a surface, which has a predetermined surface shape designed assuming a case wherein the optical element is constituted not as a diffraction type optical element but as a reflection or refraction type optical element, by a boundary line having a constant height from a predetermined reference plane, and translating only the divided portions having the constant height toward the reference plane side or by repeating this operation, is realized. Such an optical element can be considered as a reflection or transmission type optical element having a surface whose surface shape is continuous in a plurality of regions divided by the boundary line. More specifically, as compared to a drawn image observed as a diffraction type optical element with large N, a natural drawn image subjectively changes depending on the value of N but is substantially the same. In this manner, since the thickness of the optical element can be substantially constant over the entire surface of the optical element, the amount of the material can be reduced. Also, high resistances against temperature or humidity changes can be obtained.

Figure 25:
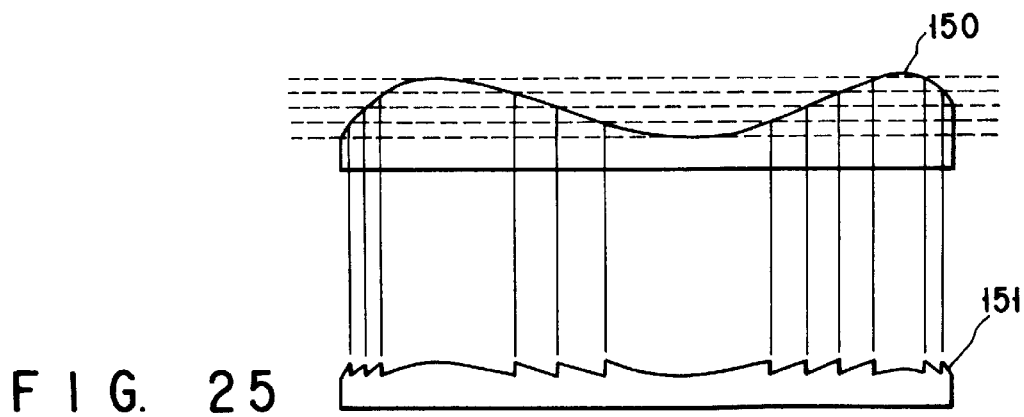
FIG. 25 is a view showing the shape of a reflection or transmission type optical element in which the surface shape has a continuous surface in a plurality of regions divided by a boundary line.

FIG. 25 shows the shape of the reflection or transmission type optical element having a surface whose surface shape is continuous in a plurality of regions divided by a boundary line. FIG. 25 illustrates the surface shape of an optical element 150 having an entirely continuous surface, and the surface shape of an optical element 151 having divisionally continuous surfaces which realize the same function as the element 150.

(Fourth Embodiment)

FIGS. 26A and 26B are views showing the arrangement of an illumination optical system in a projection type liquid crystal display device according to the fourth embodiment of the present invention.

Light emitted by a light source 101 such as a metal halide lamp is reflected by a reflector 102 having a spheroidal shape, and marginal light rays of the reflected light are shielded by an aperture stop 130, thus shaping the reflected light. The diverging light in the optical path after it passes through the aperture of the aperture stop 130 is converted into a uniform light beam having a rectangular beam shape by first and second optical elements 103 and 104, and a collimation is given thereto. The subsequent arrangement of the device of this embodiment is the same as the above-mentioned three- or single-panel type device. In FIGS. 26A and 26B, the positions of the first and second optical elements 103 and 104 and the distance therebetween are different.

According to the fourth embodiment, by setting a small aperture size of the aperture stop 130, a light beam with a higher collimation can be obtained. Therefore, the arrangement of this embodiment is advantageous for a case wherein a liquid crystal panel of a mode requiring a light beam with a high collimation is used or a display characteristic with high image quality is to be obtained.

FIG. 27 shows the arrangement of the illumination optical system when a lens 131 is inserted in front of the first optical element 103.

In this case, since the first optical element 103 need not have a function of converging light, the deflection angle to be added becomes smaller than those in FIGS. 26A and 26B. With this arrangement, the influence of wavelength scattering is eliminated, and an optical system with high efficiency or precision can be constituted. As described above, a function which can be attained by a conventional optical element is separated from those of the first or second optical element 103 or 104, and the optical element corresponding to the separated function is combined. Such an arrangement is not limited to the fourth embodiment, but can be generally attained.

In this case, the conventional optical element may be inserted at one or a plurality of positions before and after the first or second optical element 103 or 104, and the insertion position and the number of such elements are not particularly limited. In this case, the first and second optical elements 103 and 104 can be designed in the same manner as in the above embodiment if their phase transfer functions are optimized in consideration of the above arrangement. Such modifications are included in the present invention.

(Fifth Embodiment)

FIG. 28 shows the arrangement of an illumination optical system in a projection type liquid crystal display device according to the fifth embodiment of the present invention. Referring to FIG. 28, light emitted by a light source 101 such as a metal halide lamp is reflected by a reflector 102 having a spheroidal shape, and marginal light rays of the reflected light are shielded by an aperture stop 130, thus shaping the reflected light. The diverging light in the optical path after it passes through the aperture of the aperture stop 130 is converted by four optical elements 143 to 146 into a light beam having a substantially rectangular beam shape, and at the same time, a collimation is given thereto. The subsequent arrangement of the device of this embodiment is the same as the above-mentioned three- or single-panel type device.

In this embodiment, the optical elements 143 to 145 constitute the first optical element 103 in the above embodiment, and the optical element 146 corresponds to the second optical element 104 in the above embodiment. From another viewpoint, it may also be considered that the optical elements 143 and 144 constitute the first optical element 103 in the above embodiment, and the optical elements 145 and 146 constitute the second optical element 104 in the above embodiment.

The optical elements 143 and 146 in this embodiment have phase transfer functions defined as functions for only y, and the optical elements 144 and 145 have phase transfer functions defined as function for only x. As described above, since the phase transfer functions have translational symmetry in one direction, linear parallel trenches need only be formed. Therefore, the manufacture of optical elements is remarkably facilitated. Since the number of optical elements increases, light loss increases accordingly. However, since optical elements can be quickly developed and manufactured with low cost, the arrangement of this embodiment is particularly effective for popular type products.

As modifications of this embodiment, combinations of the directions of grating trenches and the order of optical elements may be modified. For example, light may be incident first on an optical element which realizes a phase transfer function defined by a function for only x, and the order of subsequent optical elements may be arbitrarily determined. The directions of trenches are not limited to the vertical and horizontal directions, but trenches in oblique directions may be combined. Furthermore, in this embodiment as well, the gratings need not always be formed as independent optical elements. For example, the optical elements 143 and 144 may be realized as a single optical element on two surfaces of which trenches are formed. When the distance between the optical elements 143 and 144 is small, an effect of substantially reducing the number of parts can be expected. Since the number of optical element surfaces decreases, light loss is also eliminated. Such an arrangement is not limited to the optical elements 143 and 144, and to realize the surfaces of arbitrary successive diffraction gratings as a part on the two surfaces of which these diffraction gratings are formed is an example of embodiments which realize the gist of the present invention. Such an arrangement is also included in the present invention.

In the first to fifth embodiments described above, the optical element is designed to irradiate light with a uniform intensity onto a rectangular liquid crystal panel.

Alternatively, the optical element may be designed so that the brightness of the marginal portion becomes higher than that of the central portion to match the characteristic of the projection lens which normally has a dark marginal portion. In this case, the uniformity of the brightness on the screen can be further improved. In design, the target arrival points can be distributed to have a higher density at the marginal portion. Alternatively, when the optical element is designed under the assumption that the drop of the marginal intensity in the distribution of incident light is equal to or larger than an actual one, the same effect can be expected.

In the first to fifth embodiments, the beam shape of a light beam is converted from a circular shape into a rectangular shape to have the maximum effect on the rectangular screen. When a circular region is to be illuminated with uniform brightness, a desired beam shape can be obtained by combining concentric grating patterns. Also, the light beam may be deformed into an arbitrary beam shape such as a triangular shape, pentagonal shape, and the like. To summarize, the optical element need only be designed by setting sample light rays and target arrival points so that the output light beam has a desired beam shape.

Furthermore, in the first to fifth embodiments, the first and second optical elements are described as independent ones, but may be combined with other elements. For example, in a normal projection type liquid crystal display device, an unnecessary-light shielding filter such as an infrared ray shielding filter, an ultraviolet ray shielding filter, or the like is normally inserted after the light source for the purpose of shielding unnecessary light such as light other than visible light. The diffraction gratings may be formed on or adhered to the surfaces of these unnecessary-light shielding filter to have the functions of the optical elements according to the present invention. On the contrary, these unnecessary-light shielding filters may be formed on the surfaces of the optical elements according to the present invention. With this arrangement, the number of part surfaces which pass light rays can be reduced as compared to a case wherein elements are constituted as independent elements, and unnecessary-light reflection can be eliminated, thus suppressing light loss.

(Sixth Embodiment)

Figure 29:
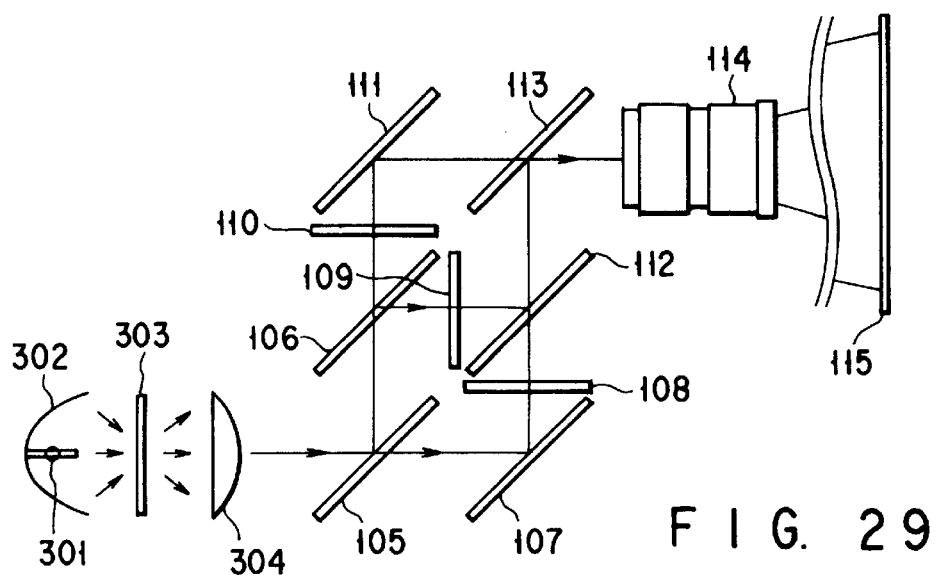
FIG. 29 is a view showing the arrangement of an illumination optical system in a projection type liquid crystal display device according to the sixth embodiment of the present invention.

FIG. 29 shows the arrangement of an optical system in a projection type liquid crystal display device according to the sixth embodiment of the present invention.

Light (white light) emitted by a light source 301 such as a metal halide lamp is reflected by a reflector 302 having a spheroidal shape, thus obtaining a converging light beam which substantially converges at one point in this case. The light beam is guided to an optical element 303 having a function of uniforming the intensity distribution. The light beam which has passed through the optical element 303 is incident on a focusing lens (a cylindrical lens in FIG. 29) 304, and is converted into a collimated beam with a uniform intensity distribution.

The light beam output from the focusing lens 304 is separated into three color components by a dichroic mirror 105 which transmits only light components having wavelengths near red, and a dichroic mirror 106 which transmits only light components having wavelengths near green and reflects light components having wavelengths near blue as in the first embodiment shown in FIG. 3, and these color components are modulated by liquid crystal panels 108 to 110 for displaying images corresponding to the respective wavelength components using a cold mirror 107 as well. Furthermore, the light beams modulated by the liquid crystal panels 108 to 110 are synthesized by a cold mirror 111 and dichroic mirrors 112 and 113, and the synthesized light beam is projected onto a screen 115 via a projection lens 114, thus displaying a color image on the screen 115.

Figure 30A:
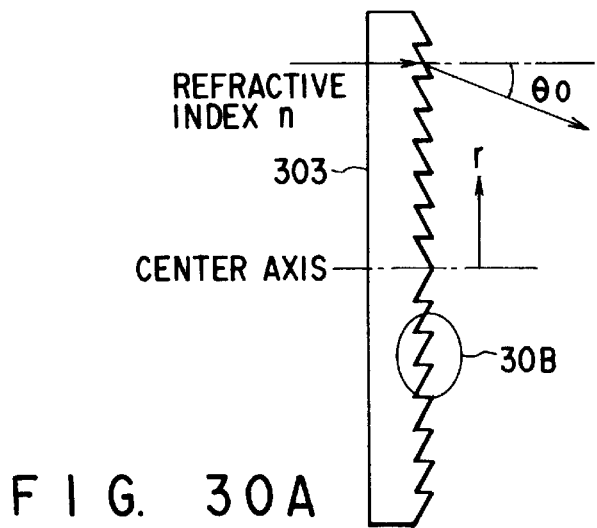
FIGS. 30A to 30D are views showing the detailed arrangement of an optical element in the sixth embodiment.
Figure 30B:
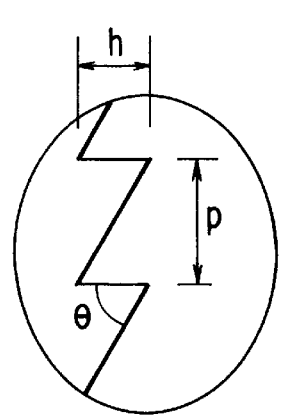

FIGS. 30A and 30B is a sectional view passing the center (optical axis) of the optical element 303. The optical element 303 consists of a flat transparent substrate such as a glass substrate, and trenches each having a tilt surface of a constant angle θ and a constant height h are concentrically or spirally formed on one surface of the substrate. The optical element 303 has a shape similar to that of a Fresnel lens. However, in terms of the sectional shape obtained by cutting the element along a plane passing the optical axis, the optical element 303 is characterized in that the angles θ of the cut trenches are almost constant. Light rays of the light beam incident on the optical element 303 are refracted, as indicated by an arrow illustrated in the upper portion of FIGS. 30A and 30B.

The effect of the optical element 303 will be explained below with reference to FIGS. 31A and 31B.

A converging light beam 401 which is emitted by the light source 301 in FIG. 29 and is reflected by the reflector 302 has a dark area 402 formed by the shade of the light source 301 at the central portion of the beam. Since the optical element 303 refracts light rays by the trenches and has the same effect as that of a prism, even when the light beam 401 incident on the element 303 has the dark area 402 at its central portion, the element 303 moves light rays at the marginal portion of the beam to the central portion, as shown in FIGS. 31A and 31B, and the dark area can be eliminated from an output light beam 403, thus relatively uniforming the intensity distribution.

The optical element 303 is disposed near a focal point P of the light beam 401 and in front of the focal point P in the propagation direction of the light beam 401 in the optical path of the light beam 401. When the optical element 303 is disposed at such a position, the light beam 403 which has passed through the optical element 303 has a collimation without being scattered, thus improving the utilization efficiency of light.

Of the light transmitted through the optical element 303, most of light rays emerging from upper half points 411 of the incident light beam 401 move to the lower half of the light beam, as indicated by points 413 of the output light beam 403, but some light rays reach the upper half of the light beam 403 like a light ray which emerges from a point 412 and reaches a point 414. For this reason, light rays having two different collimations are mixed inside an inner circle 404 of double circles representing the output light beam 403, and a bright point appears.

As described above, the converging light beam 401 which is emitted by the light source 301 in FIG. 29 and is reflected by the reflector 302 is converted into the light beam 403 having an intensity distribution from which the dark area at the central portion of the beam is eliminated, as shown in FIGS. 31A and 31B, when it passes through the optical element 303, thus improving the uniformity of the intensity distribution.

FIGS. 32 and 33 show the intensity distributions of the incident light beam 401 and the output light beam 403 of the optical element 303. Each intensity distribution is expressed by forming small dots at a density proportional to the intensity. As shown in FIG. 32, in the intensity distribution of the light beam 401 which is reflected by the reflector 302 (FIG. 28) having a spheroidal shape and is incident on the optical element 303, the intensity gradually lowers outwardly from the center of the beam, and the dark area (a region without dots) formed by the shade of the light source

301 itself appears near the center of the distribution. When the light beam 401 is incident on the optical element 303 and its light intensity is re-distributed, the dark area disappears from the output light beam since light rays at the marginal portion are collected toward the center of the beam, and a bright point appears instead.

FIG. 34 is a sectional view of FIGS. 32 and 33 taken along one plane passing the center of the optical axis. In FIG. 34, the distance from the center of the optical axis is plotted along the abscissa, and the light intensity is plotted along the ordinate. In FIG. 34, a solid curve corresponds to the incident light beam (FIG. 32) to the optical element 303, and a dotted curve corresponds to the output light beam (FIG. 33) from the optical element 303. Also, a broken curve represents the intensity distribution of the output light beam obtained when a conventional cone prism is used in place of the optical element 303. As can be seen from FIG. 34, when the optical element 303 according to this embodiment is used, the light intensity distribution of the light beam is redistributed to uniform the intensity distribution.

The optical element 303 of the present invention can radiate heat well due to a flat shape and is not easily destroyed by heat as compared to a conventional bulk-shaped cone lens. Since the optical element 303 allows easy manufacture of a large, low-profile element, the degree of freedom on design of the device becomes very high. Therefore, the high degree of freedom on design leads to various advantages:

(1) When the optical element is designed not to concentrate the power of light at one point, a device which has a higher resistance against heat destruction can be provided.

(2) Optimal design that places an importance on improvements of the collimation and illuminance can be attained.

(3) Since the optical element has a very low profile, even if a plurality of optical elements are used, the size of the device does not become so large.

The arrangement of the optical element 303 will be described in detail below. In the optical elements 303, the pitch and angle of trenches need only be selected to diffract light in a required direction. More specifically, as shown in FIGS. 30A to 30D, in order to a deflect perpendicularly incident light ray through an angle $\theta 0$ by the optical element 303, if the wavelength of light is represented by $\lambda$ and the pitch of the trenches of the optical element 303 is represented by p, the pitch p can be determined to satisfy $p \cdot \sin \theta 0 = \lambda$. The angle $\theta$ of the tilt surface of each trench can be determined to refract a light ray through a desired angle. More specifically, as shown in FIGS. 30A to 30D, if the angle of the tilt surface of the trench is represented by $\theta$, the height of the tilt surface of the trench is represented by h, and the refractive index of the constituting material (e.g., glass) of the optical element 303 is represented by n, from $n \cdot \cos \theta = \cos(\theta - \theta 0)$, $h = \lambda/(n - \cos \theta 0)$.

When light is diffracted by first-order diffraction in the optical element 303, light having a specific wavelength can be deflected through a desired angle, but light components having wavelengths other than the specific wavelength cannot be deflected through the desired angle. Since this is inconvenient for a case wherein a light beam such as white light incident on the optical element 303 includes wavelength in a wide range, high-order diffracted light may be used if such a problem occurs. FIG. 35 shows this state. The angle $\theta$ of the tilt surface of the trench remains the same for any of first order, second order, . . . , Nth order.

Figure 38:
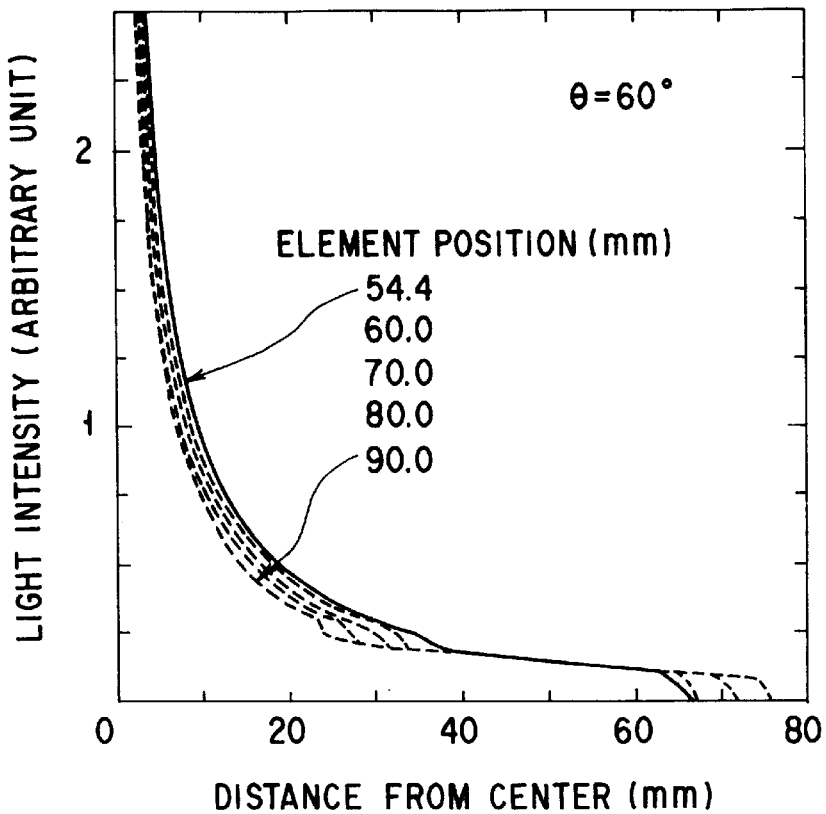
FIG. 38 is a graph showing the light intensity distribution of the output light beam using the element position as a parameter when the tilt angle of the trench of the optical element of the sixth embodiment is set to be θ=60°.

On the other hand, a conventional cone prism must be disposed near the converging point (the focal point of the light source) of a converging light beam. However, it is confirmed that performance suffers almost no deterioration in terms of re-distribution of the light intensity even when the optical element according to this embodiment is separated away from the converging point, as shown in FIGS. 31A and 31B. FIGS. 36 to 38 show this state. These three figures show the light intensities on one plane perpendicular to the central axis of the output light beam obtained when one optical element 303 is used. In these figures, the distance from the central axis is plotted along the abscissa, and the light intensity is plotted along the ordinate.

FIG. 36 shows the light intensities when the tilt angle $\theta$ of the trench shown in FIGS. 30A to 30D is 50°, FIG. 37 shows the light intensities when $\theta = 55°$, and FIG. 38 shows the light intensities when $\theta = 60°$. Each figure superposes graphs obtained when the optical element 303 is located at the position separated by 54.5 mm from the reflector 302 having a spheroidal shape (this position corresponds to the focal point position of the reflector 302), and is separated from this position in turn (60 to 90 mm) to overlap each other. As can be seen from FIGS. 36 to 38, none of the conditions have serious influence. In addition, when the optical element 303 is separated from the converging point of the incident beam, i.e., the focal point position of the reflector 302, since the power of the light is not concentrated on one point on the optical element 303, a distortion itself caused by heat does not easily occur, and a higher resistance against heat destruction can be assured.

Figures 39A, 39B:
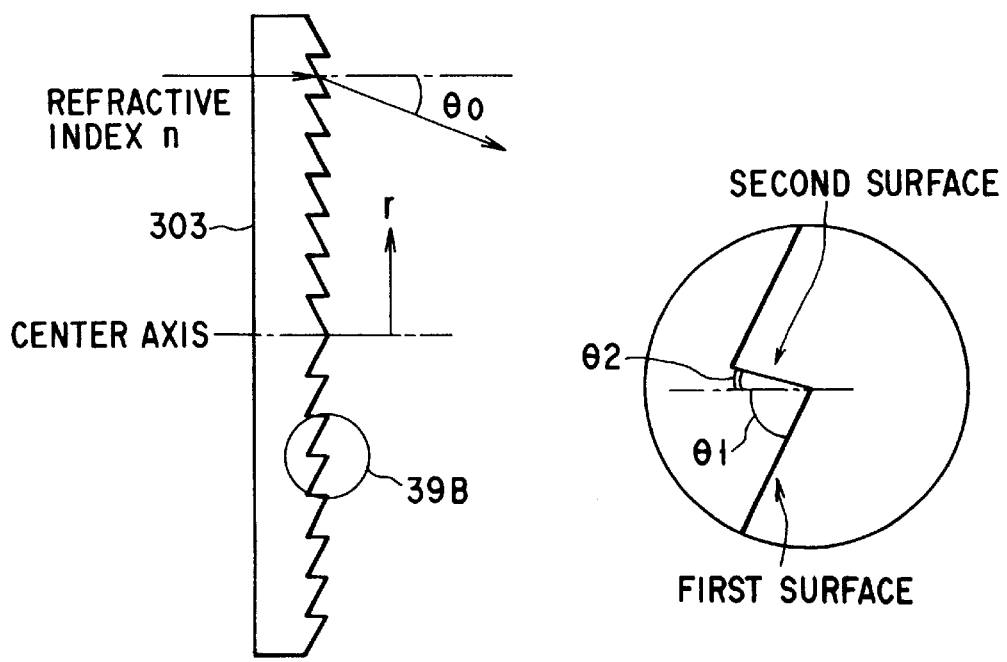
FIGS. 39A and 39B are views showing another example of the optical element in the sixth embodiment.

In the optical element 303 shown in FIGS. 30A and 30B, the trench is formed, so that the thickness of the tilt surface which is mainly used for refracting light rays decreases outwardly. Of the two different surfaces which define the trench, the tilt surface which is mainly used for light refraction and has the tilt angle $\theta$ will be referred to as a "first surface" hereinafter, and the surface parallel to the central axis will be referred to as a "second surface" hereinafter. In an example of the optical element 303 shown in FIGS. 39A and 39B, a surface which forms an angle $\theta 1$ with the central axis corresponds to the "first surface", and a surface which forms an angle $\theta 2$ with the central axis corresponds to the "second surface". At this time, the second surface need not always be parallel to the central axis. A reflection film may be adhered to the second surface, or the second surface may be subjected to a treatment to serve as a diffusion surface.

Figure 40:
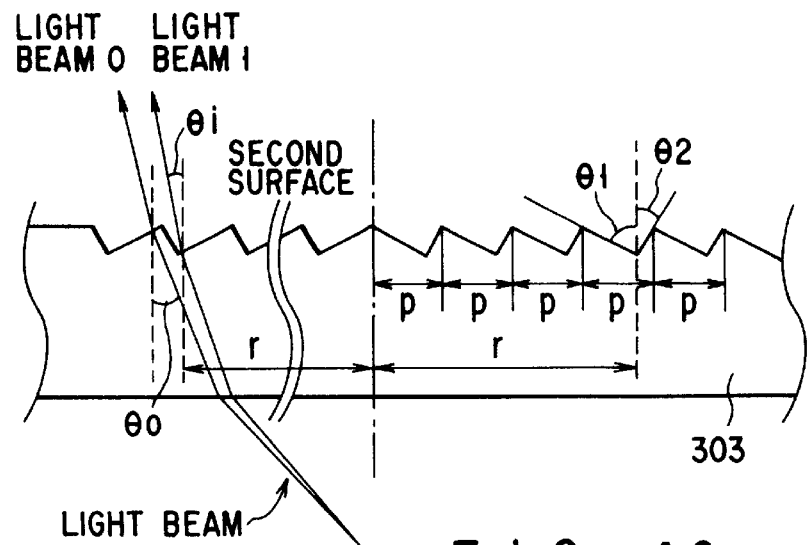
FIG. 40 is a view showing still another example of the optical element in the sixth embodiment.

FIG. 40 shows in detail a situation when the second surface is tilted in the optical element 303 shown in FIGS. 30A and 30B.

Assume that both a position where a light ray is transmitted through the element in the left side portion in FIG. 40, and a position where the angle of the tilt surface is presented in the right side portion in FIG. 40 are separated from the central axis by a radius r. Light rays I and O are two light rays which are focused at one point and are refracted at positions near the second surface near the radius r. The light ray I is refracted at a position slightly inside the second surface, and the light ray O is refracted at a position slightly outside the second surface. In this situation, in order to prevent both the light rays O and I in FIG. 40 from intersecting the second surface, the tilt angle $\theta 2$ of the second surface should be selected to satisfy $\theta i < \theta 2 < \theta o$ (where $\theta i$ and $\theta o$ are functions of the radius r). When this relation is not satisfied, the refracted light ray I or the light ray O before refraction is refracted or reflected and scattered by the second surface, thus lowering the utilization efficiency of light.

In actual design, the angle $\theta 2$ is preferably selected like $\theta 2 = (\theta i + \theta o)/2$ in consideration of a small margin, so as to satisfy $\theta i < \theta 2 < \theta o$. However, at a position with a small radius r near the center, θi<0 undesirably holds. In this case, since a trouble may occur in the manufacture of the element, the tilt angle is corrected to satisfy 0<θ2<θo.

FIGS. 41A to 41E show various examples of the entire pattern of the trenches formed on the optical element 303.

Figure 41A:
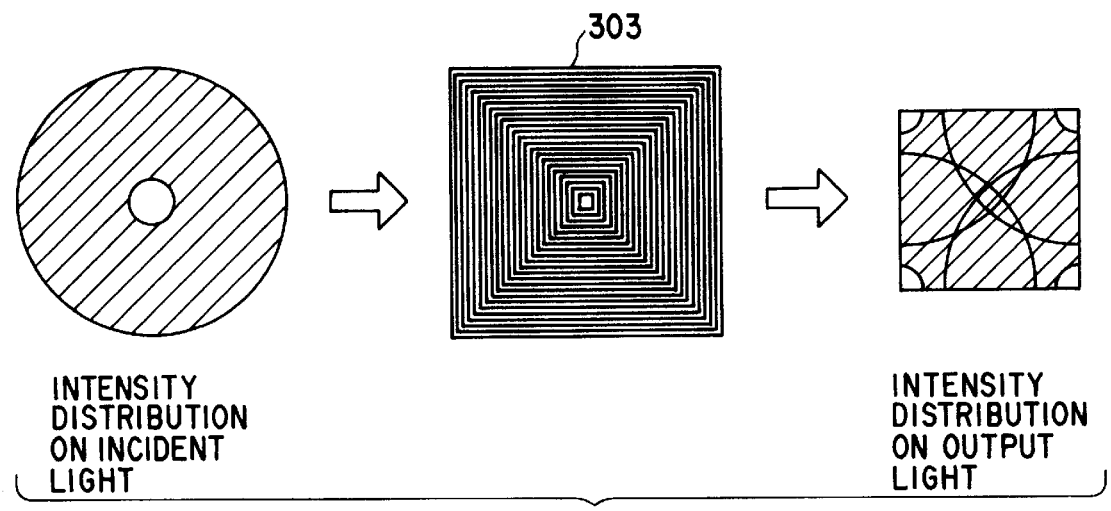
FIGS. 41A to 41E are views showing various trench shapes of the optical element in the sixth embodiment.

FIG. 41A shows an example in which trenches are formed in a loop pattern of rectangles having the same center but different sizes, i.e., in a multi-loop pattern consisting of a plurality of concentric rectangular loops. In this case, an incident light beam which has a dark area at the center of the beam and a circular beam shape, as shown in the left side portion in FIG. 41A is converted into an output beam which has no dark area, and has a rectangular beam shape, as shown in the right side portion in FIG. 41A, thus improving the uniformity of the intensity distribution. The example shown in FIG. 41A is suitable for a liquid crystal display device using a rectangular liquid crystal panel since the intensity distribution of the output light beam is uniformed, and the beam shape is converted into a rectangular shape.

Figure 41B:
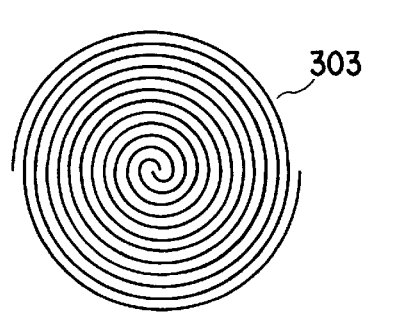
Figure 41C:
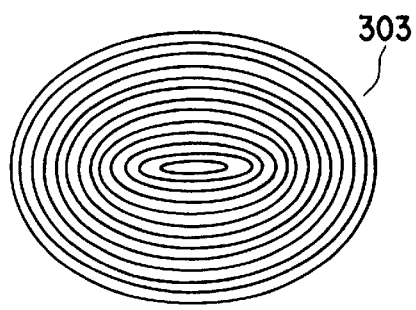
Figure 41D:
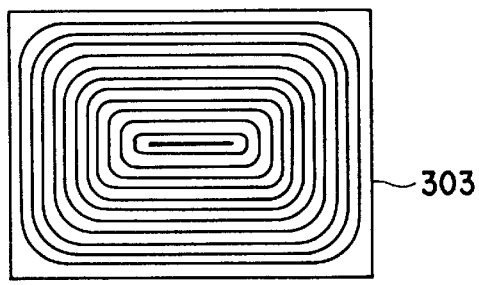
Figure 41E:
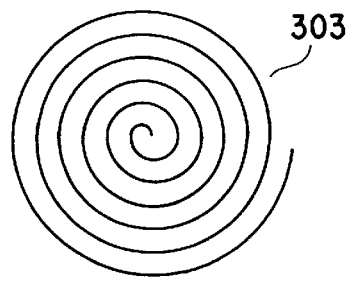

FIGS. 41B and 41E show examples in which a trench is spirally formed. In this case, the beam shape of the output light beam is converted into a circular shape, but the intensity distribution is uniformed.

FIG. 41C shows an example in which trenches are formed in an elliptic spiral pattern, i.e., an elliptic multi-loop pattern. In this case, the intensity distribution of the output light beam is uniformed, and the beam shape is converted into an elliptic shape. For this reason, when this element is applied to a normal liquid crystal device using a rectangular liquid crystal panel, the utilization efficiency of light can be improved as compared to FIGS. 41A, 41B, or 41E. In particular, when the ratio of the minor axis to the major axis of an ellipse is set to match the aspect ratio (e.g., 3:4 or 9:16) of the liquid crystal panel, the utilization efficiency of light can be further improved.

FIG. 41D shows an example in which trenches are formed in a rectangular multi-loop pattern with round corners, i.e., in a rectangular multi-loop pattern. In this case, the intensity distribution of the output light beam is uniformed, and the beam shape is converted into a rectangular shape. For this reason, when this element is applied to a normal liquid crystal device, the utilization efficiency of light can be further improved as compared to the example shown in FIG. 41C. In this case as well, as in FIG. 41C, when the aspect ratio of the rectangle is set to match the aspect ratio (e.g., 3:4 or 9:16) of the liquid crystal panel, the utilization efficiency of light can be further improved.

As described above, even when the angle of the tilt surface of the trench of the section taken along one plane depending on the method of selecting one plane passing the optical axis, all such modifications are included in the present invention.

In this embodiment, the trenches of the optical element 303 are formed on the incident surface side of the substrate, but may be formed on the output surface side. In FIGS. 30A and 30B, the trench is formed so that the thickness of the tilt surface decreases outwardly, but the trench may be formed, so that the thickness of the tilt surface increases outwardly.

In this embodiment, the optical element 303 is constituted as a transmission type element, but may be constituted as a reflection type element. When the optical element is constituted as a reflection type element, an almost similar optical element can be formed by reversing the three-dimensional pattern and changing the scale of undulations.

On the other hand, when a transmission type screen is used, it is assembled in an apparatus together with the projection device. However, when a reflection type screen is used, it may be assembled in an apparatus together with the projection device, or components up to the projection lens may be integrated as the projection device to use a stand-alone screen. In addition, in order to improve the utilization efficiency of light or to reduce the aperture size of the projection lens, a field lens may be inserted immediately after the liquid crystal panels.

In order to attain size, weight, and cost reductions of the device, a single-panel arrangement using a single liquid crystal panel having color filters may be adopted in place of three panels, and the number of liquid crystal panels is not particularly limited. In the single-panel arrangement, since dichroic mirrors and cold mirrors for color separation and color synthesis can be omitted, the number of constituting parts of the device can be reduced.

Furthermore, transmission type liquid crystal panels are used as spatial light modulators. Alternatively, reflection type liquid crystal panels may be used, or micro-mirror arrays may be used in place of the liquid crystal panels. Thus, the present invention is not limited to any specific type of spatial light modulator.

Light (white light) emitted by the light source 301 such as a metal halide lamp is reflected by the reflector 302 having a spheroidal shape, and is converted into a converging light beam which substantially converges at one point. Alternatively, the converging light beam may be obtained by focusing a collimated beam obtained by a reflector having a paraboloidal shape via a lens, and a method of converting light emitted by the light source into a converging light beam is not particularly limited.

In the above detailed description, the optical element 303 is disposed at the side far from the light source with respect to the focal point (in front of the converging point in the propagation direction of the light beam), as shown in FIGS. 30A and 30B. Contrary to this arrangement, the optical element 303 may be disposed at the side near the light source with respect to the focal point (behind the converging point in the propagation direction of the light beam).

Figure 30C:
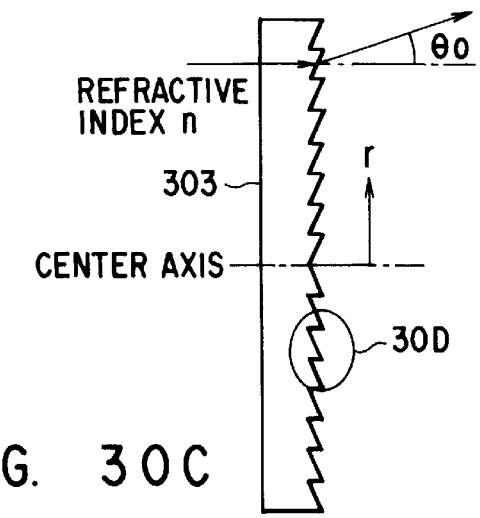
Figure 30D:
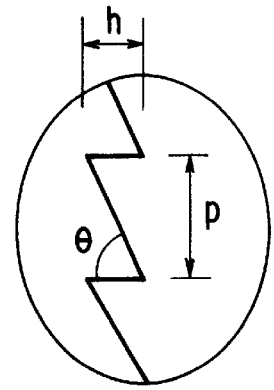

For this purpose, an optical element 303 shown in FIGS. 30C and 30D is used in place of the optical element 303 shown in FIGS. 30A and 30B. The optical element 303 shown in FIGS. 30C and 30D has a characteristic opposite to that of FIGS. 30A and 30B although the pitch p of the trench and the angle θ of the tilt surface of the trench are determined by the same method as in FIGS. 30A and 30B. The effect of the optical element 303 in FIGS. 30C and 30D on the light beam is as shown in FIG. 31B, and the same effect as that obtained using the optical element shown in FIGS. 30A and 30B can be provided. Modifications discussed above in association with the optical element 303 shown in FIGS. 30A and 30B can be applied to the optical element 303 shown in FIGS. 30C and 30D.

(Seventh Embodiment)

In the sixth embodiment, the optical element 303 which is constituted by forming trenches each having a tilt surface with a constant angle and a constant height in a concentric or spiral pattern on the flat surface is used. Alternatively, the same function as that of the element 303 may be realized by the distribution of the phase transfer function.

Figure 42:
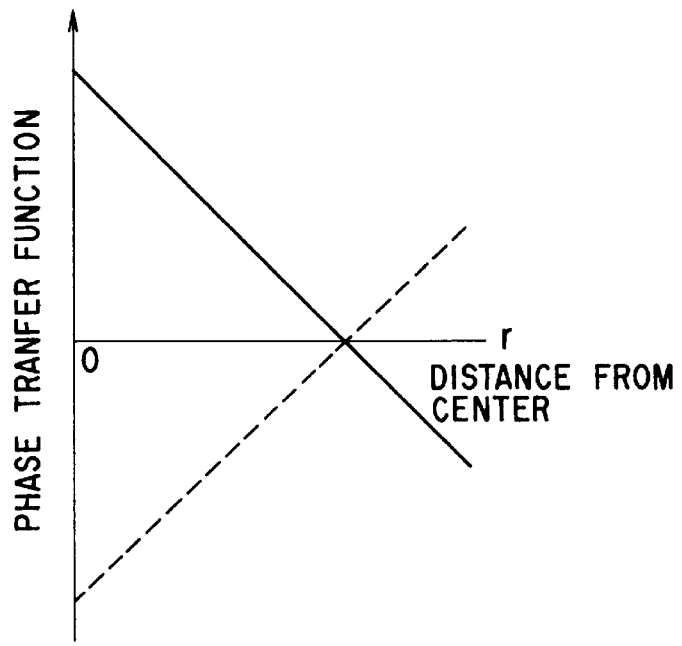
FIG. 42 is a graph showing the phase transfer function distribution of an optical element according to the seventh embodiment of the present invention.

A solid line in FIG. 42 represents the characteristic of an optical element according to this embodiment. In FIG. 42, the distance from the center (optical axis), i.e., the distance toward the outer periphery side is plotted along the abscissa, and the phase transfer function is plotted along the ordinate. As shown in FIG. 42, when a half line is drawn from the center toward the outer periphery, the optical element of this embodiment has a characteristic for gradually decreasing the phase transfer function. When the optical element of this embodiment is used in place of the optical element 303 in FIG. 29, light rays of the incident light beam are similarly refracted.

In the above description, the optical element 303 is disposed at the side far from the light source with respect to the focal point (in front of the converging point in the propagation direction of the light beam). Contrary to this arrangement, the optical element 303 may be disposed at the side near the light source with respect to the focal point (behind the converging point in the propagation direction of the light beam). For this purpose, an optical element 303 having a characteristic indicated by a broken line in FIG. 42 is used. More specifically, the optical lamp 303 in this case has a characteristic for increasing the phase transfer function as the distance from the center increases.

Note that the rate of decrease or increase in phase transfer function may vary depending on the way of selecting the above-mentioned half line. More specifically an equi-phase transfer function line may have an elliptic shape, a rectangular shape, or the like in place of a circular shape. In this case, the optical element of this embodiment is considerably different from a Fresnel lens in that the optical element is worked to increase or decrease the increment amount of the phase change to be given to light by an amount proportional to the radius from the center toward the outer periphery.

(Eighth Embodiment)

Figure 43:
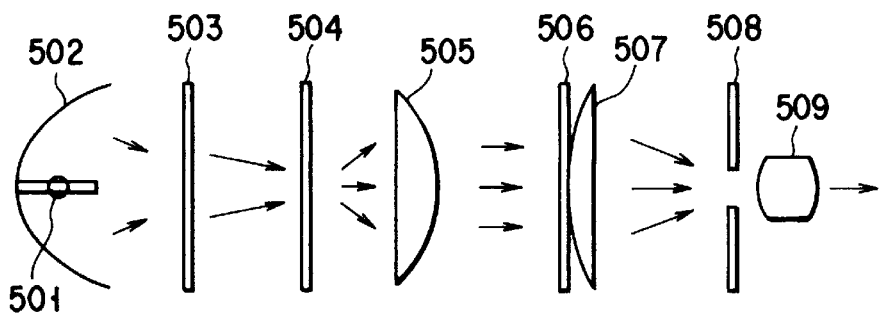
FIG. 43 is a view showing the arrangement of an optical system in a projection type liquid crystal display device according to the eighth embodiment of the present invention.

FIG. 43 shows the arrangement of an optical system in a projection liquid crystal display device according to the eighth embodiment. In this embodiment, two optical elements are used. Light emitted by a light source 501 such as a metal halide lamp is reflected by a reflector 502 having a spheroidal shape, and is converted in to a light beam which is substantially focused at one point. The light beam is passed through a first optical element 503 which has the same arrangement as that of the optical element 303 described in the sixth or seventh embodiment, and is converted in to a light beam which has no dark area at the central portion and has a uniform intensity distribution.

The light beam whose intensity distribution is uniformed by the first optical element 503 is passed through a second optical element 504 for improving the collimation of the light beam, thus improving the impaired collimation caused by mixing of light rays having two different collimations in the output light beam from the output element 303 in the sixth and seventh embodiments, and suppressing a bright point.

The light beam emerging from the second optical element 504 is focused by a collimator 505, and the focused light beam is incident on a liquid crystal panel 506. Thereafter, the light beam is focused by a field lens 507, and passes through an aperture stop 508. Then, the light beam is guided to a screen (not shown) via a projection lens 509.

The effect of the first and second optical elements 503 and 504 in this embodiment will be described below with reference to FIG. 44.

Figure 44:
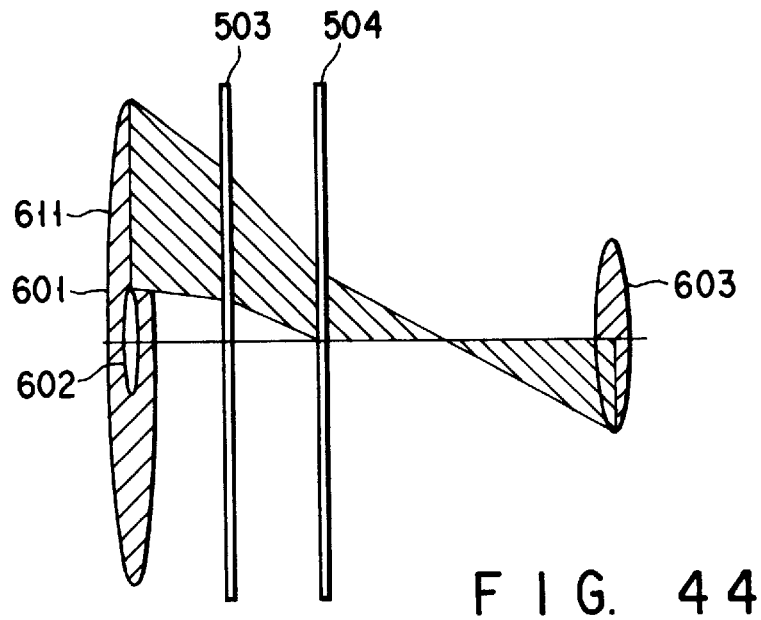
FIG. 44 is a view for explaining the effects of the first and second optical elements in the eighth embodiment.

As shown in FIG. 44, a converging light beam 601 which is emitted by the light source 501 in FIG. 43 and is reflected by the reflector 502 has a dark area 602 formed by the shade of the light source 501 at the central portion of the beam. Since the first optical element 503 refracts light rays by trenches and has the same effect as that of a prism, as has been described in the sixth embodiment, even when the incident light beam 601 has the dark area 602 at its central portion, light rays at the beam marginal portion are collected by the first optical element 503, as shown in FIG. 44. In this case, when the second optical element 504 is disposed at a position 612 where a light ray 611 of the innermost peripheral portion of the incident light beam 601 reaches the center of the optical axis, light rays at the inner peripheral portion can be prevented from overlapping light rays coming from the outer peripheral portion beyond the center of the optical axis at the output side of the second optical element 504.

This embodiment can prevent generation of a bright point which is observed in the output light beam 403 from the optical element 303 in the sixth embodiment, as shown in FIGS. 31A and 31B, thus further uniforming the intensity distribution.

Figure 45:
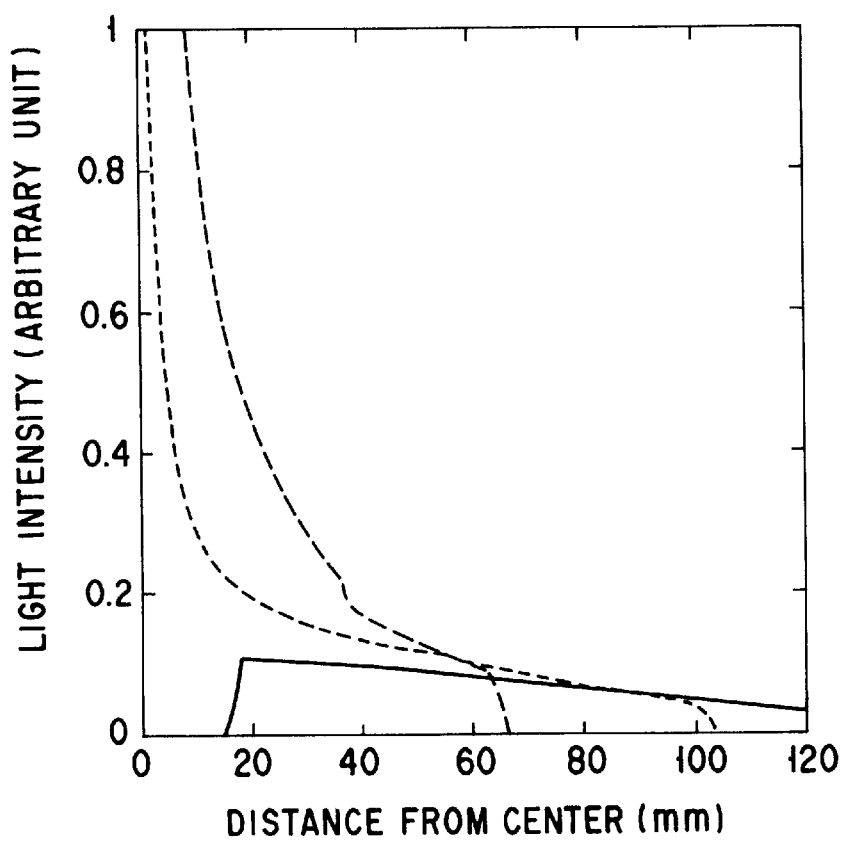
FIG. 45 is a graph showing the light intensities of a light beam incident on the first optical element and a light beam output from the second optical element in the eighth embodiment with respect to the distance from the center of the optical axis.

In fact, when the light intensity distribution of the light beam on a plane perpendicular to the central axis at a given output-side position with respect to the incident light beam, as shown in FIG. 32, is calculated is the arrangement of this embodiment, the result shown in FIG. 45 is obtained. In FIG. 45, the distance from the center is plotted along the abscissa, and the light intensity is plotted along the ordinate. In FIG. 45, solid curve represents the light intensity distribution of the incident light beam shown in FIG. 32, a broken curve represents the light intensity distribution obtained when only the optical element 503 (the optical element 303 in the sixth embodiment) is disposed, and a dotted curve represents the light intensity distribution obtained when both the optical elements 503 and 504 are disposed. The two optical systems have basically the same dispositions. As can be seen from FIG. 45, although a small bright point appears at the central portion of the output light beam, the size of the bright point becomes smaller than that obtained when only the optical element 503 (303) is arranged, and the uniformity of the light beam is further improved.

As described above, according to this embodiment, since the second optical element 504 is added, the collimation of the light beam is improved, the utilization efficiency of light can be improved, and a size of a bright point is suppressed, thus further uniforming the light intensity distribution.

Note that FIG. 43 illustrates a single-panel type liquid Crystal display device for the sake of simplicity. However, as in the above embodiments, the first and second optical elements can be applied to a three-panel type liquid crystal display device, as a matter of course. In this embodiment, two optical elements according to the present invention are used. However, three or more optical elements may be used.

Furthermore, the present invention can be applied to various optical information processing apparatus. In this case, a spatial light modulator may be used, or a grating-like mask pattern may be disposed in place of the spatial light modulator.

(Ninth Embodiment)

Figure 46:
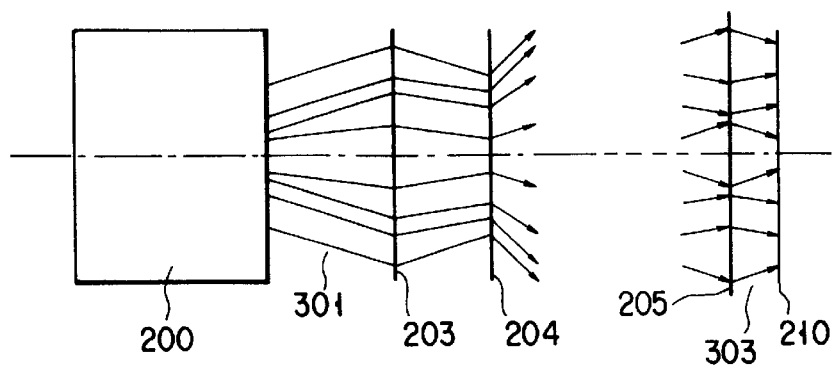
FIG. 46 is a view showing a schematic structure of an optical device of a ninth embodiment of the present invention.

FIG. 46 is a view showing a schematic structure of an optical device of a ninth embodiment of the present invention. According to the device of the ninth embodiment, a predetermined shaped light beam having substantially a uniform light intensity distribution is formed by a plurality of optical elements (n−1 elements).

In FIG. 46, a light beam 301 emitted from a light beam generator 200 is transmitted through the first to (n−1)th optical elements 203 to 205, and reaches a surface 210 where a target light intensity distribution can be obtained. In this case, the optical elements used in this embodiment has the same function as the case of FIG. 12.

More specifically, though a specific setting is described later, the optical elements are designed such that a position of an output light at a target surface corresponding to an incident position is set, and the output light reaches the set position.

Then, the predetermined shaped output light having substantially a uniform light density distribution can be obtained. In this case, in consideration of the rectangular light shape, the uniform light density distribution includes a case in which a central portion is lighter (brighter) than a peripheral portion (for example, lightness of the central portion is twice to three times stronger than that of the peripheral portion).

Figure 47:
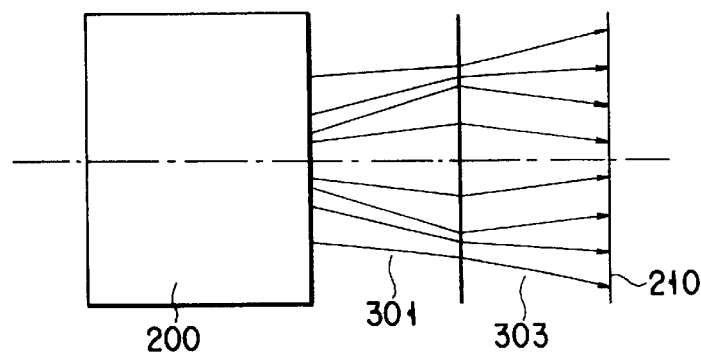
FIG. 47 is a view showing a modification of a ninth embodiment of the present invention.

FIG. 47 is a view showing a modification of the ninth embodiment. FIG. 47 shows an example in which only one optical element is used in place of the plurality of optical elements. In the case of using the plurality of optical elements, there can be obtained an advantage in that a color aberration can be compensated and degree of freedom of adjusting light intensity distribution can be enlarged by combination of the plurality of optical elements. However, as in the modification, the structure of the optical device can be simplified by use of only one optical element.

(Tenth Embodiment)

Figure 48:
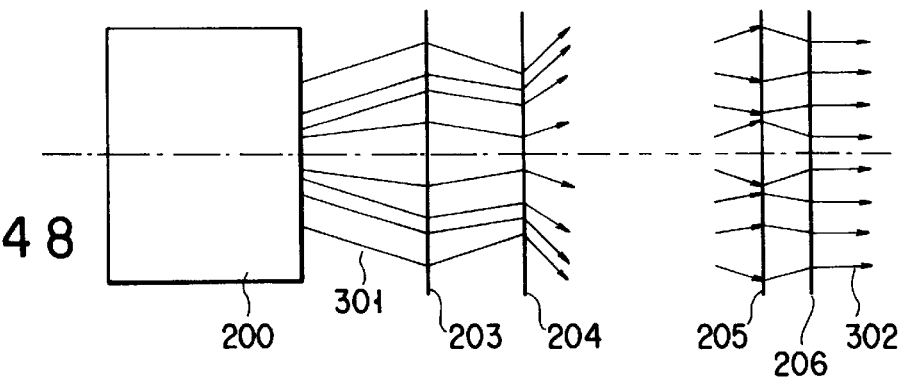
FIG. 48 is a view showing a schematic structure of the optical device of a tenth embodiment of the present invention.

FIG. 48 is a view showing a schematic structure of an optical device of a tenth embodiment of the present invention. The optical device of FIG. 48 is structured such that an optical element 206 for providing collimation (parallel, convergence or divergence) to the incident light beam is added to the position of the target surface 210 in the optical device of FIG. 46.

As mentioned in the ninth embodiment, in FIG. 46, light passed through the optical elements 203 to 205 has no collimation, but has the uniform light intensity distribution and the predetermined shape at the target surface. However, in such a state, collimation is desirably provided to the light beam as in the parallel beam if the projection type optical device is used. Therefore, to provide collimation to the light beam having the uniform light intensity distribution and the predetermined shape, the optical element 206 is provided on the target surface, thereby obtaining a light beam having a predetermined collimation such as parallel.

Figure 49:
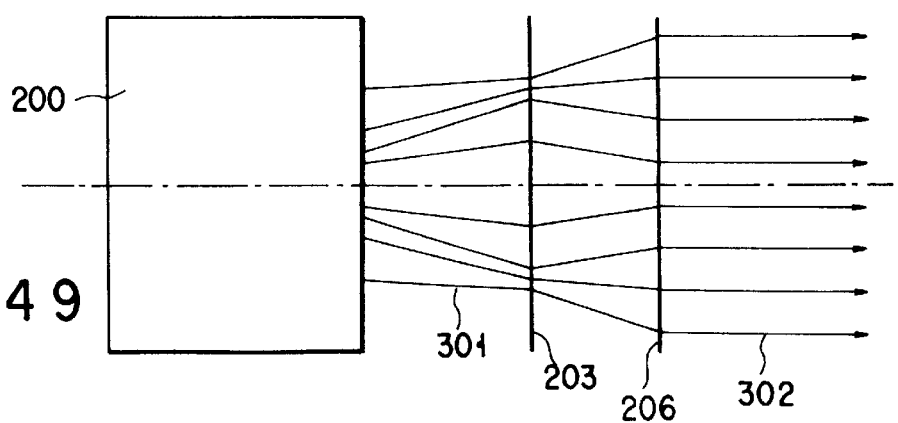
FIG. 49 is a view showing a modification of the tenth embodiment of the present invention.

FIG. 49 is a view showing a modification of the tenth embodiment. FIG. 49 shows an example in which only one optical element for obtaining the light beam having a desired shape is used in place of the plurality of optical elements. In other words, there is shown an example in which the optical element for providing collimation to the light beam is formed at the target surface of FIG. 47. In this case, as explained in the ninth embodiment, the optical device can be formed by the structure, which is easier than the case of FIG. 48.

In a case where the plane where the target light density distribution is to be obtained is set to a position far from the light beam generator which is farther than the position of the optical element 206, and higher collimation is required at the position, collimation and light density distribution on the second optical element 206 are determined based on collimation and the light density distribution on the first optical element. Thereby, each optical element can be designed. If higher collimation is not required at the position, the structure having the same as the case of the ninth embodiment may be provided since there is no need of the optical elements for providing collimation.

Figure 50:
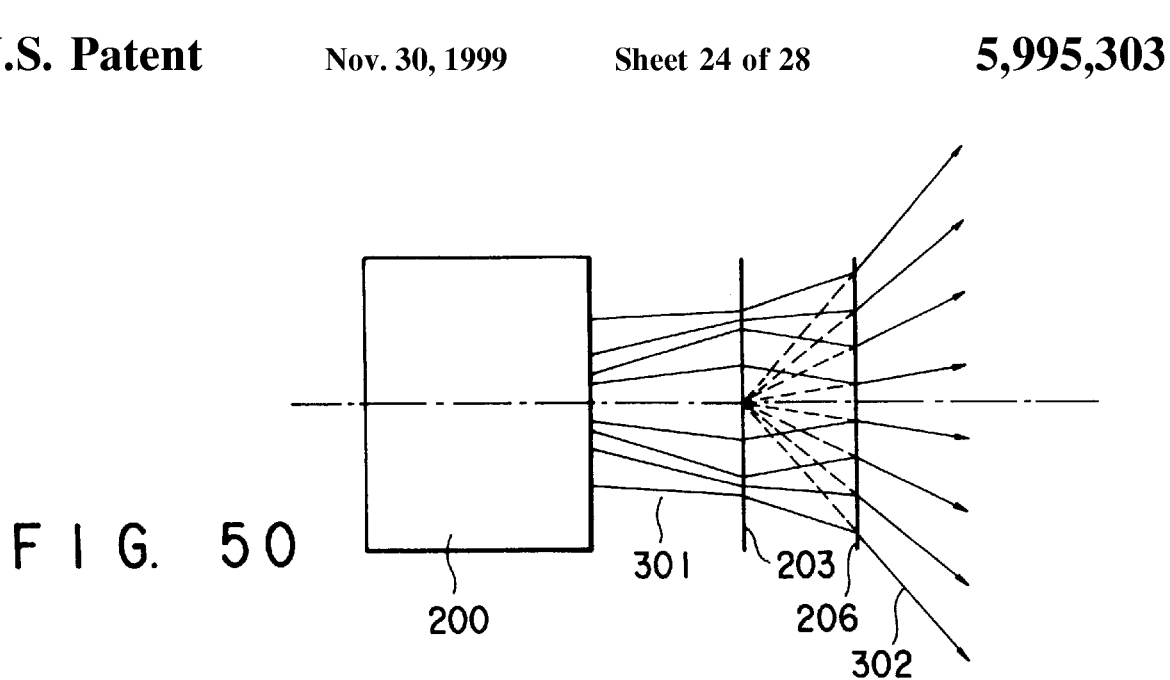
FIG. 50 is a view showing the other modification of the tenth embodiment of the present invention.

Though FIGS. 48 and 49 showed the case in which collimation is provided to the light beam such that the light beam is made parallel, the present invention is not limited to the above case. More specifically, as collimation of the light beam after passing through the optical element 206, the light beams are not always formed to be parallel. As shown in FIG. 50, there may be used collimation in which the light beam diverges from a certain point as a center or collimation in which the light beam converges at a certain point. In such a case, the cross section light density distribution on an arbitrary plane, which is perpendicular to a central axis after the light beams are passed through the optical element 206, is in a state of a target distribution, and the distribution is shaped to be expanded or reduced. Moreover, it is possible to intentionally disturb collimation of the light beam after passing through the optical element 206.

Figure 51:
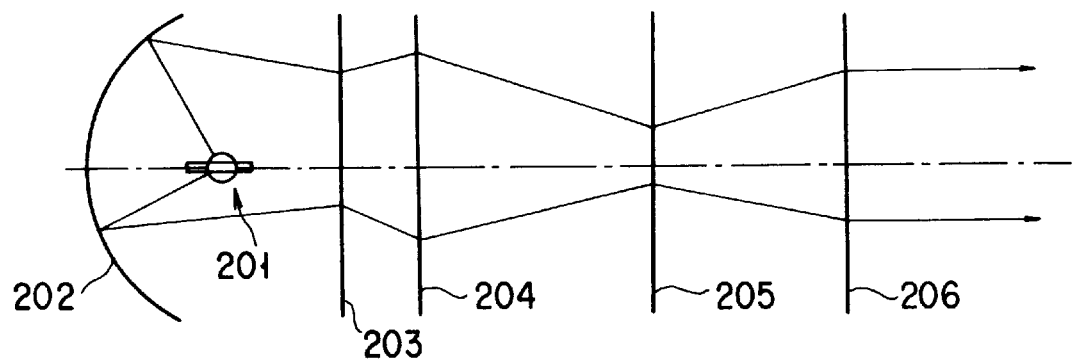
FIG. 51 is a view showing the other modification of the tenth embodiment of the present invention.

In the case of design, it is designed that light beams, which are emitted from the light beam generator and are not yet arrived at the first optical elements, are not crossed each other excepting that all light beams converge to one point. For example, the light beams, which are emitted from the light source, regarding as a point light source as in FIG. 51, and guided by a reflection mirror, satisfy the above condition. This condition is effective in a system approximately concluded and not strictly concluded actually.

(Eleventh Embodiment)

Figure 52:
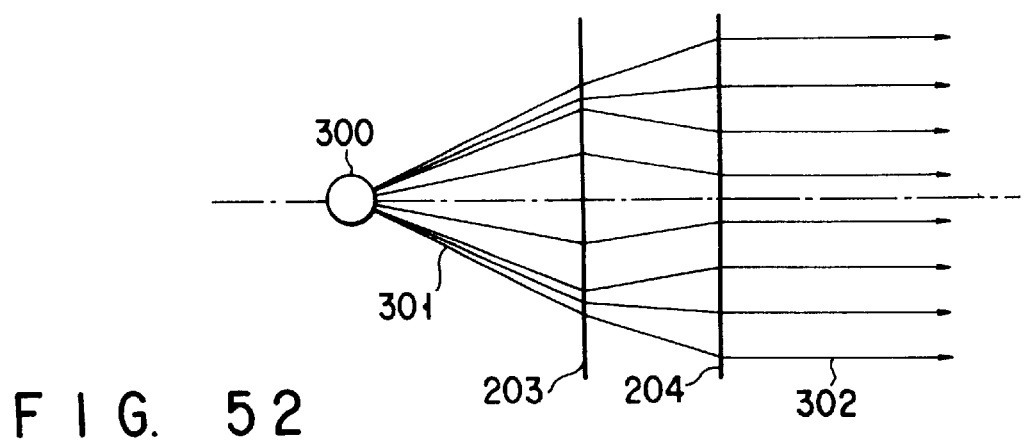
FIG. 52 is a view showing a schematic structure of the optical device of an eleventh embodiment of the present invention.
Figure 58A:
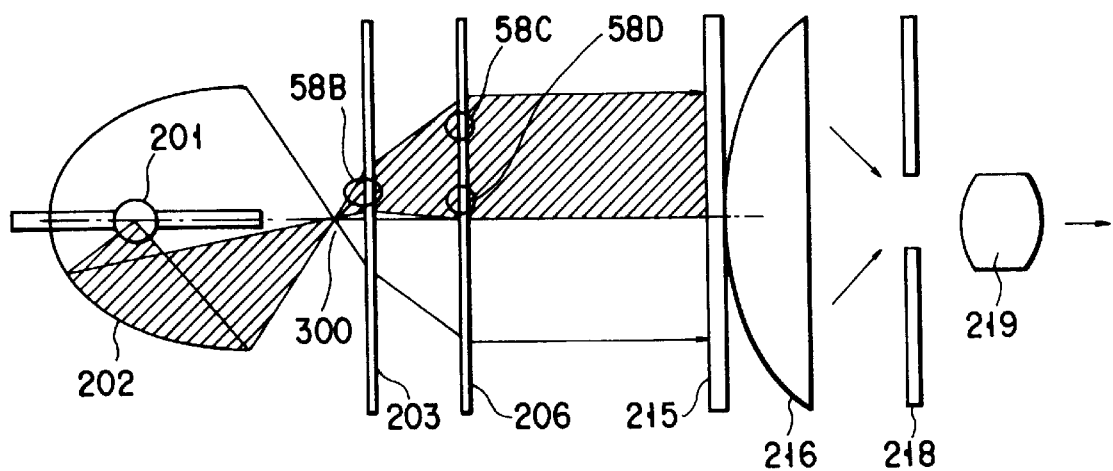
FIGS. 58A to 58D are views showing a case in which the optical elements of the present invention is applied to a liquid crystal projector.
Figure 58B:
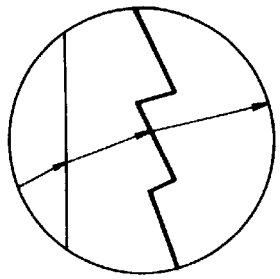
Figure 58C:
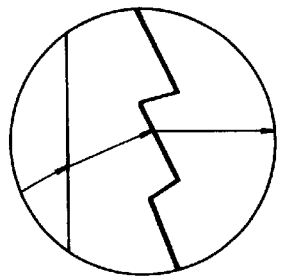
Figure 58D:
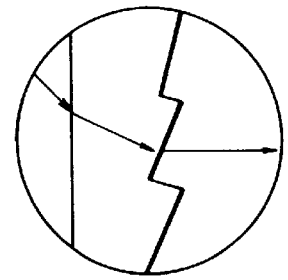

An eleventh embodiment explains a specific designing method of the optical elements of the present invention. FIG. 52 is a view showing a schematic structure of the optical device of the eleventh embodiment. Though the basic structure of the device of the eleventh embodiment is the same as the device of FIG. 49, a point light source is used as a light source.

The following will explain the positioning of the light beams at the incident surface and the output surface.

It is assumed that the system, which is symmetrical to the central axis, is considered and a point light source 300 is provided on the central axis. The following will consider an arbitrary one light beam 301 emitted from the light source. In this case, the light beam is made incident on a position of a radius x2 away from the center of the first optical element 203, and arrived at a position of a radius x3 away from the second optical element 206. An actual light density distribution on the first optical element 203 is set to Li(x2). For obtaining a light density distribution of Lo(x3) on the second optical element 206, if the following relationship between x2 and x3 is established, the target light density distribution can be obtained.

$$\int_0^{x2} Li(x') \cdot 2\pi x' dx' \Big/ \int_0^{x2max} Li(x') \cdot 2\pi x' dx' = \int_0^{x3} Lo(x') \cdot 2\pi x' dx' \Big/ \int_0^{x3max} Lo(x') \cdot 2\pi x' dx'$$

wherein x2max is a maximum value of x2, and x3max is a maximum value of x3.

If an angle formed between the light beam emitted from the point light source and the central axis is 1 and a luminance distribution of the light source is I($\theta$1), the above equation can be expressed as follows:

$$\int_0^{\theta 1} Li(\theta') \cdot 2\pi \sin\theta' d\theta' \Big/ \int_0^{\theta 1 max} Li(\theta') \cdot 2\pi \sin\theta' d\theta' = \int_0^{x3} Lo(x') \cdot 2\pi x' dx' \Big/ \int_0^{x3max} Lo(x') \cdot 2\pi x' dx'$$

wherein Lo(x')=const. However, if Lo(x')=0 (|x'|>x3max, the following relationship is established.

$$x3 \infty \int_0^{\theta 1} I(\theta') \cdot 2\pi \sin\theta' d\theta'$$

In this case, the above expression is solved and x3 can be expressed by $\theta$1.

The following will explain a method for determining a light beam passage. It is assumed that no grading is provided to the incident side surface of the light beams in the first and second elements. A cross sectional view of the elements is shown in FIGS. 53A and 53B. Then, the following equation is set up based on FIG. 54.

$$x2=(z2-z1-d2)\times\tan\theta1+d2\times\tan(\sin^{-1}(\sin\theta1/n))$$

Therefore, x2 can be expressed by θ1. Also, θ2 can be obtained by solving the following equation.

$$(z3-z2-d3)\times\tan\theta2$$
$$=x3-x2-d3\times\tan(\sin^{-1}(\sin\theta2/n))$$

Therefore, since x2 can be expressed by 1, θ2 is determined by θ1. In a case where the thicknesses of the elements, that is, d2 and d3 are sufficiently small, the following equation is established:

$$\theta2=\tan^{-1}\{(x3-x2)/(z3-z2)\}$$

Moreover,
θ3=0.

As mentioned above, θ2 against θ1, x3, and θ3 are determined.

Then, an angle of a trench surface of each of the optical elements is determined as follows.

First, a concentric trench is formed on the output side of each light beam of each of the first and second optical elements. Inclination angles of the trenches in radii x2 and x3 are respectively expressed by Θ2(x2) and Θ3(x3) such that a normal vector forms an angle outside against the central axis. When the light beam, which is incident on the first element at an incident angle θ1, is outputted at an output angle, Θ2 is determined as follows:

$$\Theta2 = \tan^{-1}\frac{\sin\theta2 - n\cdot\sin\{(\sin^{-1}(\sin\theta1/n)\}}{\cos\theta2 - n\cdot\cos\{(\sin^{-1}(\sin\theta1/n)\}}$$

Also, Θ3 is determined as follows:

$$\Theta3 = \tan^{-1}\frac{\sin\theta3 - n\cdot\sin\{(\sin^{-1}(\sin\theta2/n)\}}{\cos\theta3 - n\cdot\cos\{(\sin^{-1}(\sin\theta2/n)\}}$$

As mentioned above, the optical elements of the present invention are designed.

FIGS. 55 to 57 show the actual examples of the design. FIG. 55 is an example of the design showing of an output angle from the point light source and an arrival position when two optical elements are used. FIGS. 56 and 57 are examples of the design showing the first and second optical elements in FIG. 55, respectively.

(Twelfth Embodiment)

FIGS. 58A to 58D are views showing the structure of an optical system of a projection type image (liquid crystal) display device using two optical elements of the present invention.

In FIGS. 58A to 58D, light (white light) emitted from a light source 201 like a metal halide lamp is reflected by a rotational elliptical reflection mirror 202, and converged on a point 300 to form a light beam. The light beam is passed through an optical element 203 for converting a light intensity distribution, so that the light beam is converted to a light beam have a uniform cross section of the light intensity distribution in which a dark area of the central portion is eliminated. Thereafter, the light beam in which the light intensity distribution is shaped is passed through an optical element 206 for improving collimation of the light beam, so that collimation of is improved to become a parallel light beam. The light beam is focused by a focusing lens 216 and made incident onto a liquid crystal panel 215. Thereafter, the light beam is focused again by a second focusing lens 216, and passed through an iris 218 to be guided to a screen by a projection lens 219.

As mentioned above, by using two optical lens of the present invention, uniformity of the intensity distribution on light passed through the optical element and its collimation can be improved. Also, these optical elements can be designed as described in the eleventh embodiment.

FIG. 59 is a view showing the intensity distribution on light on the first optical element of the light beam emitted from the light source by density of dots. FIG. 60 is a view showing the intensity distribution of the cross section the parallel light beam obtained by the optical device by density of dots.

As mentioned above, the light beam emitted from the point light source can be converted to a uniform circular parallel light beam.

Though the above explained the embodiments of the present invention, the present invention is not limited to the structure of the above embodiments. For example, the shape of the intensity distribution on light can be converted to an arbitrary shape, which is symmetrical to the central axis.

Moreover, the light beam to which collimation is provided is not always formed to be parallel. It is possible to convert the light beam to a light beam having collimation diverging from a certain point. Also, it is possible to convert the light beam to a light beam having collimation converging at a certain point. Furthermore, collimation of the light beam can be intentionally disturbed.

Though FIGS. 58A to 58D explained the present invention by use of the projection type image (liquid crystal) display device of a single panel type, it is of course possible to use a projection type image (liquid crystal) display device of a three-panel type.

Moreover, though the above embodiments explained the case in which two optical elements of the present invention are used, three or more optical elements may be used, and in such a case, more effective result can be obtained.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical element for converting an incident light beam having a predetermined cross-sectional shape and a predetermined light intensity distribution into an output light beam having a rectangular shape, and a predetermined intensity distribution within the rectangular shape which is more uniform intensity distribution than the incident light, wherein at least one of a phase transfer function which represents an advance and delay amount of a phase to be given to a typical wavefront of the incident light, and a shape of a surface of said optical element is set on the basis of an optimization calculation.

2. An optical element according to claim 1, wherein the output light has the same shape as a spatial light modulator.

3. An optical element according to claim 1, wherein said output light of the central portion is brighter than that of the peripheral portion.

4. An optical device comprising:
a first optical element for shaping a beam shape of an incident light beam into a rectangular shape having a more uniform intensity distribution with the rectangular shape relative to the incident light beam,
wherein at least one of a phase transfer function which represents an advance and delay amount of a phase to be given to a typical wavefront of the incident light beam, and a shape of a surface of said first optical element is set on the basis of an optimization calculation.

5. An optical device according to claim 4, further comprising the second optical element for giving a collimation to the incident shaped light beam, a spatial light modulator for receiving the light beam which is given the collimation by said second optical element, and for displaying a desired image.

6. An optical device according to claim 4, wherein said first optical element uses diffracted light of second order or higher of the incident light beam, and concentrates an intensity of the diffracted light in a diffraction direction to be used.

7. An optical device according to claim 4, wherein said first optical element comprises a transparent substrate which is disposed substantially perpendicularly to an optical axis of the light beam in an optical path of the incident light beam, and on a surface of which a trench defined by a plurality of curves is formed.

8. An optical device according to claim 4, further comprising a second optical element arranged as a next stage of said first optical element for converting an incident light beam to one of a parallel light beam and a light beam having a predetermined angle to an optical axis.

9. An optical device according to claim 8, further comprising:
a spatial light modulator arranged as a next stage of said/second optical element for modulating an incident light; and
a field lens arranged as a next stage of said spatial light modulator.

10. An optical device according to claim 4, wherein said first optical element includes one of a diffraction type optical element, a reflection type optical element and a transmission type optical element.

11. An optical device according to claim 10, further comprising a second optical element using diffracted light of second order or higher of the incident light beam, and concentrating an intensity of the diffracted light in a diffraction direction to be used.

12. An optical device according to claim 10, wherein said first optical element includes a diffraction grating forming a fringe pattern.

13. An optical device according to claim 4, further comprising a dichroic mirror for transmitting only light components having predetermined wavelengths.

14. An optical device comprising:
a first optical element which is disposed in an optical path of a light beam having a predetermined intensity distribution, and has a characteristic for linearly decreasing or increasing a phase transfer function outwardly from an optical axis on a plane perpendicular to the optical axis of the light beam; and
a second optical element disposed in an optical path of the light beam which has passed through said first optical element, and adapted to give a collimation to the incident light beam.

15. An optical device according to claim 14, further comprising a spatial light modulator for receiving the light beam which is given the collimation by said second optical element, and for displaying a desired image.

16. An optical device comprising:
an optical element which is disposed near a converging point in an optical path of a converging light beam having a predetermined distribution, and comprises a transparent substrate on a surface of which a trench having a tilt surface of a predetermined angle is substantially concentrically or spirally formed.

17. An optical device according to claim 16, further comprising a spatial light modulator disposed in an optical path of the light beam which has passed through said optical element, and adapted to display a desired image.

18. An optical device comprising: an optical element which is disposed near a converging point in an optical path of a converging light beam having a predetermined distribution and in front of the converging point in a propagation direction of the flight beam, and has a characteristic in which a phase transfer function linearly decreases outwardly from an optical axis on a plane perpendicular to the optical axis of the light beam.

19. An optical device according to claim 18, further comprising a spatial light modulator disposed in an optical path of the light beam which has passed through said optical element, and adapted to display a desired image.

20. An optical device comprising: an optical element which is disposed near a converging point in an optical path of a converging light beam having a predetermined distribution and behind the converging point in a propagation direction of the light beam, and has a characteristic in which a phase transfer function linearly increases outwardly from an optical axis on a plane perpendicular to the optical axis of the light beam.

21. An optical device according to claim 20, further comprising a spatial light modulator disposed in an optical path of the light beam which has passed through said optical element, and adapted to display a desired image.

22. A projection type image liquid crystal display device comprising:
a light source for outputting a light beam having a predetermined shape and a predetermined intensity distribution;
at least one first optical element for shaping the beam shape of said light beam to be incident to a shape of a spatial light modulator having a uniform intensity distribution;
a second optical element for providing collimation to said shaped light beam to be incident;
a liquid crystal panel for inputting said light beam having said collimation thereto so as to be passed through a predetermined portion to display a predetermined image; and
a screen for displaying light passed through said liquid crystal panel.

23. An optical device according to claim 22, wherein said second optical element converts an incident light beam to one a parallel light beam and a light beam having a predetermined angle to an optical axis.

24. An optical device comprising:
at least one first optical element for converting an incident light having a predetermined shape and a predetermined intensity distribution to a predetermined shaped output light having a uniform intensity distribution,
wherein said first element has a concentric or spiral trench, and an inclination angle of a slant face of said trench is set to establish the following relationship when Li(ri)=an intensity distribution on light on art incident surface of the optical element of light being incident onto said optical element, Lo(ro)=an intensity distribution on light on a predetermined surface, Li(ri)=0 when ri>rimax, and Lo(ro)=0 when ro>romax:

$$\left(\int_0^{ri} Li(r') \cdot 2\pi r' dr'\right) \Big/ \left(\int_0^{rimax} Li(r') \cdot 2\pi r' dr'\right) = \left(\int_0^{ro} Lo(r') \cdot 2\pi r' dr'\right) \Big/ \left(\int_0^{romax} Lo(r') \cdot 2\pi r' dr'\right)$$

where ri: a position from an optical axis of an incident light, rimax: a position furthest from the optical axis of the incident surface of the optical element, rot a position from the optical axis on the predetermined surface of an output light beam corresponding to the incident light beam, and romax: a position furthest from the optical axis on the predetermined surface where the output light beam can be arrived.

25. The optical device according to claim 24, further comprising at least one second optical element having a concentric or spiral trench having a slant face whose angle changes in accordance with a distance from a central axis such that a predetermined collimation is provided to said predetermined shaped light having a uniform intensity distribution.

26. An optical element for converting an incident light beam having a predetermined shape and a predetermined light intensity distribution into an output light beam having a desired shape and a predetermined intensity distribution, comprising a concentric or spiral trench, wherein an inclination angle of a slant face of said trench is set to establish the following relationship when Li(ri)=an intensity distribution on light on an incident surface of the optical element of light being incident onto said optical element, Lo(ro)=an intensity distribution on light on a predetermined surface, Li(ri)=0 when ri>rimax, and Lo(ro)=0 when ro>romax:

$$\int_0^{ri} Li(r') \cdot 2\pi r' dr' \Big/ \int_0^{rimax} Li(r') \cdot 2\pi r' dr' = \int_0^{ro} Lo(r') \cdot 2\pi r' dr' \Big/ \int_0^{romax} Lo(r') \cdot 2\pi r' dr'.$$

* * * * *